(12) United States Patent
Shimizu et al.

(10) Patent No.: US 6,434,469 B1
(45) Date of Patent: Aug. 13, 2002

(54) DRIVING FORCE CONTROL APPARATUS

(75) Inventors: Kouichi Shimizu, Sagamihara; Keiji Kadota, Akishima, both of (JP)

(73) Assignee: Nissan Motor Co. Ltd., Yokohama (JP)

( * ) Notice: Subject to any disclaimer, the term of this patent is extended or adjusted under 35 U.S.C. 154(b) by 0 days.

(21) Appl. No.: 09/986,891

(22) Filed: Nov. 13, 2001

(30) Foreign Application Priority Data

| Nov. 14, 2000 | (JP) | 2000-346287 |
| Nov. 14, 2000 | (JP) | 2000-346288 |
| Jul. 25, 2001 | (JP) | 2001-225144 |

(51) Int. Cl.[7] ............................................. B60K 28/16
(52) U.S. Cl. .............................. 701/84; 701/83; 701/90; 701/91; 180/197
(58) Field of Search ........................ 701/83, 84, 90, 701/91, 92; 180/197

(56) References Cited

U.S. PATENT DOCUMENTS 4,917,208 A * 4/1990 Komoda ................. 180/197
5,067,579 A * 11/1991 Kushi et al. ............. 180/197

FOREIGN PATENT DOCUMENTS

| JP | 7-231508 | 8/1995 |
| JP | 8-300965 | 11/1996 |

\* cited by examiner

*Primary Examiner*—William A. Cuchlinski, Jr.
*Assistant Examiner*—Marthe Y. Marc-Coleman
(74) *Attorney, Agent, or Firm*—Shinjyu Global IP Counselors, LLP

(57) ABSTRACT

A driving force control apparatus is provided to optimize the acceleration performance and improve the energy efficiency of a vehicle. Preferably, the front wheels are driven by the internal combustion engine, while the rear wheels are driven by the electric motor. The electric motor is driven by electrical power generated by the generator. The generator is driven by the engine. When acceleration slippage occurs in the front wheels, the generator is controlled so as to produce a generation load torque corresponding to the acceleration slippage magnitude.

40 Claims, 32 Drawing Sheets

Wheel Speed Waveforms When Travelling on Poor Road ered by an electric motor are disclosed in Japanese Laid-Open Patent
DRIVING FORCE CONTROL APPARATUS

BACKGROUND OF THE INVENTION

1. Field of the Invention

The present invention generally relates to a vehicle driving force control apparatus in which at least one wheel from among the front and rear wheels is driven by an internal combustion engine. More specifically, the present invention relates to a drive control apparatus that is useful in a four-wheel drive vehicle in which one pair of wheels from among the front wheels and rear wheels is driven by an internal combustion engine and the other pair of wheels is driven by an electric motor.

2. Background Information

Four-wheel drive control apparatuses in which one pair of wheels from among the front wheels and rear wheels is driven by an engine and the other pair of wheels is driven by an electric motor are disclosed in Japanese Laid-Open Patent Publication Nos. 7-231508 and 8-300965.

In the drive control apparatus presented in Japanese Laid-Open Patent Publication No. 7-231508, the engine drives a generator and the electric energy generated by the generator drives the electric motor. The drive control apparatus controls the electric energy supplied from the generator to the electric motor based on the condition of the vehicle. As a result, a large capacity battery is not necessary, and thus, the weight of the vehicle can be reduced.

In the drive control apparatus presented in Japanese Laid-Open Patent Publication No. 8-300965, an engine drives one pair of wheels and an electric motor drives the other pair of wheels. The electric motor is driven by electric energy from a battery. The drive control apparatus estimates the road surface friction coefficient $\mu$. When the estimated road surface friction coefficient $\mu$ is low, the drive control apparatus controls the electric motor to an output torque based on the detected road surface friction coefficient $\mu$. In short, the drive control apparatus attempts to prevent acceleration slippage of the wheels driven by the engine by adjusting the output torque of the electric motor in accordance with the detected road surface friction coefficient $\mu$.

In view of the above, there exists a need for an improved vehicle driving force control apparatus that optimises the acceleration performance of the vehicle while also improving the fuel consumption and other energy efficiencies. This invention addresses this need in the art as well as other needs, which will become apparent to those skilled in the art from this disclosure.

SUMMARY OF THE INVENTION

It has been discovered that in the apparatus described in Japanese Laid-Open Patent Publication No. 7-231508, the acceleration slippage of the wheels driven by the engine cannot be directly suppressed. Specifically, acceleration cannot be directly suppressed slippage because the four-wheel drive is accomplished by driving the electric motor based on the deviation of the front wheel rotational speed and the rear wheel rotational speed from a standard rotational speed that corresponds to the accelerator position and the deviation between the front wheel rotational speed and the rear wheel rotational speed.

Meanwhile, in the apparatus described in Japanese Laid-Open Patent Publication No. 8-300965, the electric motor is driven and the motor torque is controlled only under certain conditions. Specifically, the electric motor is driven and the motor torque is controlled only when the brakes are not being operated, the gear shift is in a position other than neutral, the accelerator is being depressed, the vehicle is travelling at or below a prescribed speed, and the road surface friction coefficient $\mu$ is equal to or below a prescribed value. However, acceleration slippage of the wheels driven by the engine cannot be directly suppressed.

In short, in both of these drive control apparatuses, there is the possibility that, in situations where the accelerator is excessively depressed, the wheels driven by the engine will experience more acceleration slippage than necessary and sufficient acceleration performance and travelling stability will not be attainable.

The present invention focuses on this kind of problem and aims to provide a vehicle driving force control apparatus that optimises the acceleration performance of the vehicle while also improving the fuel consumption and other energy efficiencies.

The present invention can be basically carried out by providing for a vehicle having front and rear wheels with at least one of the front and rear wheels being a drive wheel driven by an internal combustion engine that drives a generator. The driving force control apparatus basically comprises a drive wheel slippage estimating section, and a generator control section. The drive wheel slippage estimating section is configured to estimate if acceleration slippage is occurring in the main drive wheels. The generator control section is configured to control a generation load torque of the generator to substantially correspond to an acceleration slippage magnitude of the main drive wheels, when the drive wheel slippage estimating section estimates acceleration slippage occurring in the main drive wheels.

With the present invention, the portion of the output torque from the internal combustion engine that is surplus torque corresponding to the magnitude of the acceleration slippage of the driving wheels, i.e., corresponding to the torque that cannot be used effectively by the drive wheels, is converted to electric energy. Therefore, the acceleration slippage of the drive wheels driven by the power of the internal combustion engine is suppressed and the necessary acceleration performance can be obtained in such situations as when the vehicle is starting to move.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
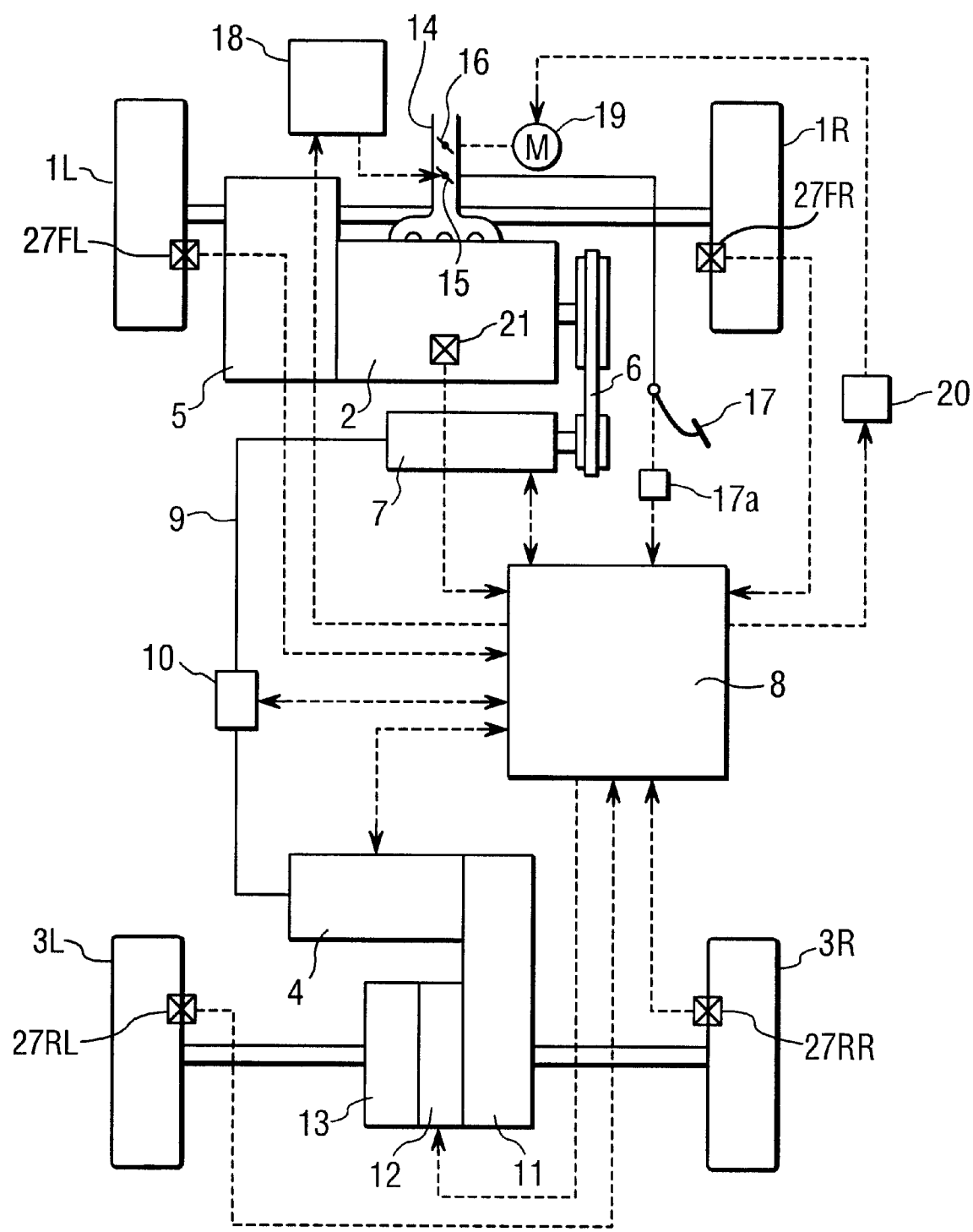
FIG. 1 is a schematic block diagram of a vehicle equipped with a vehicle driving force control apparatus in accordance with a first embodiment of the present invention.

Referring initially to FIG. 1, an example of a four-wheel drive vehicle is illustrated to explain a first embodiment of the present invention. The vehicle is capable of four-wheel drive in which the left and right front wheels 1L and 1R are driven by an internal combustion engine 2 and the left and right rear wheels 3L and 3R are driven by an electric motor 4. As shown in the FIG. 1, the engine output torque Te of the internal combustion engine 2 is transferred to the left and right front wheels 1L and 1R through a transmission and a differential gear 5. A portion of the engine output torque Te of the engine 2 is transferred to a generator 7 using an endless belt drive 6.

The generator 7 rotates at rotational speed Nh, which is the product of the rotational speed Ne of the engine 2 and the pulley ratio of the endless belt drive 6. The load placed on the engine 2 by the generator 7 due to the field current Ifh is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a. differential 13.

A main throttle valve 15 and a sub throttle valve 16 are disposed inside the intake passage 14 (e.g., an intake manifold) of the engine 2. The throttle opening of the main throttle valve 15 is adjusted/controlled in accordance with the amount of depression of the accelerator pedal 17, which also functions as a throttle opening indicating device or section. In order to adjust the throttle opening of the main throttle valve 15, the main throttle valve 15 is either mechanically linked to the depression amount of the accelerator pedal 17, or adjusted/controlled electrically by the engine controller 18 in accordance with the depression amount detection value from an accelerator sensor 17a that detects the depression amount of the accelerator pedal 17. The depression amount detection value of the accelerator sensor 17a is outputted to the 4WD controller 8. The accelerator sensor 17a constitutes a requested torque detecting section configured to detect a requested driving torque inputted to the internal combustion engine 2.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor. The step count of the stepper motor 19 is feedback-controlled based on the throttle opening detection value detected by this throttle sensor. In this embodiment, the output torque of the engine 2 can be controlled (reduced) independently of the operation of the accelerator pedal by the driver by adjusting the throttle opening of the sub throttle valve 16 so as to be smaller than the throttle opening of the main throttle valve 15.

The apparatus is also equipped with an engine speed detection sensor 21 that detects the rotational speed of the engine 2. The engine speed detection sensor 21 outputs its detected signal to the 4WD controller 8.

Figure 2:
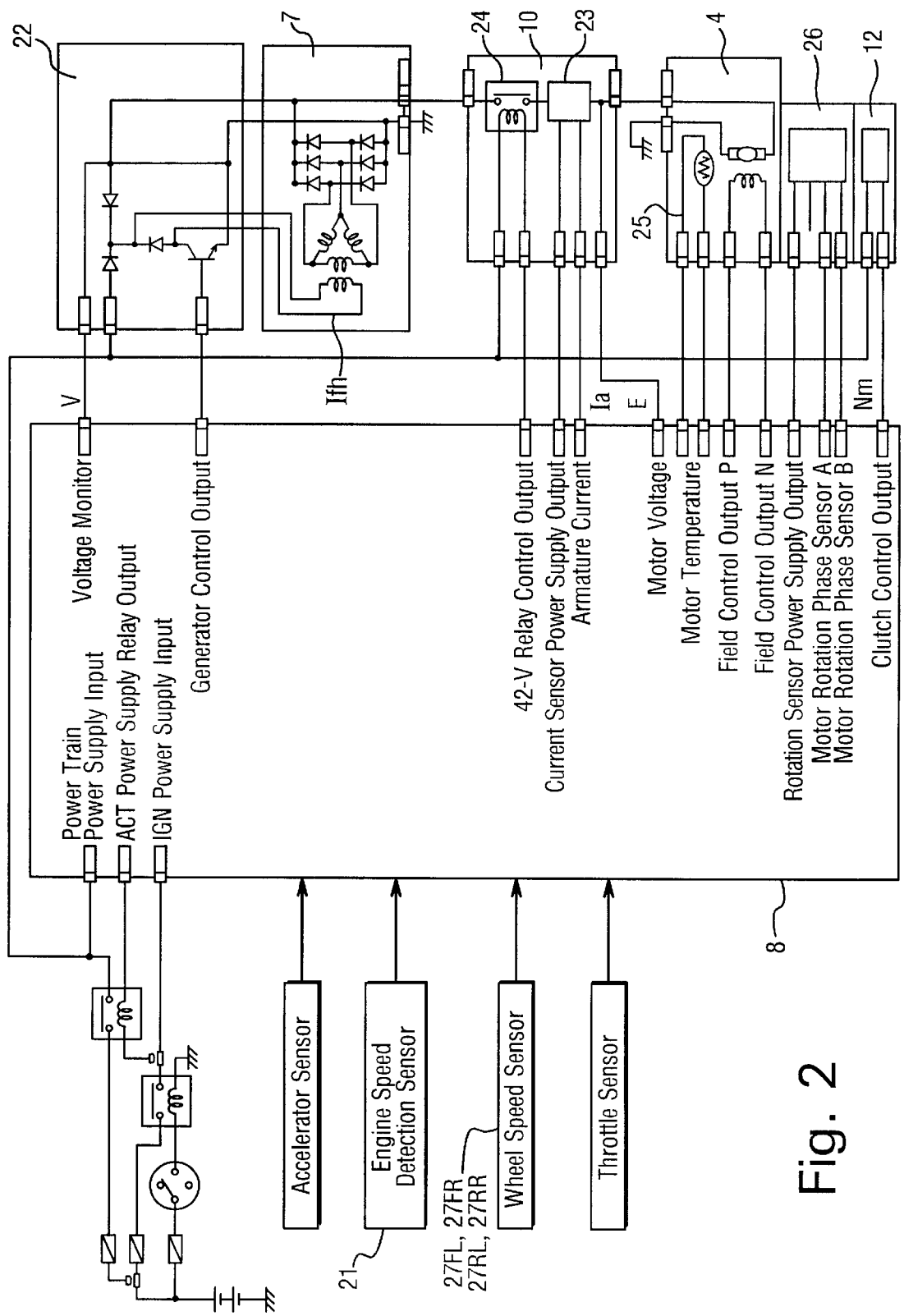
FIG. 2 is a block diagram of a control system for the vehicle driving force control apparatus in accordance with the first embodiment of the present invention.

As shown in FIG. 2, the generator 7 is equipped with a voltage adjusting device 22 (regulator) for adjusting the output voltage V. The generation load torque Th against the engine 2 and the generated voltage V are controlled by the adjustment of field current Ifh executed by the 4WD controller 8. The voltage adjusting device 22 receives a generator control command (field current value) from the 4WD controller 8 and adjusts the field current Ifh of the generator 7 to a value corresponding to the generator control command. It is also capable of detecting the output voltage V of the generator 7 and outputting the detected voltage value to the 4WD controller 8. Additionally, the rotational speed Nh of the generator 7 can be computed based on the rotational speed Ne of the engine 2 and the pulley ratio of the endless belt drive 6.

A current sensor 23 is provided inside junction box 10. The current sensor 23 detects the current value Ia of the electrical power supplied from the generator 7 to the electric motor 4 and outputs the detected armature current signal to the 4WD controller 8. The voltage across the electric motor 4 is detected by the 4WD controller 8 to provide a voltage value across the electrical line 9. A relay 24 shuts off or connects the voltage (current) supplied to the electric motor 4 in accordance with a command received from the 4WD controller 8.

A command from the 4WD controller 8 controls the field current Ifm of the electric motor 4 and the adjustment of the field current Ifm adjusts the drive torque Tm. A thermistor 25 measures the temperature of the electric motor 4. The apparatus is also equipped with a motor speed sensor 26 that detects the rotational speed Nm of the drive shaft of the electric motor 4. The motor speed sensor 26 outputs a signal for the detected rotational speed of the electric motor 4 to the 4WD controller 8.

The clutch 12 is a hydraulic clutch or electric clutch and transmits torque at a torque transfer rate corresponding to a clutch control command from the 4WD controller 8.

The wheel speed sensors 27FL, 27FR, 27RL, and 27RR are provided on wheels 1L, 1R, 3L and 3R, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value.

Figure 3:
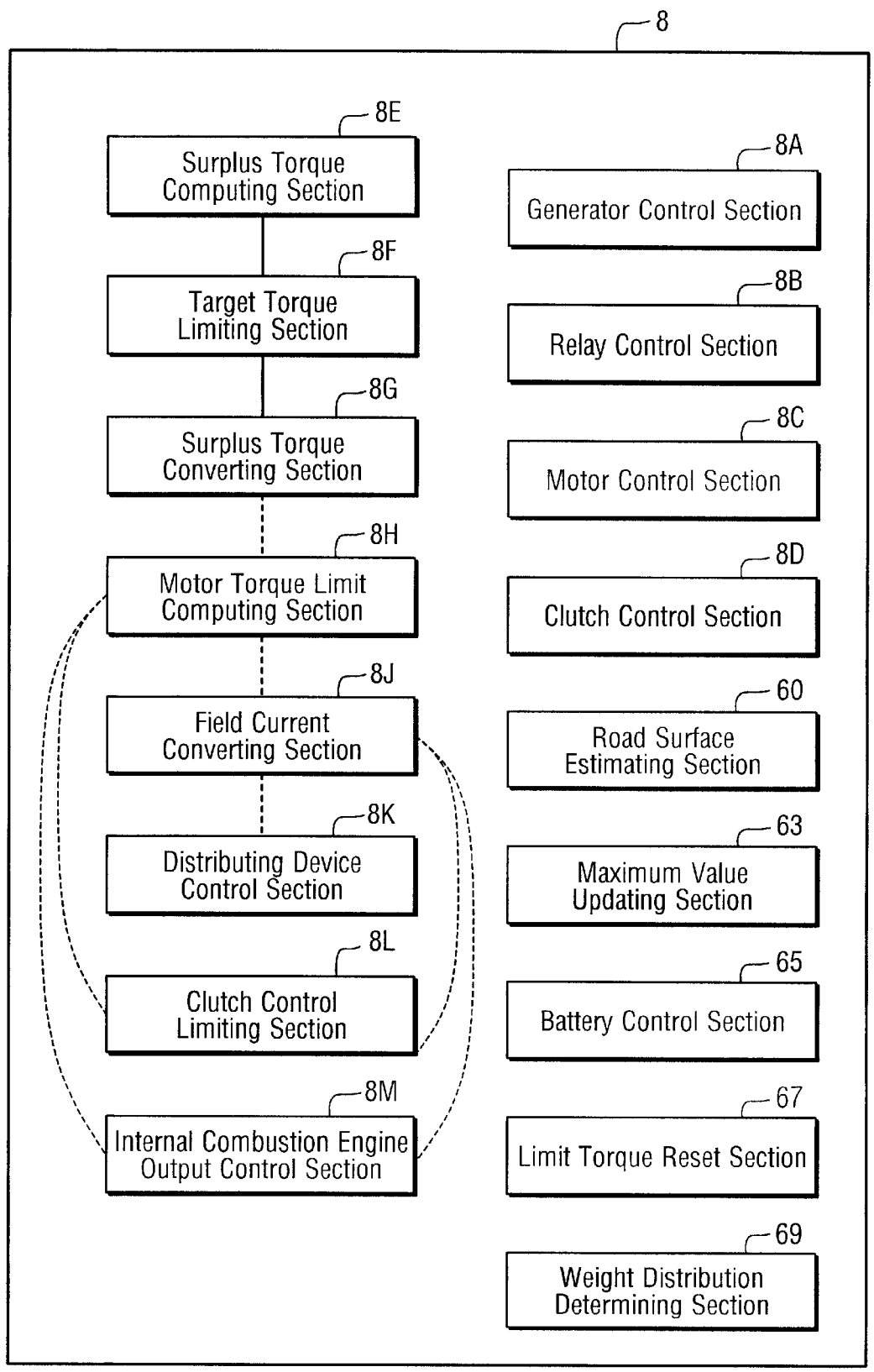
FIG. 3 is a block diagram illustrating the 4WD controller for the vehicle driving force control apparatus in accordance with the first embodiment of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, and a surplus torque converting section 8G. FIG. 3 also shows control blocks that are used by embodiments that will be discussed later.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Through the voltage adjusting device 22, the generator. control section 8A monitors the generated voltage V of the generator 7 and adjusts the generated voltage V of the generator 7 to the required voltage by adjusting the field current Ifh of the generator 7. Thus, the generator control section 8A includes a generation load torque adjusting section as discussed below. The relay control section 8B controls shutting off and connecting the power supply from the generator 7 to the electric motor 4. The monitor control section 8C adjusts the field current Ifm of the electric motor 4 in order to adjust the torque of the electric motor 4 to the required value.

Figure 4:
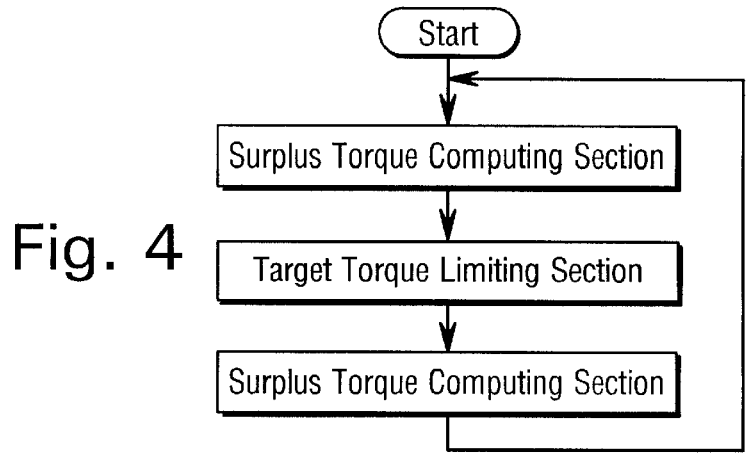
FIG. 4 is a flow chart showing the processing procedure executed by the 4WD controller for the vehicle driving force control apparatus of the first embodiment of the present invention.

As shown in FIG. 4, at a prescribed sampling time cycle, the processing is conducted in sequence by the surplus torque computing section 8E, the target torque limiting section 8F, and the surplus torque converting section 8G based on the input signals.

Figure 5:
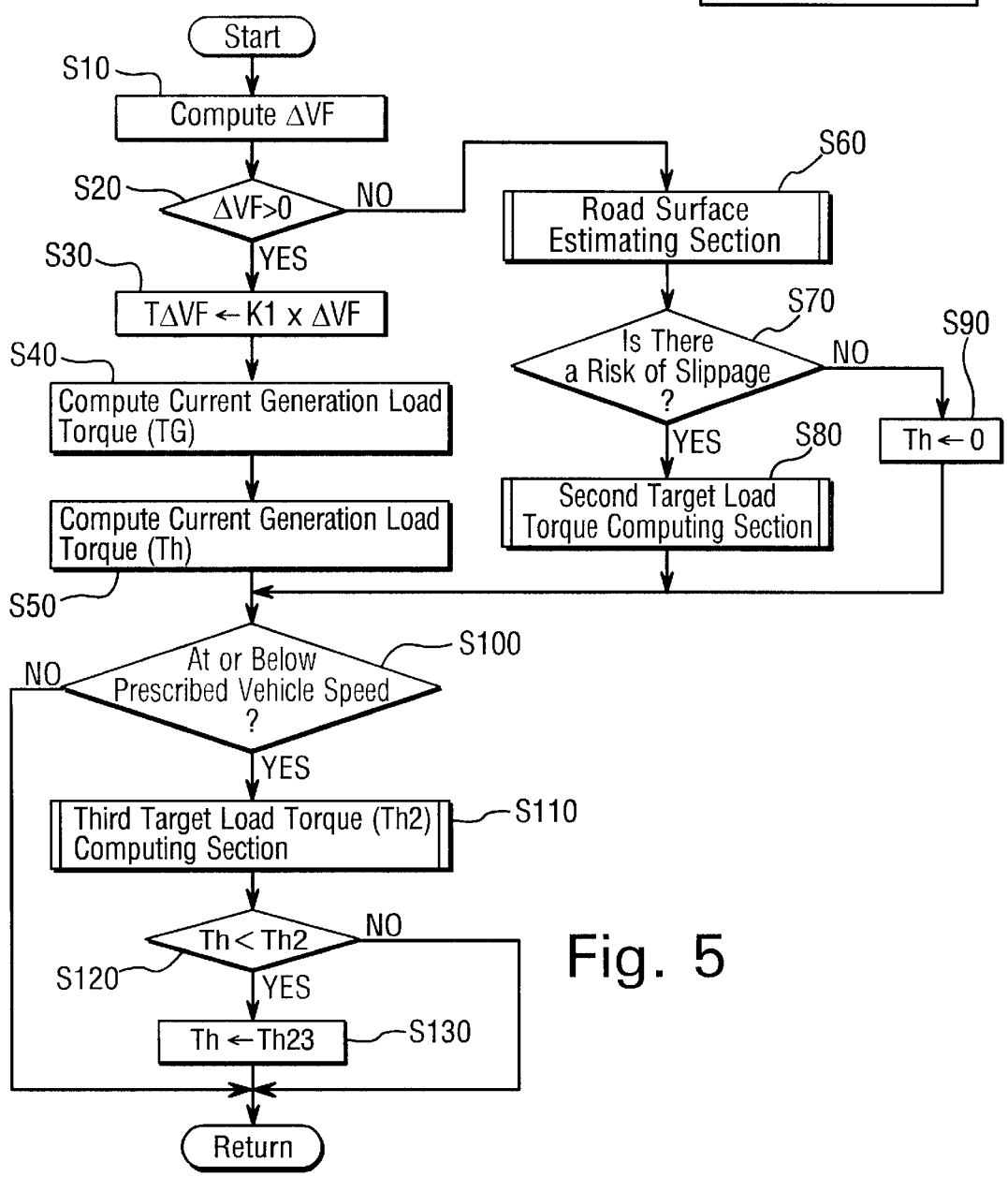
FIG. 5 is a flow chart showing the processing executed by the surplus torque computing section for the vehicle driving force control apparatus of the first embodiment of the present invention.

First, the processing shown in FIG. 5 is conducted by the surplus torque computing section 8E which includes second and third load torque computing sections as discussed below. The surplus torque computing section 8E is configured to compute a surplus torque that substantially corresponds to a difference magnitude by which a drive torque transferred from the internal combustion engine 2 to the front drive wheels 1L and 1R exceeds a road surface reaction force limit torque of the front drive wheels 1L and 1R.

At step S10, the wheel speeds computed based on the signals from the wheel speed sensors 27FL, 27FR, 27RL, and 27RR are used to subtract the wheel speed of the rear wheels 3L and 3R (subordinate drive wheels) from the wheel speed of the front wheels 1L and 1R (main drive wheels) and find the slippage speed ΔVF, which is the magnitude of the acceleration slippage of the front wheels 1L and 1R. Then processing proceeds to step S20.

The slippage speed ΔVF can be calculated as follows. The average front wheel speed VWf (which is the average of the left and right wheel speeds for the front wheels 1L and 1R) and the average rear wheel speed VWr (which is the average of the left and right wheel speeds for the rear wheels 3L and 3R) are calculated using the following two equations: VWf=(VWfl+VWfr)/2 and VWr=(VWrl+VWrr)/2.

Now, the slippage speed (acceleration slippage magnitude) ΔVF of the front or main drive wheels 1L and 1R is calculated by the differential between the average front wheel speed VWf and the average rear wheel speed VWr, i.e., ΔVF=VWf−VWr.

In step S20, the control program determines whether or not the calculated slippage speed ΔVF exceeds a prescribed value, such as zero. If slippage speed ΔVF is determined to be zero or below, it is estimated that the front wheels 1L and 1R are not experiencing acceleration slippage and processing proceeds to step S60. Conversely, if in step S20 slippage speed ΔVF is determined to be larger than zero, it is estimated that the front wheels 1L and 1R are experiencing acceleration slippage and thus control proceeds to step S30.

In step S30, the absorption torque TΔVF required for suppressing the acceleration slippage of the front wheels 1L and 1R is calculated using the equation below and processing proceeds to step S40. The absorption torque TΔVF is an amount that is proportional to the acceleration slippage magnitude as set forth in the equation TΔVF=K1×ΔVF, where K1 is a gain that is found through experimentation or the like.

In step S40, the current load torque TG of the generator 7 is calculated based on the equation below, and then processing proceeds to step S50.

$$TG = K2 \frac{V \times Ia}{K3 \times Nh}$$

where:
V: voltage of the generator 7,
Ia: armature current of the generator 7,
Nh: rotational speed of the generator 7,
K3: efficiency, and
K2: coefficient.

In step S50, the surplus torque, i.e., the target generation load torque Th that the generator 7 should carry, is found based on the above equation: Th=TG+TΔVF. Thus, the surplus torque computing section 8E (steps S30–S50) determines the surplus torque based on the acceleration slippage magnitude of the front wheels 1L and 1R and the generation load torque of the generator 7. Then, processing proceeds to step S100.

Meanwhile, if the main drive wheels 1L and 1R are determined not to be experiencing acceleration slippage in step S20, then processing proceeds to step S60 where the road surface estimating section 60 is started and an estimation is executed of whether or not the road surface is such that there is an apprehension of acceleration slippage occurring. Then, processing proceeds to step S70.

In step S70, processing is directed to step S80 when, based on the estimation of the road surface estimating section 60, the AS-FLG is ON, i.e., it was determined that the road surface is such that there is an apprehension of acceleration slippage occurring. Meanwhile, processing is directed to step 90 when the AS-FLG is OFF, i.e., it was determined that there is no apprehension of acceleration slippage. Zero is assigned as the target generation load torque Th and processing proceeds to step S80.

In step S80, the second target load torque computing section starts and calculates the target generation load torque Th for making the drive torque of the subordinate drive wheels 3L and 3R the required value. Then, processing proceeds to step S100.

In step S100, the control program determines whether or not the vehicle speed is at or below a prescribed vehicle speed, e.g., at or below 3 km. Thus, step S100 constitutes a low speed condition determining section. If the control program determines that the vehicle speed is at or below the prescribed speed, then processing proceeds to step S110. If the vehicle speed is determined to be faster than the prescribed speed, then processing ends and returns to the beginning of the control program to repeat the control program after a prescribed sampling time cycle has expired.

Thus, the generator control device 8 includes a first generator load torque generator control section in steps S10–S50 that calculates a first target generation load torque Th of the generator 7 in accordance with the acceleration slippage magnitude of the main drive wheels 1L and 1R when acceleration slippage of the main drive wheel 1L and 1R is estimated to be occurring acceleration slippage and when the low speed condition determining section (step S1100) determines that the vehicle is in a low speed condition. Then, after step S110 discussed below in more detail, the processing proceeds to step S120.

In step S120, the target generation load torque Th corresponding to the acceleration slippage and the second target generation load torque Th2 are compared. If second target generation load torque Th2 is determined to be larger, then the value of Th2 is assigned to Th in step S130 and processing returns. Otherwise, processing ends and returns to the beginning of the control program to repeat the control program after a prescribed sampling time cycle has expired.

In this embodiment, the larger of the target generation load torque Th (which corresponds to the acceleration slippage) and the second target generation load torque Th2 (which is based on a low speed condition at or below a prescribed speed) is selected, but it is also acceptable to assign second target generation load torque Th2 to target generation load torque Th unconditionally when under low speed conditions at or below a prescribed speed.

Figure 6:
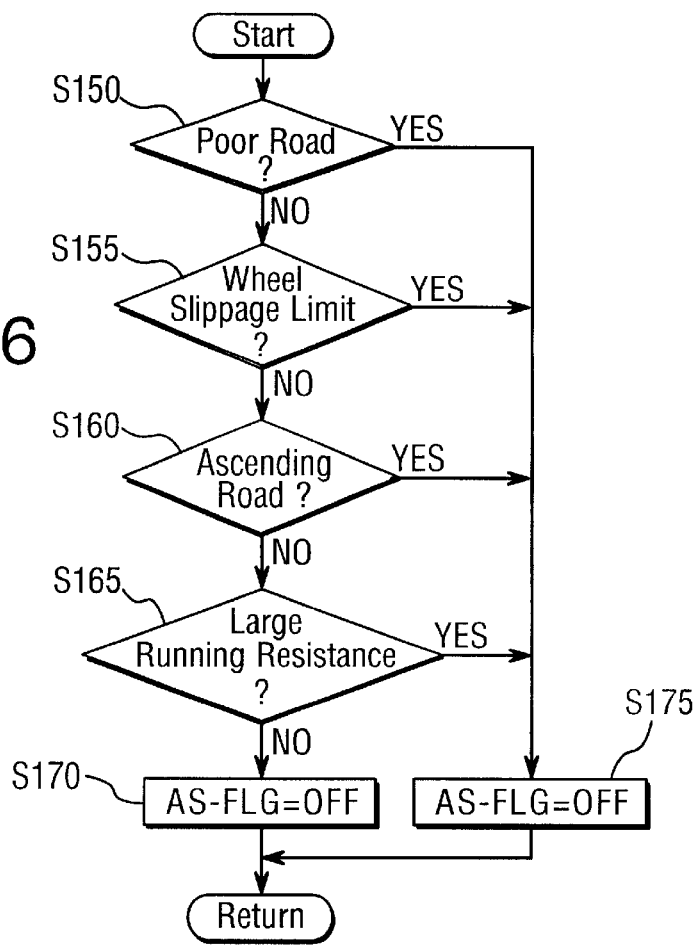
FIG. 6 is a flow chart showing the processing executed by the road surface estimating section for the vehicle driving force control apparatus of the first embodiment of the present invention.

Next, the processing of the road surface estimating section 60 will be explained using FIG. 6. The road surface estimating section 60 is configured to form an acceleration slippage apprehension estimating device or section. The road surface estimating section 60 is configured to compute road surface condition including, but not limited to, a poor road condition estimate to determine if detected road conditions are within a prescribed poor road range, a wheel grip limit estimation value for the front drive wheel 1L and 1R, an ascending road estimate to determine if the vehicle is traveling on an ascending road, and a running resistance of the vehicle.

In step S150, the road surface estimating section 60 estimates whether or not the current road surface condition is poor. In other words, the road surface estimating section 60 acts as a poor road estimating section that is configured to estimate if detected road conditions are within a prescribed poor road range. If the road is estimated to be a poor road, then processing proceeds to step S175 where the limit torque reset section 67 determining that the driving force of the subordinate drive wheels 3L and 3R should be increased upon the poor road estimating section determining that the vehicle is traveling on a road within the prescribed poor road range. If the road was not estimated to be a poor road, then processing proceeds to step S155 where it is estimated whether or not the road surface condition is in the vicinity of the wheel grip limit. If it is estimated that the road surface condition is in the vicinity of the wheel grip limit, then processing proceeds to step S175, where the limit torque reset section 67 determines that the driving force of the subordinate drive wheels 3L and 3R should be increased upon determining that the wheel grip limit estimation value of the main drive wheel 1L and 1R is at least close to a detected wheel grip limit. If not, then processing proceeds to step S160 where it is estimated whether or not the vehicle is travelling on an ascending road whose grade exceeds a prescribed grade. If the road is estimated to be an ascending road whose grade exceeds a prescribed grade, then processing proceeds to step S175 where the limit torque reset section 67 determines that the driving force of the subordinate wheels 3L and 3R should be increased upon the ascending road estimating section determining that the vehicle is traveling on an ascending road. If not, then processing proceeds to step S165. If the control program determines that the running resistance exceeds a prescribed resistance due to travelling on sandy terrain, a snowy road surface, or the like, then processing proceeds to step S175 where the limit torque reset section 67 determining that the driving force of the subordinate wheels 3L and 3R should be increased upon the running resistance detecting section determining that the running resistance is greater than or equal to a prescribed value. If not, then processing proceeds to step S170.

In step S175, the AS-FLG, which indicates that the road surface is such that there is an apprehension of acceleration slippage, is turned ON because the road surface is in the vicinity of the wheel grip limit, is an ascending road, or has a running resistance that exceeds a prescribed resistance.

In step S170, the AS-FLG is turned OFF because the road surface condition does not fit into any of the above categories.

While the preceding explanation described determining if the road conditions matched any one of four different types, it is also acceptable to estimate other road conditions for which there is the apprehension of acceleration slippage occurring or to estimate only a portion of the aforementioned four types of road condition.

Figure 7:
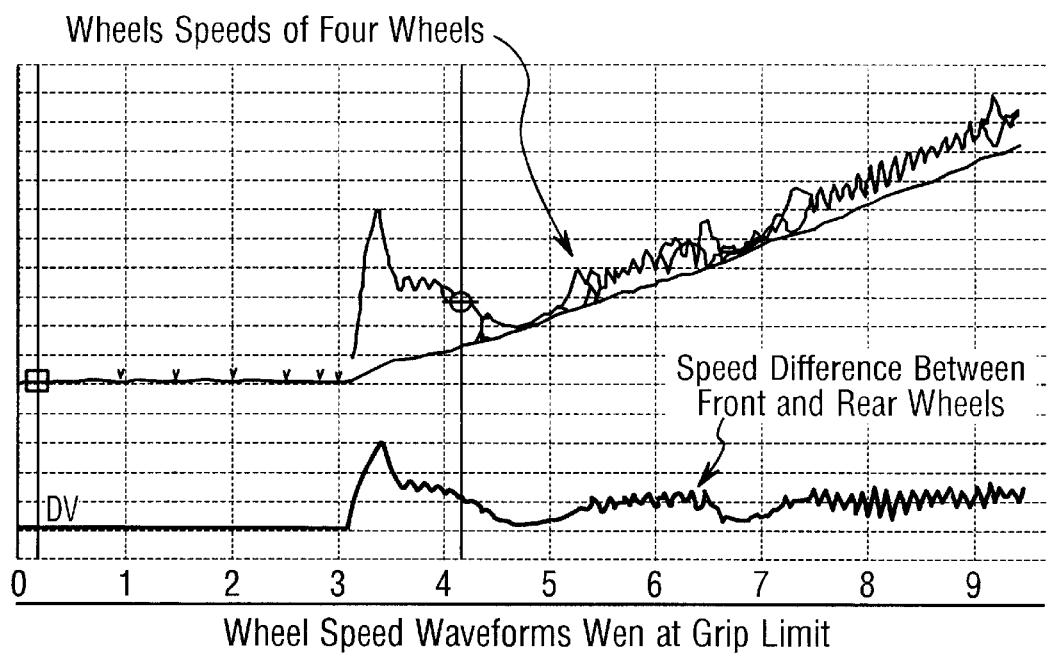
FIG. 7 is a graph showing the wheel speed waveforms when at the slippage limit.
Figure 8:
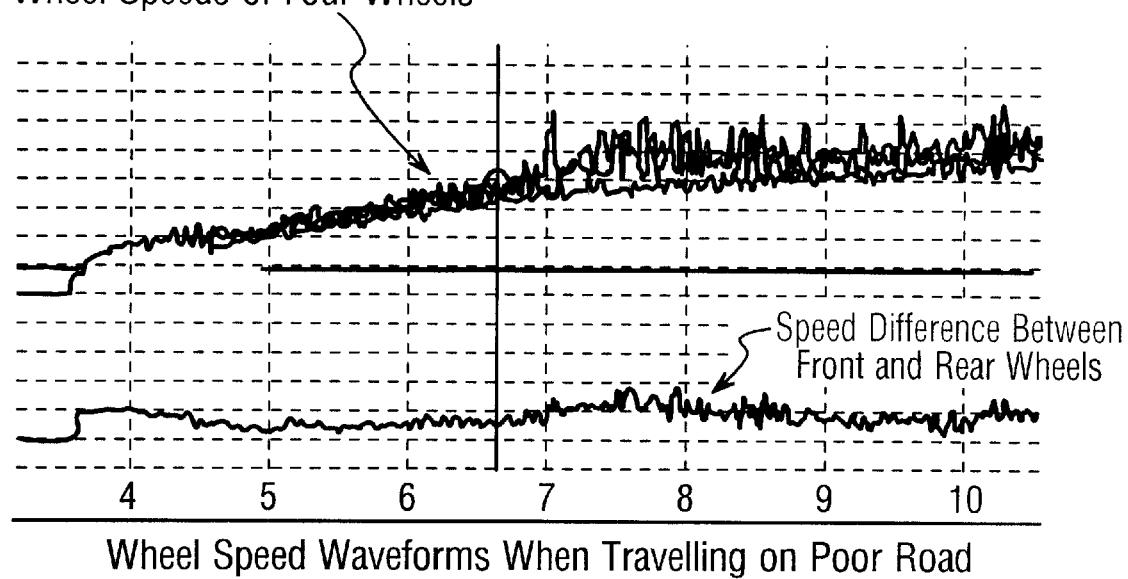
FIG. 8 is a graph showing the wheel speed waveforms when travelling on a poor road.

In this embodiment, the estimations for poor road and road surface in the vicinity of the wheel grip limit are conducted as follows. The wheel speed waveform shown in FIG. 7 is used when travelling on a road surface that is in the vicinity of the grip limit, while the wheel speed waveform shown in FIG. 8 is used when travelling on a poor road. According to these waveforms, the wheel speed shows an oscillation with a frequency of approximately 8 Hz when the vehicle is travelling on a road surface in the grip limit vicinity and approximately 11 Hz when the vehicle is travelling on a poor road. Although these frequencies have a variance of ±2 Hz, they are unique to the vehicle. Therefore, by experimentally measuring the frequency when at the grip limit and the frequency when travelling on a poor road for the particular vehicle, it can be determined when the vehicle is travelling at the grip limit or on a poor road by focusing on these frequency bands. Technologies for determining the travelling condition of a vehicle based on a specified frequency band are presented in Japanese Laid-Open Patent Publication No. 2000-233739, etc. The threshold value of the oscillation level used for making the determination should be a value that sufficiently avoids the background noise level in a case of either of the two road surface conditions. Therefore, the same degree of frequency band should be used for both the grip limit determination and the poor road determination. Additionally, instead of finding the oscillation frequency when at the grip limit and the oscillation frequency when travelling on a poor road for the particular vehicle experimentally, the unsprung resonance frequency of the drive shaft ±2 Hz can be used as the oscillation frequency for the grip limit and the unsprung resonance frequency of the suspension ±2 Hz can be used as the frequency band for travelling on a poor road.

Therefore, based on the facts just presented, the determination of whether the vehicle is travelling on a, poor road or on a road surface that is at the grip limit is accomplished by passing the wheel speeds through a band pass filter, differentiating the same with a differentiator, and determining if the absolute value is greater than or equal to a prescribed threshold value (e.g., 2G). The following frequency bands should be used as the band region of the aforementioned band pass filter in the cases shown in FIGS. 7 and 8, for example: the frequency band from 6 to 10 Hz should be used for detecting a grip limit road surface; the frequency band from 9 to 13 Hz should be used for detecting a poor road; and the frequency band from 6 to 13 Hz should be used when detecting both.

Furthermore, the determination of whether or not the vehicle is on an ascending road can be accomplished based on the ascent resistance. More specifically, it can be determined if the road is ascending at a grade that exceeds a prescribed grade by installing a G sensor that measures the acceleration force that acts on the vehicle in the vertical direction with respect to the road surface and estimating the grade of the road surface based on the output Gv from this G sensor. In this case, Gv=g×cos θ (where g is the acceleration due to gravity and θ is the road surface grade) and ascent resistance R=g×sin θ.

An ascending road can also be estimated based on the actual slant of the vehicle body. The estimation of whether or not the running resistance is greater than or equal to a prescribed value can be accomplished using a known technology, such as that disclosed in Japanese Laid-Open Patent Publication No. 2000-168405. For example, the estimation can be conducted as follows. First, the acceleration Ar of the subordinate drive wheels 3L and 3R is calculated and then the product of the acceleration Ar and the vehicle weight W is calculated to obtain the vehicle acceleration part driving force Fa (=Ar×W). Meanwhile, the four-wheel driving force Fw (sum of driving force of main drive wheels 1L and 1R and driving force of subordinate drive wheels 3L and 3R) is calculated. Then it can be estimated if the running resistance exceeds a prescribed value by determining if the running resistance force Fs, which is the difference between the vehicle acceleration part driving force Fa and the four-wheel driving force Fw, exceeds a prescribed threshold value (e.g., 980 N).

Figure 9:
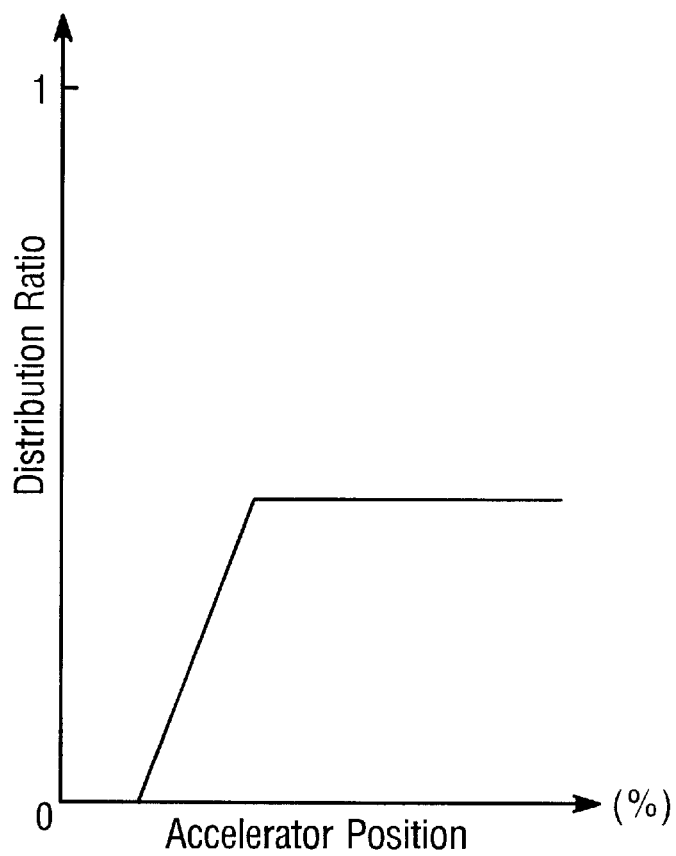
FIG. 9 is a graph showing the relationship between distribution ratio and the accelerator position.

Now, the processing executed by the second target load torque computing section will be explained. First, the torque (accelerator position) requested by the driver is calculated based on the accelerator pedal operation amount. The distribution ratio α1 for the generation load, which is proportional to the estimated request torque, is determined based on a map such as shown in FIG. 9. The upper limit is set to, for example, 30%. The engine torque Te is found based on engine speed sensor 21, a throttle sensor, etc., and the target generation load torque Th is calculated by multiplying the engine torque Te by distribution ratio α1. The distribution ratio 0.1 takes a value of 0.1 or the like, where a value of 1 corresponds to the entire engine torque.

Although here the distribution ratio α1 is set so as to vary in accordance with the requested torque of the driver, it is also acceptable to keep the ratio fixed or to vary it in a stepwise manner. Furthermore, it is also acceptable to find the road surface limit reaction force for a high-$\mu$ road (e.g., a road surface with a friction coefficient $\mu$ value between 0.7 and 1) in advance by experimentation and vary the distribution ratio α1 in accordance with the difference between the aforementioned road surface limit reaction force and the current road surface limit reaction force at the main drive wheels 1L and 1R. Thus, the second generator control section is configured to control the torque of the generator 7 to match a generation load torque when the acceleration slippage apprehension estimating section estimates that there is an apprehension of acceleration slippage, the generation load torque being determined in accordance with a difference between the current road surface reaction force limit torque and a previously-calculated high-$\mu$ road surface reaction force limit torque.

A low speed condition determining section is configured to determine if a traveling speed of the vehicle is less than or equal to a prescribed speed. A first low speed control section is configured to control the torque of the generator 7 to match a generation load torque determined in accordance with the requested driving torque detected by the requested torque detecting section when the low speed condition determining section determines that the vehicle is in a low speed condition.

The first low speed control section is configured to start when the low speed condition determining section determines that the vehicle is in a low speed condition. The first low speed control section starts the generator control section 8 when the low speed condition determining section determines that the vehicle is not in a low speed condition.

The generator control section 8 calculates a first generation load torque accordance with the acceleration slippage magnitude of the main drive wheel 1L and 1R when acceleration slippage of the main drive wheel 1L and 1R is estimated to be occurring and when the low speed condition determining section determines that the vehicle is in a low speed condition. The generator control section 8 also calculates a second generation load torque in accordance with the requested driving torque detected by the requested torque detecting section, and controls the torque of the generator 7 to substantially correspond to the larger of the first and second generation load torques.

Next, the operation of the above-described apparatus will be explained. When the torque transferred from the engine 2 to the front wheels 1L and 1R is larger than the road surface reaction force limit torque, i.e., when acceleration slippage occurs in the front wheels 1L and 1R (which are the main drive wheels 1L and 1R), due to the road surface friction coefficient $\mu$ being small or the driver depressing the accelerator pedal 17 too deeply, the drive torque transferred to the front wheels 1L and 1R is controlled so as to approach the road surface reaction force limit torque of the front wheels 1L and 1R by having the generator 7 generate at a generation load torque Th corresponding to the magnitude of the acceleration slippage. As a result, acceleration slippage of the front wheels 1L and 1R (which are the main drive wheels) is suppressed.

Next, the processing executed by the third target load torque computing section (step S110) will be explained. First, the torque (accelerator position) requested by the driver is calculated based on the accelerator pedal operation amount. The distribution ratio α2 for the generation load, which is proportional to the estimated request torque, is determined. The upper limit is set to, for example, 20%. The engine torque Te is found and the second target generation load torque Th2 is calculated by multiplying the engine torque Te by distribution ratio α2. The distribution ratio α2 takes a value of 0.2 or the like, where a value of 1 corresponds to the entire engine torque. Although here the distribution ratio α2 is set so as to vary in accordance with the requested torque of the driver, it is also acceptable to keep the ratio fixed.

Furthermore, the invention is not limited to determining distribution ratio α2 in accordance with the driver requested torque. For example, it is also acceptable to calculate the second target generation load torque Th2 using α2 as the weight distribution of the subordinate drive wheels 3L and 3R based on the front-rear weight distribution of the vehicle. Thus, the third target load torque computing section (step S110) includes weight distribution determining section configured to determine a front and rear weight distribution of the vehicle based on inputs from weight distribution sensors such as strain gauges. As previously mentioned, the low speed condition determining section (step S100) determines if a traveling speed of the vehicle is less than or equal to a prescribed speed. A second low speed control device or section is configured to control the torque of the generator 7 to match a generation load torque determined in accordance with the front and rear weight distribution determined by the low speed condition determining section when the low speed condition determining section (step S100) determines that the vehicle is in a low speed condition. The second low speed control device or section starts the generator control device 8 when the vehicle is not in the low speed condition.

Figure 10:
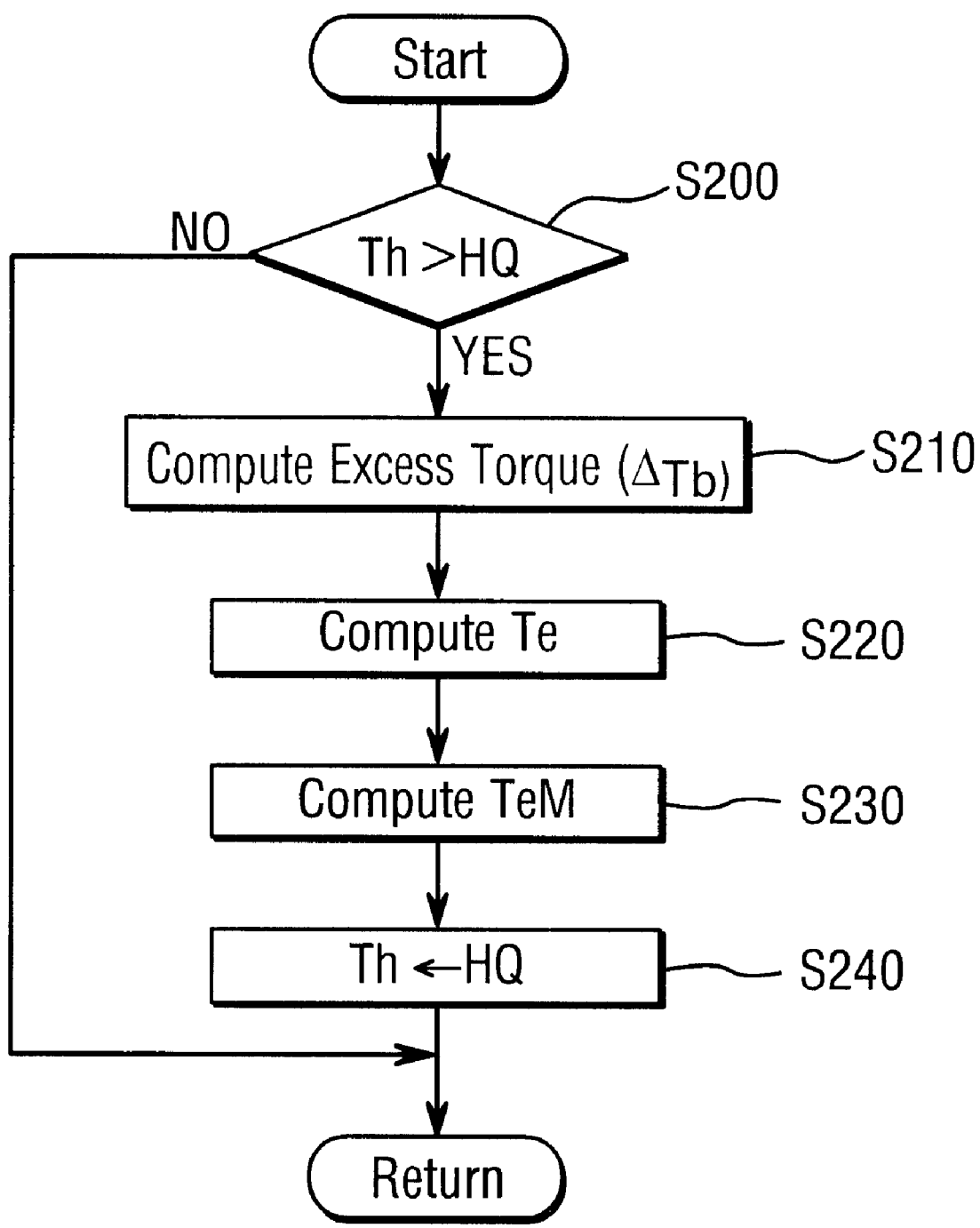
FIG. 10 is a flow chart showing the processing executed by the target torque limiting section for the vehicle driving force control apparatus of the first embodiment of the present invention.

Next, the processing executed by the target torque limiting section 8F will be explained based on FIG. 10. First, in step S200, the control program determines whether or not the target generation load torque Th is larger than the maximum load capacity HQ of the generator 7. Processing proceeds to the beginning of the control program to repeat the control program after a prescribed sampling time cycle has expired, if the control program determines that target generation load torque Th is less than or equal to the maximum load capacity HQ of the generator 7. Conversely, processing proceeds to step S210 if the control program determines that target generation load torque Th is larger than the maximum load capacity HQ of the generator 7.

In step S210, the excess or surplus torque ΔTb, which is the portion of target generation load torque Th that exceeds the maximum load capacity HQ, is found according to the following equation: ΔTb=Th−HQ. Then, processing proceeds to step S220.

In step S220, the current engine torque Te is computed based on the signals from the engine speed detection sensor 21 and the throttle sensor. Then, processing proceeds to step S230.

In step S230, the engine torque upper limit value TeM is calculated by subtracting the aforementioned excess or surplus torque ΔTb from the aforementioned engine torque Te, as set forth in the equation TeM=Te−ΔTb. After the engine torque upper limit value TeM is outputted to the engine controller 18, processing proceeds to step S240.

Without relation to operation of the accelerator pedal 17 by the driver, the engine controller 18 limits the engine torque Te such that the inputted engine torque upper limit value TeM becomes the upper limit value of engine torque Te. The processing from step S210 to this point comprises an internal combustion engine output limiting device or section.

In step S240, the maximum load capacity HQ is assigned as the target generation load torque Th and then processing returns to the beginning of the control program to repeat the control program after a prescribed sampling time cycle has expired.

Figure 11:
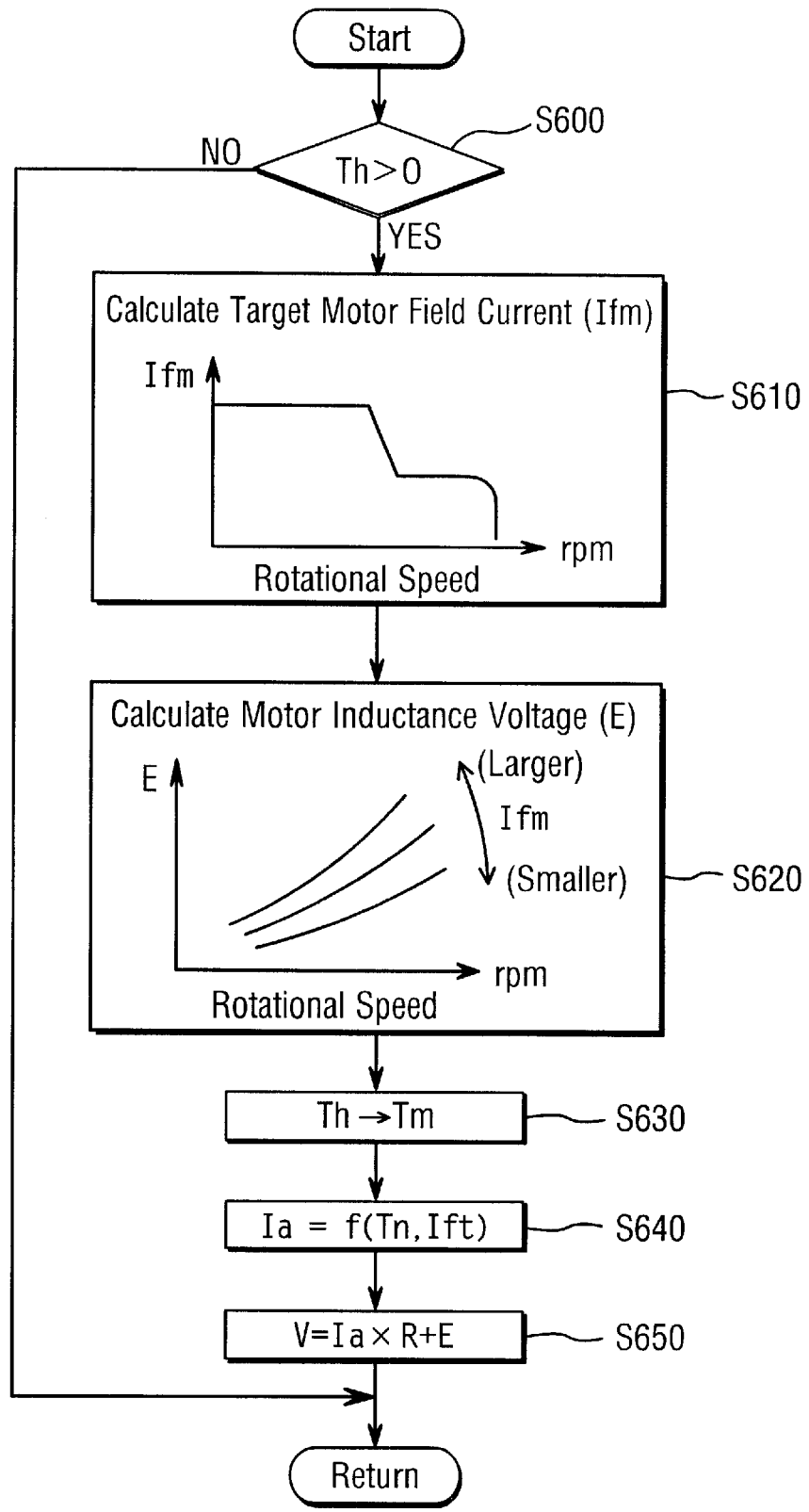
FIG. 11 is a flow chart showing the processing executed by the surplus torque converting section for the vehicle driving force control apparatus of the first embodiment of the present invention.

Next, the processing executed by the surplus torque converting section 8G will be explained based on FIG. 11. The surplus torque converting section 8G forms a generation load torque control section that is operatively coupled to the generation load torque adjusting section of the generator control section 8A to control the generation load torque of the generator 7 to a torque value based on the surplus torque computed by the surplus torque computing section 8E.

First, in step S600, the control program determines if Th is larger than 0. If Th is determined to be larger than 0, processing proceeds to step S610 because one of the following is occurring: the front wheels 1L and 1R are experiencing acceleration slippage; the conditions are such that there is an apprehension of acceleration slippage occurring; or the vehicle is in a low speed state at or below a prescribed speed. If the control program determines that Th is less than or equal to 0, then processing returns to the beginning of the control program to repeat the control program after a prescribed sampling time cycle has expired without executing the subsequent steps because the vehicle is in a state in which the front wheels 1L and 1R are not experiencing acceleration slippage or other comparable state.

In step S610, the rotational speed Nm of the electric motor 4 detected by motor speed sensor 21 is received as input. The target motor field current Ifm corresponding to the rotational speed Nm of the electric motor 4 is calculated and the target motor field current Ifm is outputted to the motor control section 8C. Then, processing proceeds to step S620.

In this embodiment, the target motor field current Ifm corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed (see FIG. 12). In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm can be obtained because the motor induced voltage E is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

In step S620, the induction current E of the electric motor 4 is calculated based on the target motor field current Ifm and the rotational speed Nm of the electric motor 4. Then, processing proceeds to step S630.

In step S630, the corresponding target motor torque TM is calculated based on the generation load torque Th computed by surplus torque computing section 8E. Then, processing proceeds to step S640.

In step S640, the corresponding target armature current Ia is calculated using the target motor torque TM and the target motor field current Ifm as variables. Then, processing proceeds to step S650.

In step S650, the equation V=Ia×R+E is used to calculate the target voltage V of the generator 7 from the target armature current Ia, resistance R, and the induced voltage E. Processing returns to the beginning of the control program to repeat the control program after a prescribed sampling time cycle has expired after the target voltage V of the generator 7 is outputted to the generator control section 8A.

The resistance R is the resistance of the electrical line 9 and the resistance of the coil of the electric motor 4.

Although here the surplus torque converting section 8G takes into account control of the motor when it calculates the target voltage V at the generator 7 that corresponds to the target generation load torque Th, it is also acceptable to calculate the voltage value V that achieves the target generation load torque Th directly from target generation load torque Th.

Figure 12:
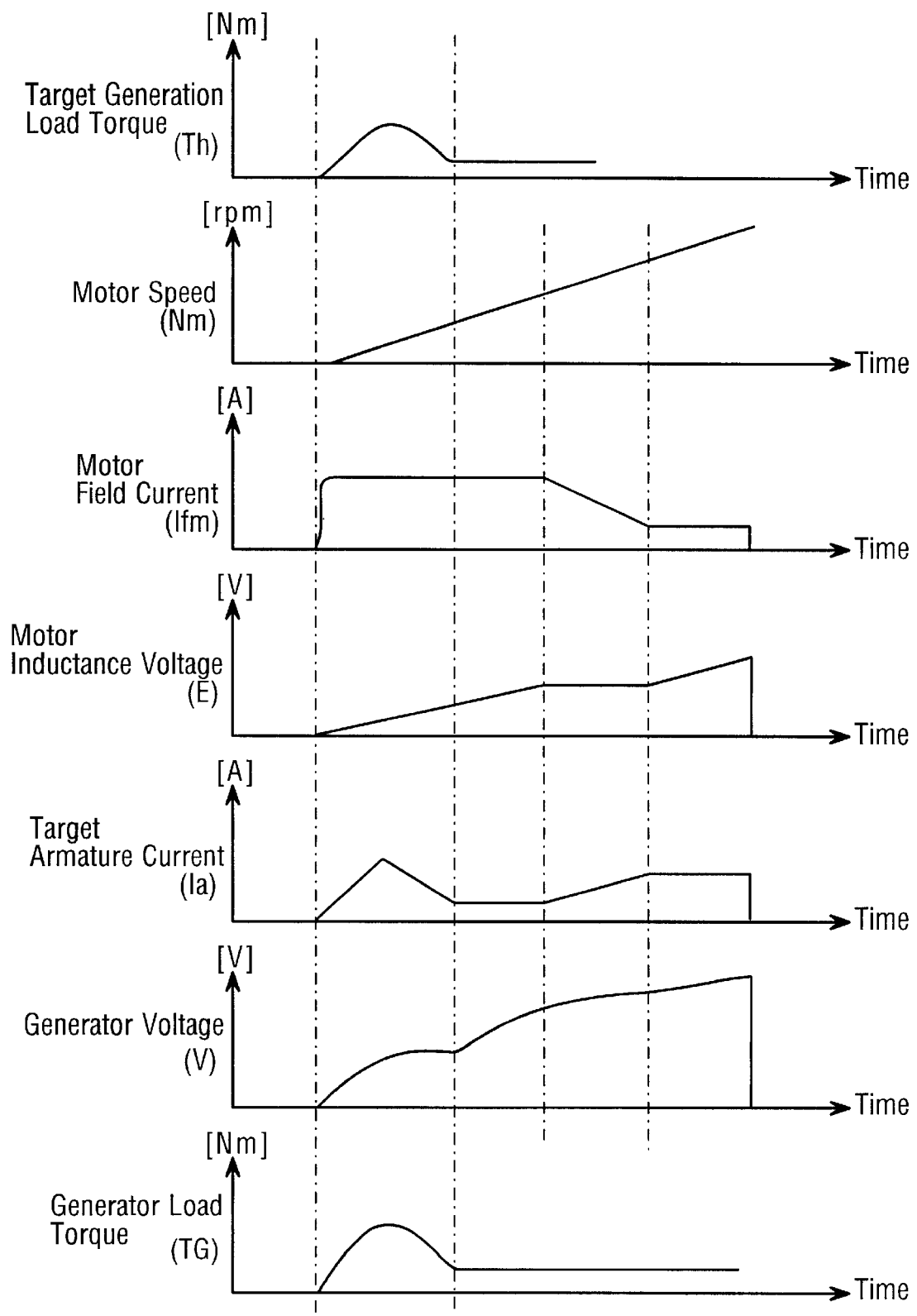
FIG. 12 shows exemplary time charts for the surplus torque converting section for the vehicle driving force control apparatus of the first embodiment of the present invention.

FIG. 12 shows an example of a time chart for the processing described above. In this embodiment, the steps S10 and S20 constitute a main drive wheel slippage estimating device or section. The generator control section 8A, which controls field current Ifh, constitutes a generation load torque adjusting device or section. The steps S30 to S50 constitute a surplus torque computing device or section. The surplus torque converting section 8G constitutes a generator load torque control device or section.

Furthermore, the acceleration performance of the vehicle is improved because the surplus power generated by the generator 7 is used to drive the electric motor 4, which drives the rear wheels 3L and 3R (which are the subordinate drive wheels).

At the same time, the electric motor 4 is driven by the surplus torque beyond the road surface reaction force limit torque of the subordinate drive wheels 3L and 3R. Consequently, the energy efficiency is improved, which leads to improved fuel consumption.

In this embodiment, if the rear wheels 3L and 3R were always driven, several energy conversions (mechanical energy→electrical energy→mechanical energy, etc.) take place and energy losses occur in accordance with the conversion efficiencies. Therefore, the acceleration performance of the vehicle would decline in comparison with a case where only the front wheels 1L and 1R were driven. Consequently, it is generally preferred that driving of the rear wheels 3L and 3R be suppressed. Conversely, this embodiment takes into consideration the fact that when travelling on a slippery road surface or the like, even if all of the output torque Te of the engine 2 is transferred to the front wheels 1L and 1R, not all of the torque will be used as driving force. The driving force that cannot be utilized efficiently by the front wheels 1L and 1R is outputted to the rear wheels 3L and 3R and the acceleration performance is improved.

Furthermore, in the present embodiment, even if the front wheels 1L and 1R (which are the main drive wheels) are not experiencing acceleration slippage but the road surface condition is estimated to be such that there is an apprehension of acceleration slippage occurring, a generation load torque is produced in advance and the vehicle is put into a four-wheel drive state to an extent that the vehicle remains stable. As a result, travel stability can be obtained reliably and the stability and response of the vehicle with respect to acceleration slippage are improved.

When the vehicle is starting to move or is otherwise in a low speed condition at or below a prescribed speed, there is the danger that the estimation of acceleration slippage will not be conducted appropriately regardless of whether the acceleration slippage is estimated using the difference in speed $\Delta V$ between the front and rear wheels or using the road surface reaction force limit torque. In other words, the precision of the acceleration slippage detection degrades when the speed is low because the precision of the wheel speed detection performed by rotary sensors and the like degrades and the road surface reaction force is too small due to the small acceleration of the vehicle. Thus, it is possible to have a situation where vehicle does not go into a four-wheel drive state even though acceleration slippage is actually occurring. Meanwhile, if acceleration slippage of the main drive wheels 1L and 1R occurs when on sandy terrain or a snowy road surface, the road surface contacted by the main drive wheels 1L and 1R will change and travelling conditions will worsen (e.g., road surface friction coefficient $\mu$ will decline and running resistance will increase). The lower the speed of the vehicle is, the larger the effect of the change in the road surface caused by the vehicle will be. In short, when the vehicle is starting to move or otherwise travelling at a very low speed, the occurrence of slippage will worsen the road surface condition and afterwards it will be difficult to start moving even if the vehicle goes into four-wheel drive.

With the present embodiment, when the vehicle is starting to move or otherwise in a low speed state at or below a prescribed speed, the subordinate drive wheels 3L and 3R are driven in advance with a drive torque corresponding to the requested drive torque (acceleration request or the like) of the driver even before acceleration slippage occurs. As a result, stable starting and stable travel at low speeds can be achieved even when travelling on sandy terrain or other road surface for which acceleration slippage occurs easily.

In step S630, in the surplus torque converting section 8G, the target motor torque TM is calculated based on the generation load torque Th. When the vehicle is in a low speed state at or below a prescribed speed and Th2 is selected as Th, it is also acceptable to calculate target motor torque TM based on the accelerator position.

Figure 13:
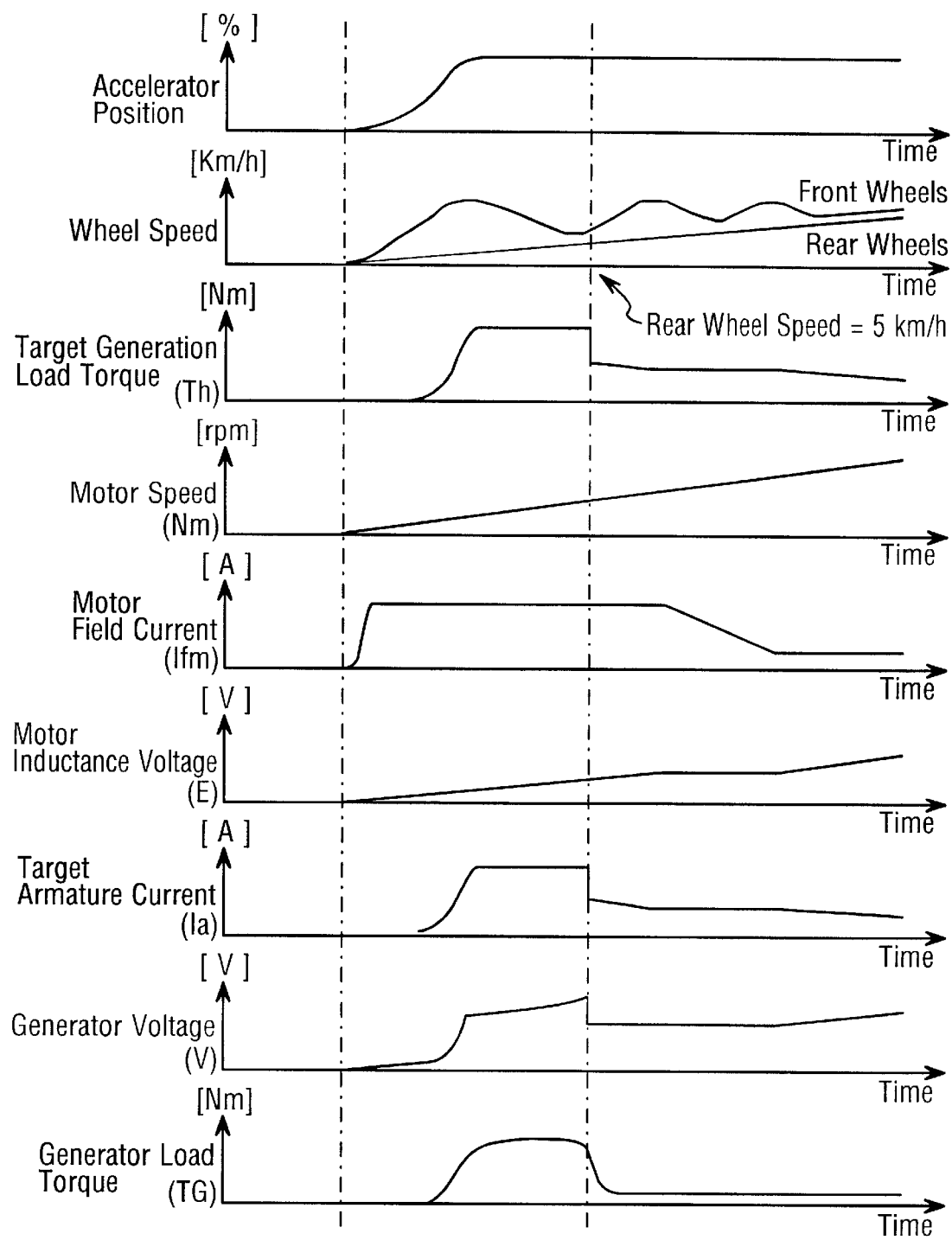
FIG. 13 shows exemplary time charts for another surplus torque converting section for the vehicle driving force control apparatus of the first embodiment of the present invention.

FIG. 13 a time chart for a case where the load torque of the generator 7 is output-controlled even when in a low speed state at or below a prescribed speed. In this example, the low speed state at or below a prescribed speed is defined to be when the rear wheel speed is 5 km/h or less.

This embodiment demonstrates a case where, under certain conditions, the generator 7 is placed in a loaded state even when acceleration slippage is not occurring, but it is also acceptable to place the generator 7 in a loaded state only when acceleration slippage is occurring.

This embodiment furthermore demonstrates a case where the voltage generated by the generator 7 is used to drive the electric motor 4, thus achieving a four-wheel drive arrangement, but the invention is not limited to such an arrangement. It is also acceptable for the electrical power generated by the generator 7 to be supplied to another load device and consumed by the other load device.

This embodiment also describes using throttle control as the internal combustion engine output limiting device or section, but the invention is not limited to such a method. The output can be limited by using one or more of the following methods: retarding the ignition timing of the internal combustion engine, cutting the ignition, reducing or stopping the fuel, or throttle control.

Second Embodiment

Referring now to FIGS. 14–25, a driving force control apparatus in accordance with a second embodiment will now be explained. The basic construction of this embodiment is the same as that of the first embodiment, except that the surplus torque computing section 8E is different. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 14:
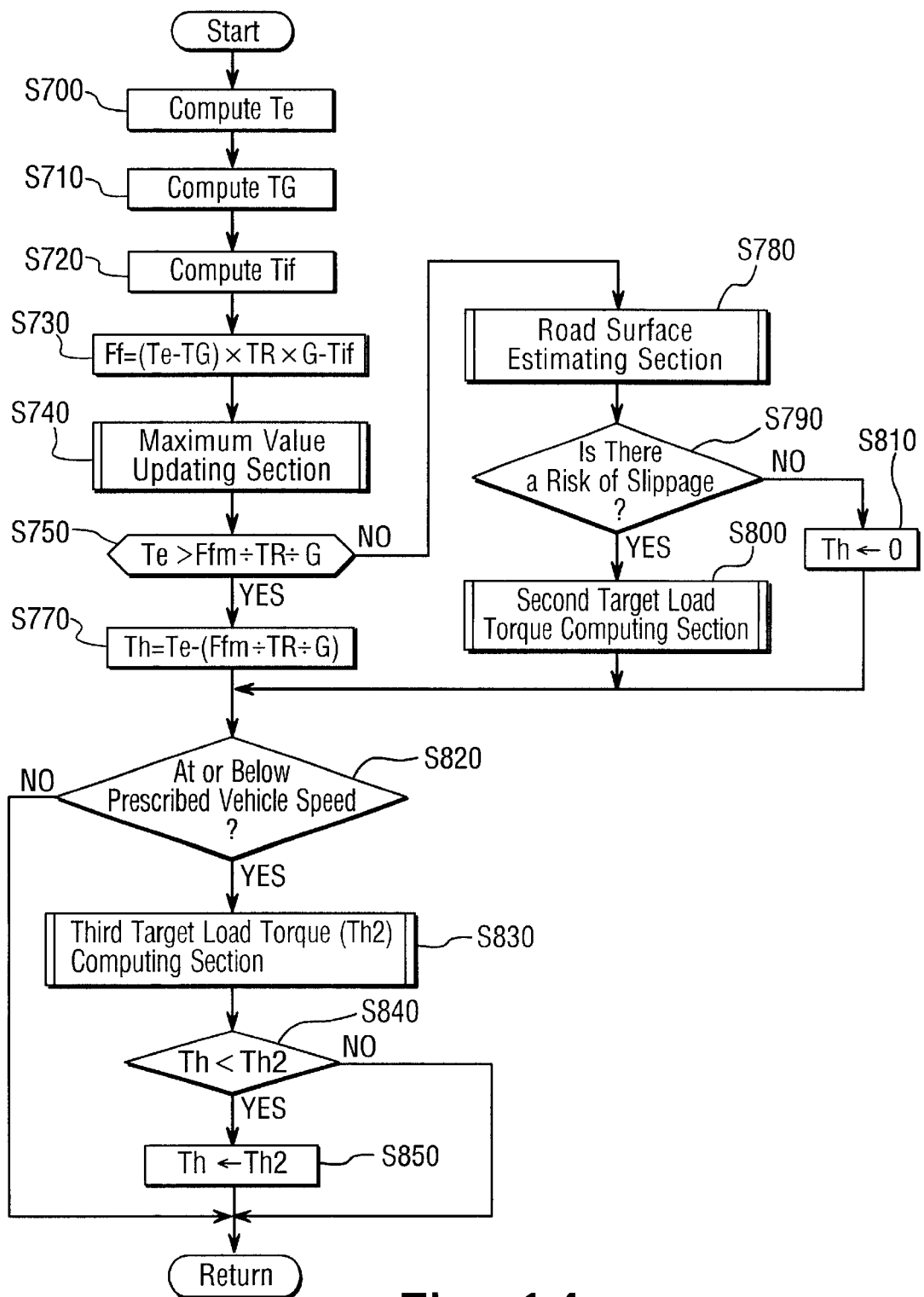
FIG. 14 is a flow chart showing the processing executed by the surplus torque computing section for the vehicle driving force control apparatus of the second embodiment of the present invention.

The processing executed by the surplus torque computing section 8E is shown in FIG. 14. The surplus torque computing section 8E includes a drive wheel limit torque computing section that is configured to compute a current road surface reaction force limit torque of the drive wheel. Basically, the surplus torque computing section 8E determines the surplus torque based on a difference between the current road surface reaction force limit torque computed by the drive wheel limit torque computing section (step S730) and the drive torque transferred from the internal combustion engine (2) to the drive wheels 1L and 1R.

Figure 15:
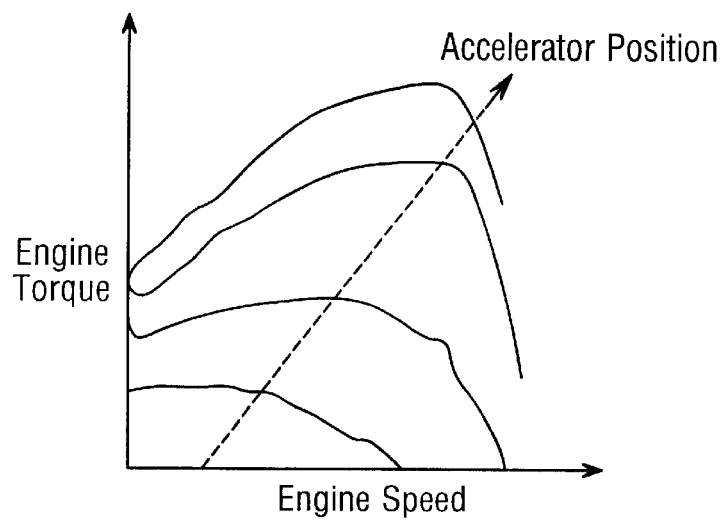
FIG. 15 is an example of an engine output torque characteristic map for in computing the engine output torque based on signals from the engine speed sensor and a throttle sensor.

First, in step S700, the output torque Te of the engine 2 is computed based on signals from the engine speed sensor 21 and a throttle sensor using, for example, a map like that shown in FIG. 15. Then, processing proceeds to step S710.

In step S710, the current torque TG of the generator 7 is computed based on the voltage V of the generator 7, the armature current Ia, and the rotational speed Nh of the generator 7 in the same manner as in step S40 of the previous embodiment. Then processing proceeds to step S720.

In step S720, the drive train acceleration torque Tif is computed using the equation shown below. Then processing proceeds to step S730.

Tif=(drive train inertia [including gear ratio])×angular acceleration In this embodiment, the angular acceleration is found based on the wheel speed of the front wheels 1L and 1R.

In step S730, the equation Ff=(Te−TG)×TR×G−Tif is used to calculate the road surface reaction force Ff of front wheels 1L and 1R, where Tr is the torque converter multiplication ratio and G is the gear ratio of transmission. In this equation, the output torque Te of the engine 2 is multiplied by TR×G in order to convert it to the driving torque transferred to the front wheels 1L and 1R. Naturally, the TG is zero when the generator 7 is not operating. After this calculation, processing proceeds to step S740.

The target torque limiting section 8F includes a limit torque calculating section that is configured to repeatedly calculate the road surface reaction force limit torque of the main drive wheel 1L and 1R. The limit torque maximum value updating section 63 is configured to compare the road surface reaction force limit torque and a predetermined limit torque. The limit torque maximum value updating section 63 set the larger of the current road surface reaction force limit torque and the predetermined limit torque as a maximum limit torque value, and set the maximum limit torque value as a road surface reaction force limit torque value. The limit torque reset section 67 is configured to start upon determining that a driving force of the subordinate drive wheels 3L and 3R should be increased, and resets the maximum limit torque value to an updated maximum limit torque value. The limit torque reset section 67 is further configured to determines that the driving force of the subordinate drive wheel 3L and 3R should be increased when a speed differential occurs between the front and rear wheels that is greater than or equal to a prescribed value (see step S820). The limit torque reset section 67 resets the maximum limit torque value to a prescribed value only when the current road surface reaction force limit torque is smaller than a previous road surface reaction force limit torque. The limit torque reset section 67 also resets the maximum limit torque value to the predetermined maximum limit torque when the vehicle is stopped. The predetermined maximum limit torque is the current road surface reaction force limit torque calculated by the limit torque calculating section.

In step S740, the maximum value updating section 63 starts and updates the maximum value of the road surface reaction force. Then, processing proceeds to step S750.

In step S750, the equation Te>Ffm÷TR÷G is used to determine if there is any surplus torque in the engine torque Te. If there is no surplus in the engine torque Te, i.e., the output torque Te is smaller, then processing proceeds to step S780. Conversely, if there is a surplus in torque Te, i.e., the output torque Te is larger, then processing proceeds to step S770.

In step S770, the equation Th=Te−(Ffm÷TR÷G) is used to calculate the surplus torque, i.e., the target generation load torque Th, which is the portion of the engine torque Te that is in excess of the maximum road surface reaction force limit torque Ffm of the front wheels 1L and 1R.

In this embodiment, steps S700 to S750 constitute a main drive wheel estimating device or section, with step S770 constituting a surplus torque computing device or section, and step S730 constituting a main drive wheel limit torque computing device or section.

Meanwhile, if in step S750, the control program determines that the main drive wheels 1L, and 1R are not experiencing acceleration slippage, then processing proceeds to step S780, in which road surface estimating section 60 starts and estimates if the road surface is such that there is the apprehension of acceleration slippage occurring. Then, processing proceeds to step S790.

In step S790, processing is directed to step S800 if the control program determines that the road surface is such that there is the apprehension of acceleration slippage based on the estimation executed by road surface estimating section 60. Otherwise, if the control program determines that the road surface does not pose the apprehension of acceleration slippage, processing is directed to step S810, in which processing is directed to step S820 after zero is assigned as the target generation load torque Th.

In step S800, the second target load torque computing device or section starts and finds the target generation load torque Th for making the drive torque of the subordinate drive wheels 3L and 3R the required value. Then, processing proceeds to step S820.

In step S820, the control program determines whether or not the vehicle speed is at or below a prescribed vehicle speed, e.g., at or below 5 km. If the control program determines that the vehicle speed is at or below the prescribed speed, then processing proceeds to step S830. If the vehicle speed is determined to be faster than the prescribed speed, processing ends and returns to the beginning of the control program to repeat the control program after a prescribed sampling time cycle has expired.

In step S830, the third load torque calculating section starts and finds second generation load torque Th2. Then, processing proceeds to step S840.

In step S840, the target generation load torque Th (which corresponds to the acceleration slippage) and the second target generation load torque Th2 are compared. If the second target generation load torque Th2 is determined to be larger, then processing proceeds to step S850, where the value of Th2 is assigned to Th and then processing returns to the beginning of the control program to repeat the control program after a prescribed sampling time cycle has expired. If the second target generation load torque is not larger, then processing ends and returns to the beginning of the control program to repeat the control program after a prescribed sampling time cycle has expired.

In this embodiment, the larger of target generation load torque Th (which corresponds to the acceleration slippage) and the second target generation load torque Th2 (which is based on a low speed condition at or below a prescribed speed) is selected, but it is also acceptable to assign the value of second target generation load torque Th2 to target generation load torque Th unconditionally when under low speed conditions at or below a prescribed speed.

Figure 16:
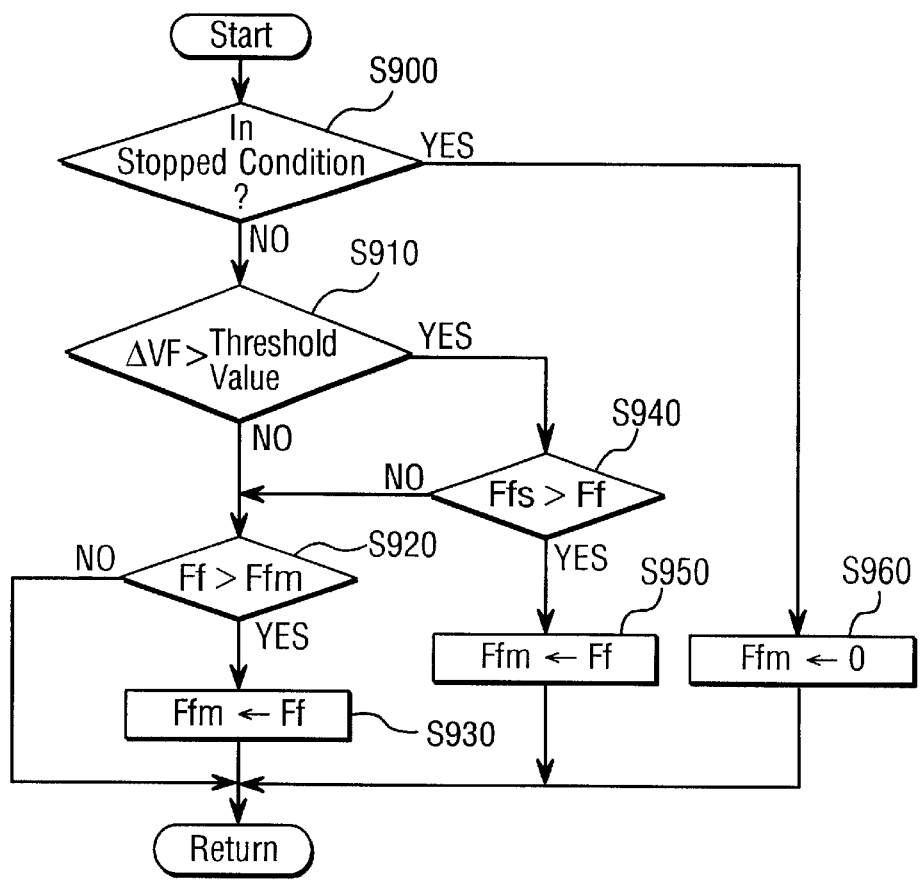
FIG. 16 is a flow chart showing the processing executed by the maximum value updating section for the vehicle driving force control apparatus of the second embodiment of the present invention.

Next, the processing executed by the maximum value processing section 63 will be explained in reference to FIG. 16. First, in step S900, the control program determines if the speed of the subordinate drive wheels is less than or equal to a prescribed threshold value, i.e., if the vehicle is substantially in a stopped condition. If the control program determines that the vehicle is in a stopped condition, then processing proceeds to step S960 where zero is assigned to the maximum limit torque Ffm, i.e., maximum limit torque Ffm is reset. Conversely, if the control program determines that the vehicle is not in a stopped state, then processing proceeds to step S910.

In step S910, the speed difference $\Delta$VF between the front and rear wheels is found. If speed difference $\Delta$VF is determined to be greater than or equal to a prescribed threshold value, then acceleration slippage is actually occurring and processing proceeds to step S940. Meanwhile, if the speed difference is below the prescribed threshold value, i.e., if the control program determines that acceleration slippage is not occurring, then processing proceeds to step S920, where maximum value updating processing is executed. The prescribed threshold value is a value with enough leeway that error does not occur during turning or the like.

In step S920, the present (the current) road surface reaction torque Ff and the maximum limit torque Ffm are compared. If the present road surface reaction torque Ff is larger, then processing proceeds to step S930. Otherwise, processing ends and returns to the beginning of the control program to repeat the control program after a prescribed sampling time cycle has expired.

In step S930, the maximum limit torque Ffm is updated to the present (current) road surface reaction torque Ff.

In step S940, the once previous (i.e., previously computed) road surface reaction force Ffs is compared with the road surface reaction torque Ff. If the road surface reaction torque Ff is smaller, then processing proceeds to step S950. Otherwise, processing moves to step S920 without resetting the maximum limit torque.

In step S950, the maximum limit torque Ffm is reset to the current road surface reaction torque Ff.

Next, the operation of the apparatus of this second embodiment will be explained. In this embodiment, the actual acceleration slippage (i.e., the speed difference $\Delta$V between front and rear wheels) of front wheels 1L and 1R is not detected directly. Rather, when the output torque Te of the engine 2 exceeds the road surface reaction force limit torque Ff, the excess portion of the output torque Te of the engine 2 is absorbed by the generator 7. As a result, acceleration slippage of the front wheels 1L and 1R is suppressed and a similar operational effect to that of the first embodiment is achieved.

Unlike the first embodiment, in the second embodiment, the generator 7 generates power and the generation load is produced so long as the output torque Te of the engine 2 exceeds the road surface reaction force limit torque Ff of the main drive wheels 1L and 1R, even if the actual speed difference $\Delta$V between the front and rear wheels is zero.

If, as in the first embodiment, the load of the generator 7 is controlled using the speed difference $\Delta$V between the front and rear wheels, when speed difference $\Delta$V is close to zero hunting will occur and there is the danger that vibration will be worsened and the ride will be degraded. Since the speed difference $\Delta$V does not converge to zero, the front wheels 1L and 1R will continue to have a small amount of acceleration slippage and there is the apprehension that the vehicle behaviour will become unstable.

Conversely, in the second embodiment, even if the actual speed difference $\Delta$V between the front and rear wheels is zero, the generator 7 generates power so long as the output torque Te of the engine 2 exceeds the road surface reaction force limit torque Ff of the main drive wheels 1L and 1R. Therefore, the aforementioned hunting is suppressed and unforeseen vibrations can be prevented. Also, the speed difference $\Delta$V between the front and rear wheels can be made to converge to zero in a stable manner.

Figure 17:
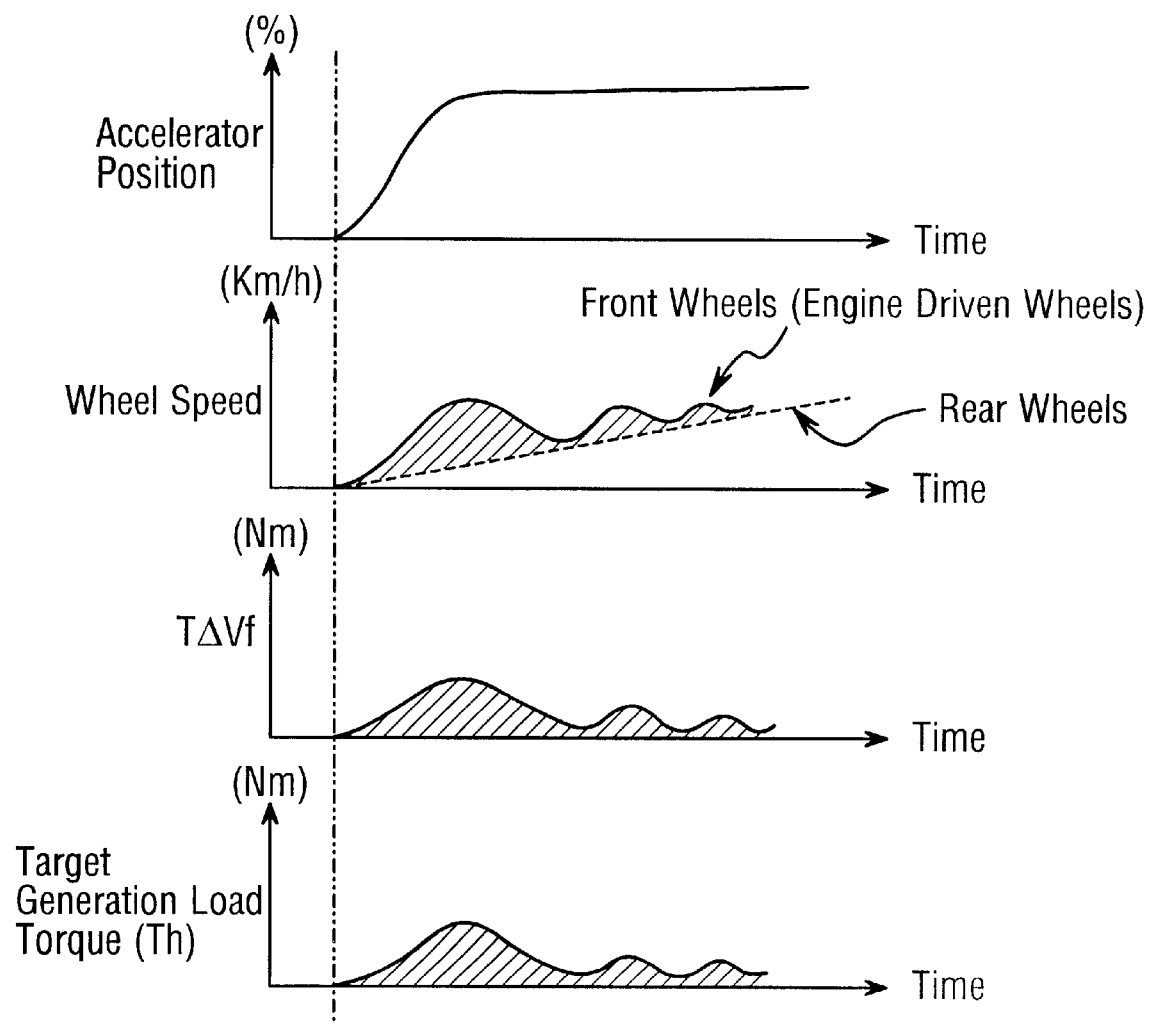
FIG. 17 shows exemplary time charts based on the vehicle driving force control apparatus of the first embodiment of the present invention.

FIG. 17 shows a time chart illustrating the behaviour of the first embodiment. Hunting occurs easily because the torque absorbed by the generator 7 is computed to a size that is proportional to the change in the slippage speed $\Delta$VF of the front wheels 1L and 1R. In particular, as the gain K1 is increased, the response improves but hunting occurs more easily. It is also acceptable to use the PI control or the PID control based on the temporal changes in the slippage speed $\Delta$VF.

Figure 18:
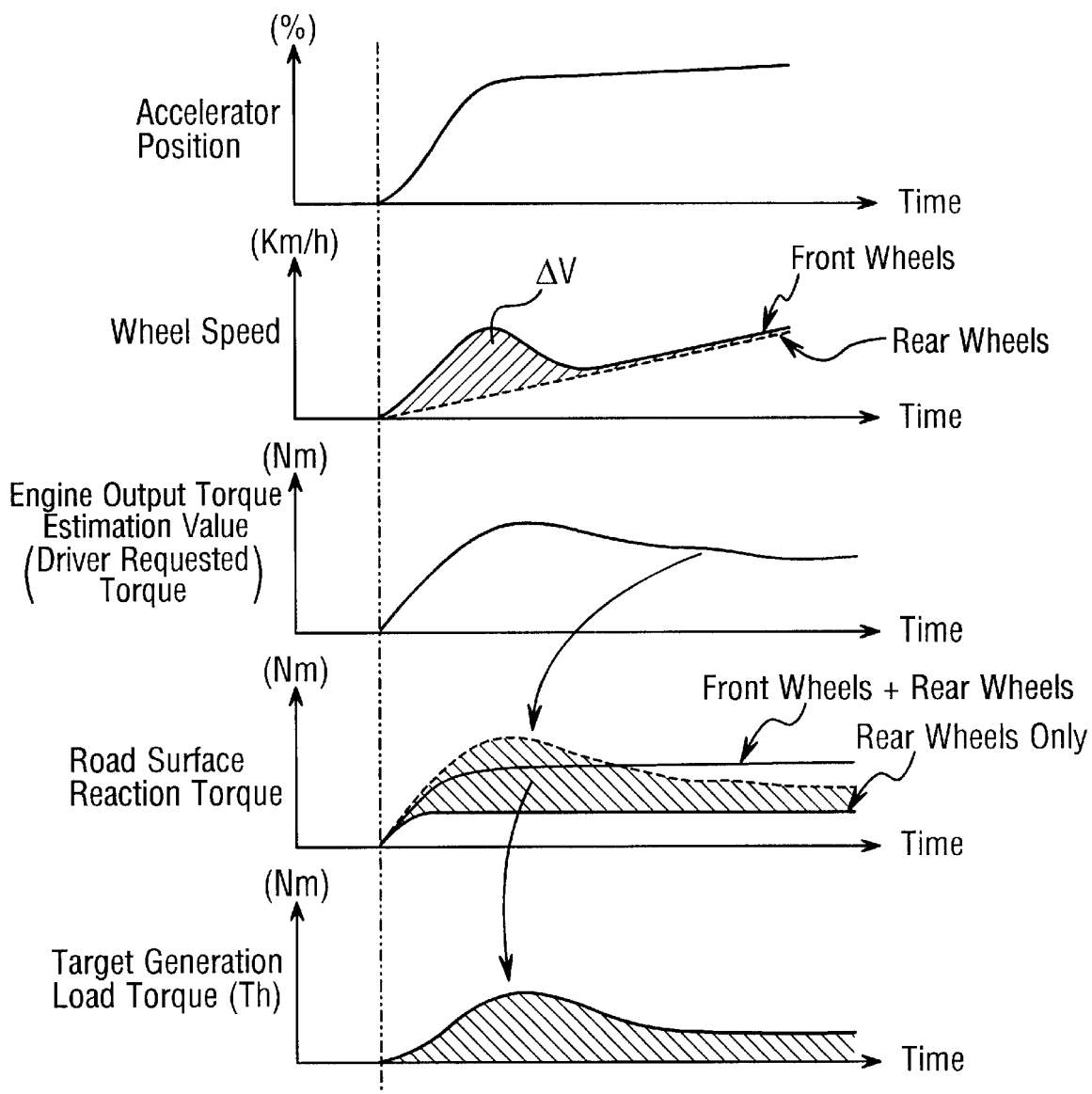
FIG. 18 shows exemplary time charts based on the vehicle driving force control apparatus of the second embodiment of the present invention.

Conversely, FIG. 18 shows a time chart illustrating the behavior of the second embodiment. Even if the actual wheel speed difference goes to zero, there is an estimation value for the portion of the output torque of the engine 2 that exceeds the road surface reaction force limit torque. Therefore, the control program determines that there is a torque to be absorbed by the generator 7. As a result, the wheel speed difference converges readily without the occurrence of hunting.

In this second embodiment, when the vehicle starts and begins to travel, the output torque requested of the vehicle will gradually decrease due to gear shifting and the decrease in the torque multiplication ratio of the torque converter. Consequently, unless the road surface conditions change greatly, the output torque of subordinate drive wheels 3L and 3R will not be particularly necessary. By updating the maximum value as is done in this embodiment, excessive output torque from the subordinate drive wheels 3L and 3R is eliminated and energy losses can be reduced. This arrangement is also preferable in view of the service life of the electric motor 4 because it does not require frequent starting and stopping of the electric motor 4.

Figure 19:
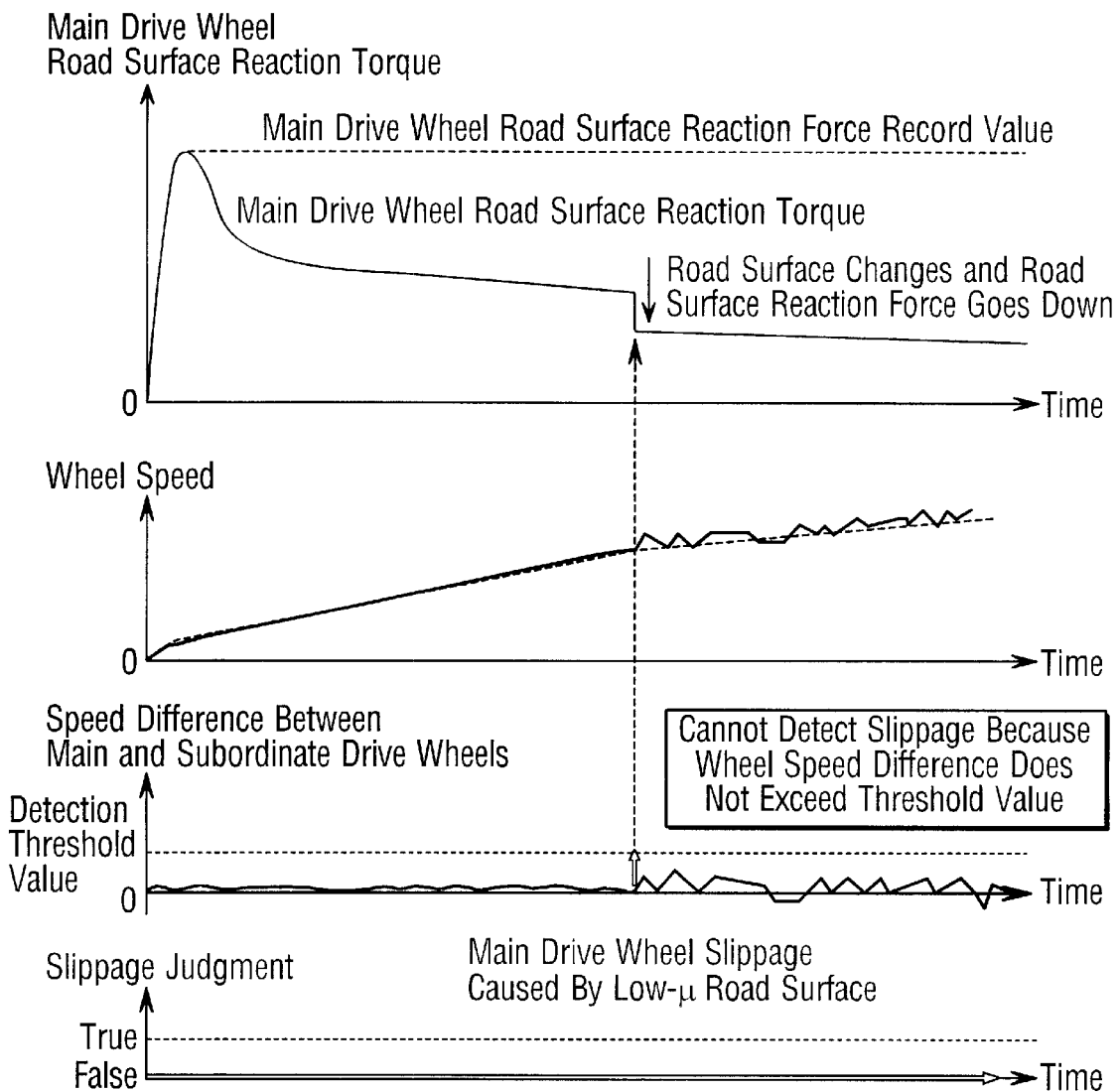
FIG. 19 shows exemplary time charts for a case where the maximum torque limit value is not updated.
Figure 20:
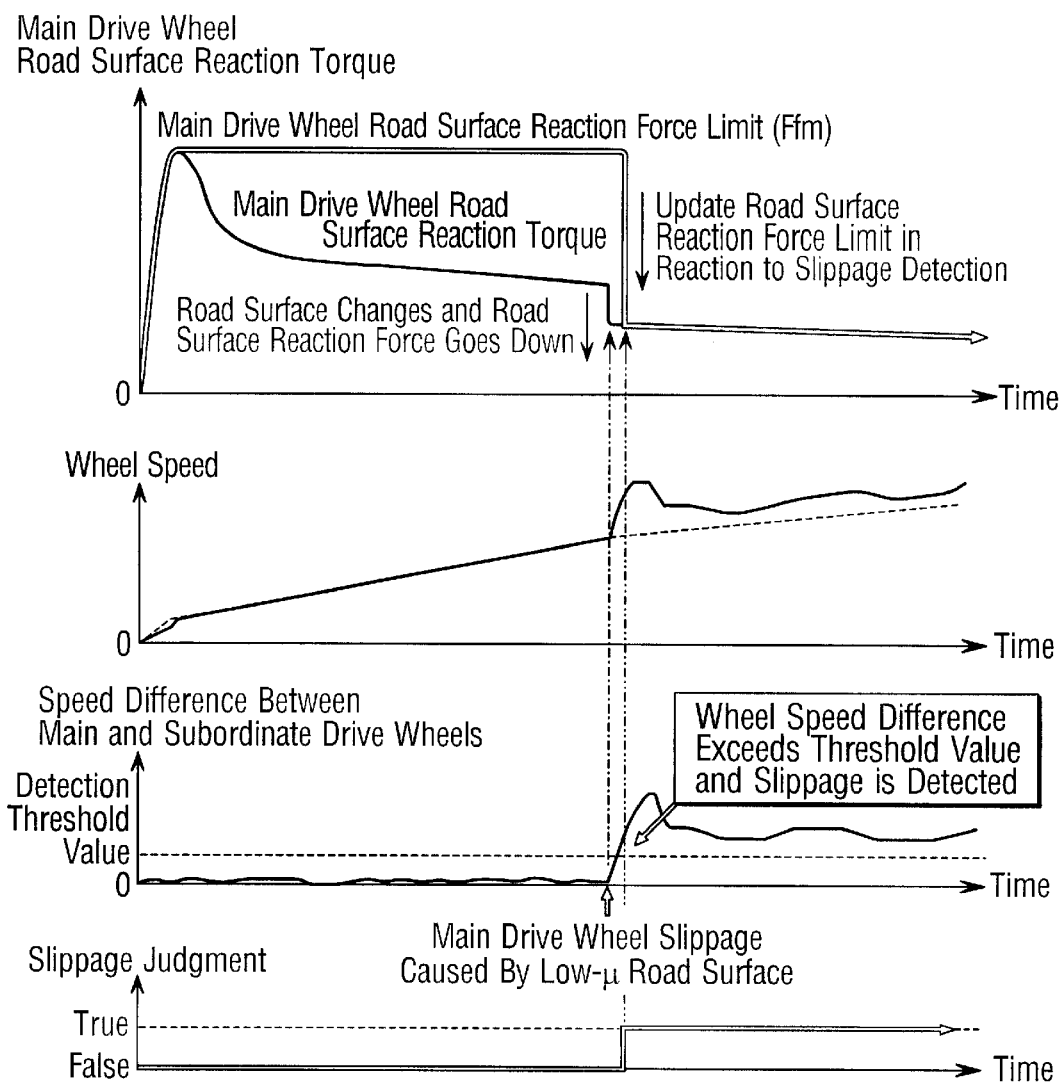
FIG. 20 shows exemplary time charts for a case where the maximum torque limit value is updated.

Meanwhile, FIG. 19 shows a case where the maximum value updating of the road surface reaction force limit torque used for the aforementioned estimation is unconditionally continued. In this embodiment, acceleration slippage cannot be detected even when the road surface condition changes such that an increase in the driving torque of subordinate drive wheels 3L and 3R is necessary, such as when the road surface reaction force decreases due to travelling on a road surface with a low road surface friction coefficient $\mu$. Conversely, in the present embodiment, the maximum limit torque Ffm (which was being updated) is reset when the control program determines that the conditions require increasing the drive torque of the subordinate wheels 3L and 3R. Thus, as shown in FIG. 20, even if maximum value updating is executed, the required driving performance can be ensured by producing the drive torque at the subordinate wheels 3L and 3R to an appropriate degree. FIG. 20 illustrates a case where the reset determination is based on whether nor not the actual wheel speed difference $\Delta$VF exceeds a prescribed threshold value.

Furthermore, since the subordinate drive wheels 3L and 3R are producing driving torque (there is a generation load), the maximum limit torque, which serves as a reference, decreases even when the maximum value updating is reset. As a result, the driving torque of the subordinate drive wheels 3L and 3R increases.

When the reset determination is conducted based on the actual speed difference ΔV between the main drive wheels 1L and 1R and the subordinate drive wheels 3L and 3R, it is necessary to use a threshold value that has a certain degree of leeway in order to prevent errors caused by wheel speed differences during turning. Therefore, even if the road surface has a low limit, the maximum limit torque Ffm will not be reset so long as slipping that exceeds the threshold value does not occur.

Figure 21:
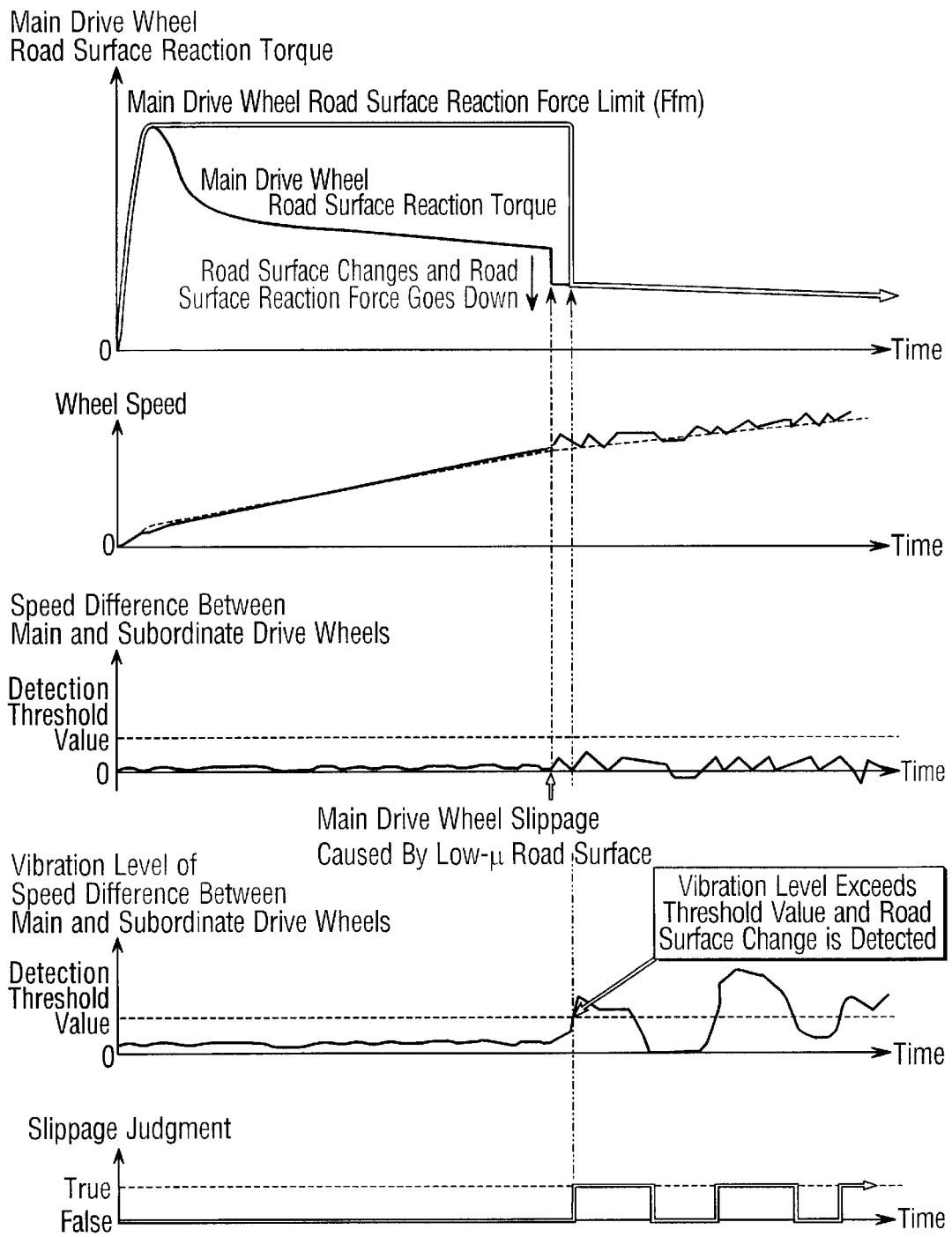
FIG. 21 shows alternative exemplary time charts for a case where the maximum torque limit value is updated.

Conversely, consider a case where the reset is conducted based on an estimation of a poor road or the wheel grip limit and changes in the road surface are detected by observing the frequency characteristic of the speed difference ΔV instead of detecting slippage directly from the speed difference ΔV. As shown in FIG. 21, even when the speed difference ΔV does not exceed the threshold value, it can be determined if the road surface is such that the driving force is required from the subordinate drive wheels 3L and 3R. Therefore, it is easier for the subordinate drive wheels 3L and 3R to output the driving torque before acceleration slippage occurs in cases where the conditions are such that acceleration slippage can occur easily.

Furthermore, by resetting when the road is poor, it is easier for the subordinate drive wheels 3L and 3R to output the driving torque while the vehicle is stable before acceleration slippage occurs and the poor road driving performance is improved.

When on an ascending road, the shift in weight tends to cause the weight distribution to be such that the weight born by the rear wheels increases and, consequently, acceleration slippage more readily occurs in the main drive wheels 1L and 1R. In short, such a road surface condition calls for increasing the driving force of the subordinate drive wheels 3L and 3R. Therefore, by resetting when it is estimated that the road is ascending, acceleration slippage of main drive wheels 1L and 1R can be appropriately suppressed because the main drive wheels 1L and 1R are the front wheels.

Furthermore, by resetting when the running resistance is large, e.g., when travelling on sandy terrain or a snowy road, acceleration slippage of the main drive wheels 1L and 1R is suppressed and the driving performance is improved by being in a four-wheel drive state.

Figure 22:
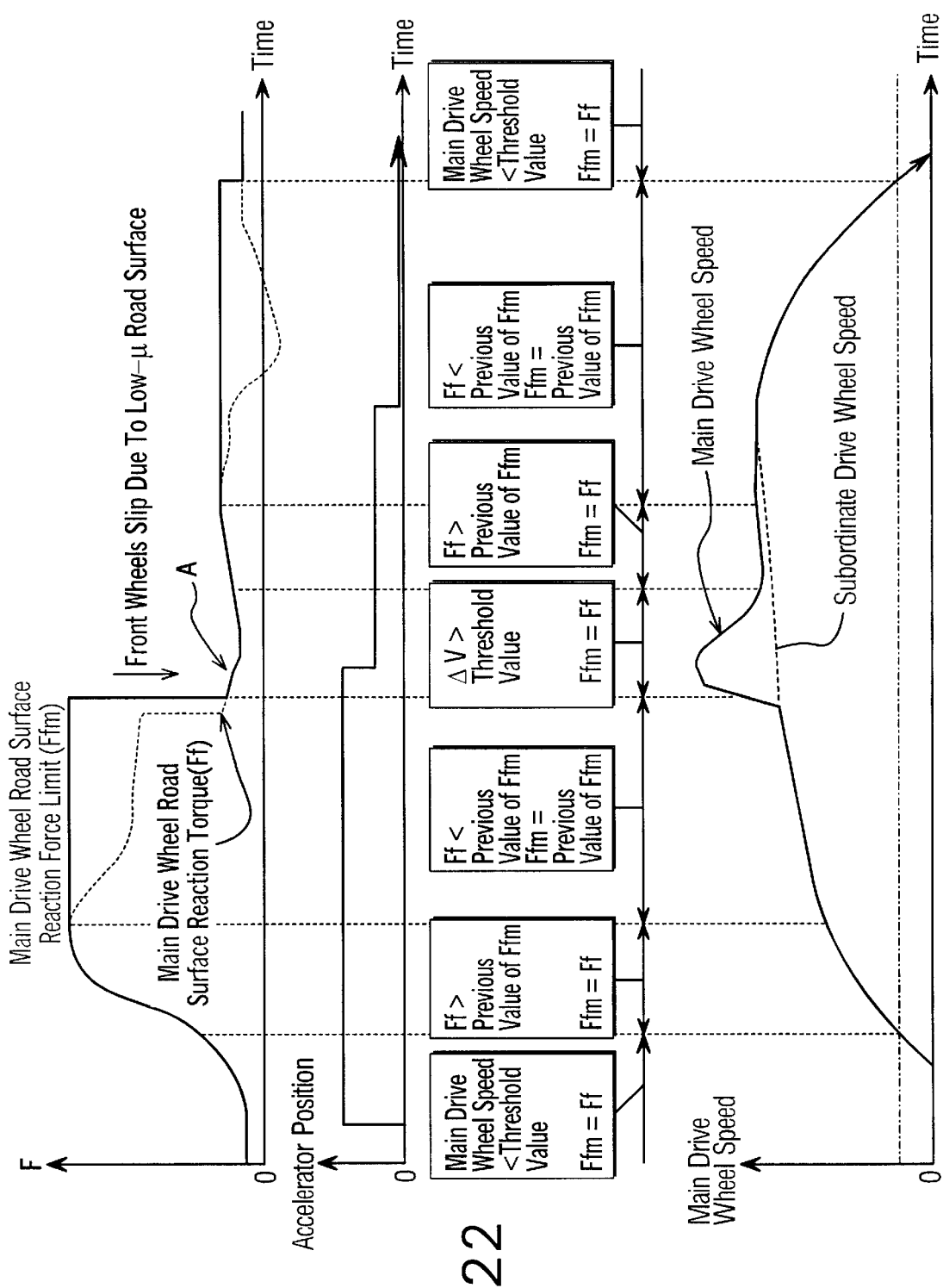
FIG. 22 shows exemplary time charts for resetting the maximum torque limit value update.

In this second embodiment, as indicated by A in FIG. 22, cases of resetting unnecessarily in accordance with a change in the road condition can be reduced by resetting only in cases where the road surface reaction force limit torque grows smaller as the vehicle travels.

In view of the fact that acceleration slippage occurs readily when the vehicle is starting to move, acceleration slippage of main drive wheels 1L and 1R when the vehicle is starting to move can be appropriately suppressed by resetting when the vehicle is stopped.

In this second embodiment, acceleration slippage can be suppressed appropriately in accordance with the current road condition because the maximum limit torque is reset to the current (actual) road surface reaction force limit torque Ff at the time of resetting. However, the invention is not limited to resetting maximum limit torque Ffm to the current value. For example, it is also acceptable to prepare a plurality of pre-set values and select a pre-set value based on the current road surface.

Figure 23:
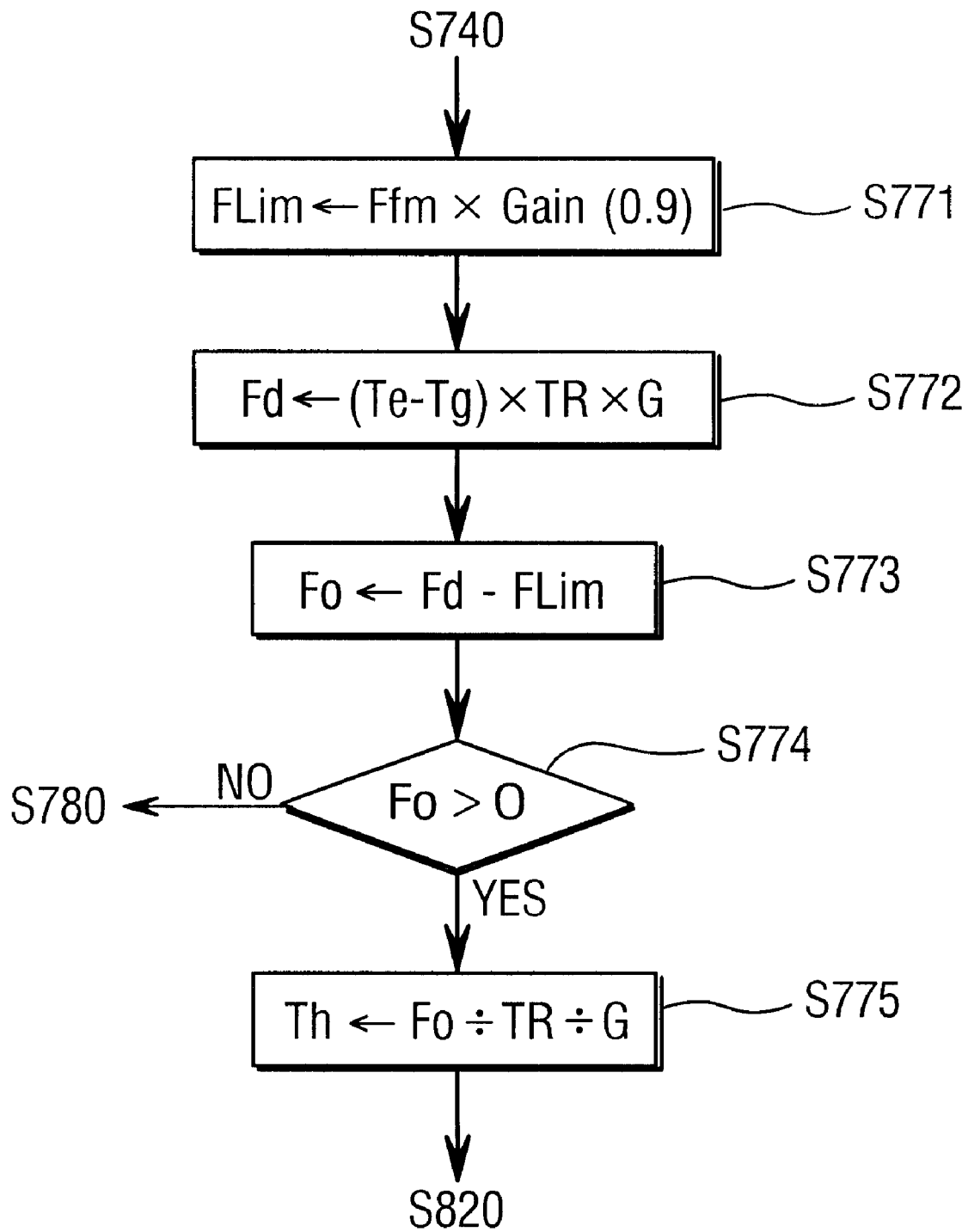
FIG. 23 is a flow chart used for explaining a variation of the processing executed by the surplus torque computing section of the second embodiment of the present invention.
Figure 24:
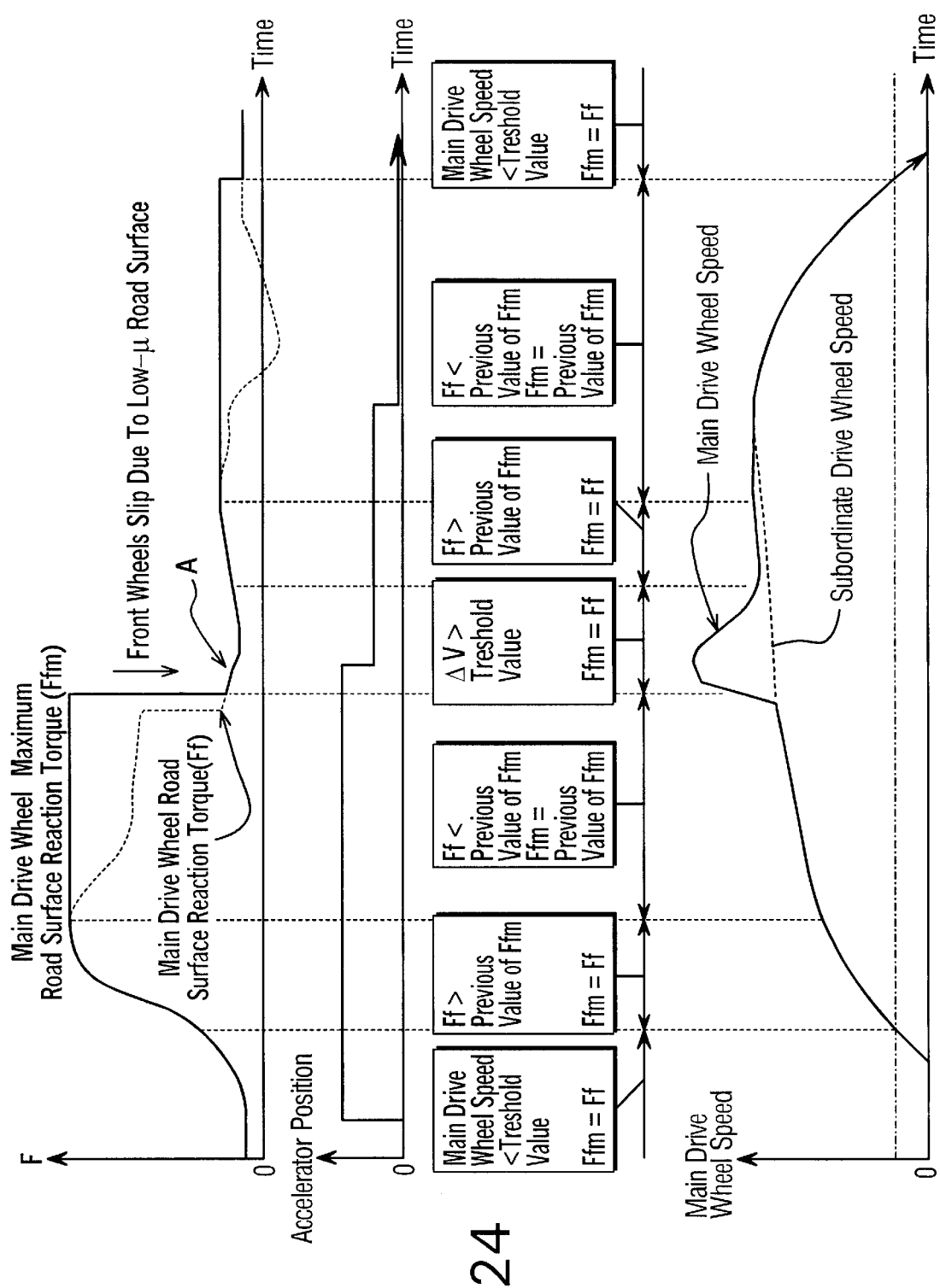
FIG. 24 shows exemplary time charts illustrating an example of the maximum limit torque computation.
Figure 25:
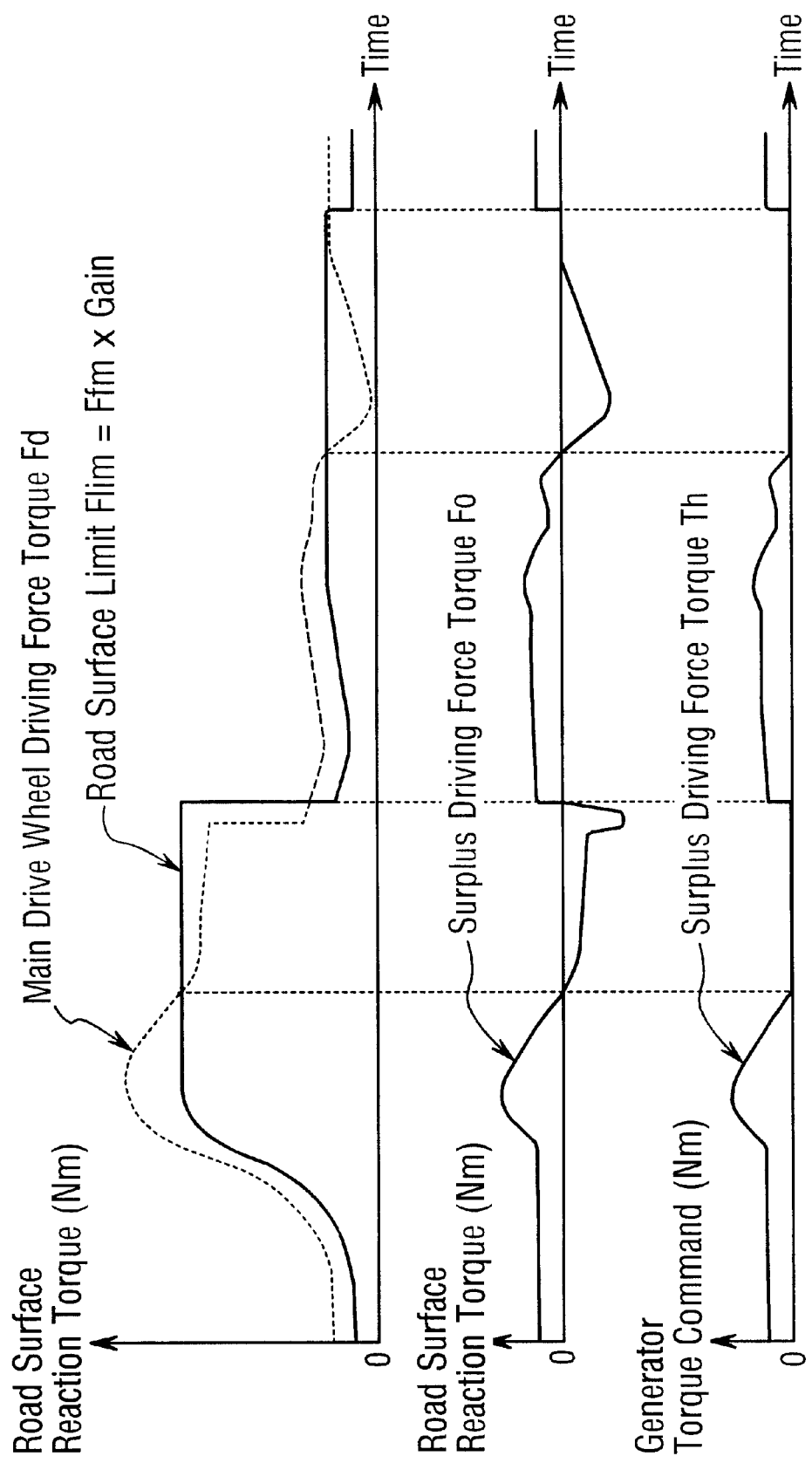
FIG. 25 shows exemplary time charts illustrating an example of the generation load torque computation.

Also, the processing executed by the surplus torque computing section 8E in steps S750 and S770 can be replaced by a computation of the motor torque or the drive torque of subordinate drive wheels 3L and 3R. For example, as shown in FIG. 23, steps S750 and S770 might be replaced by steps S771 to S775. In step S771, the maximum road surface limit torque Ffm is multiplied by the gain (0.9) to calculate Flim; in step S772, the driving torque Fd of main drive wheels 1L and 1R is calculated; and in step S773 the surplus torque is calculated. At step S774, processing proceeds to the aforementioned step S780 of there is no surplus torque. If there is a surplus torque, processing proceeds to step S775, where the generation load torque Th is calculated and then processing proceeds to step S820. An example of the maximum limit torque Ffm computation performed in this processing is shown in FIG. 24 and an example of the generation load torque computation is shown in FIG. 25. With this processing, the maximum limit torque Ffm can be provided with some leeway. In FIG. 25, the crosshatching indicates the corresponding the subordinate drive wheel torque.

Third Embodiment

Figure 26:
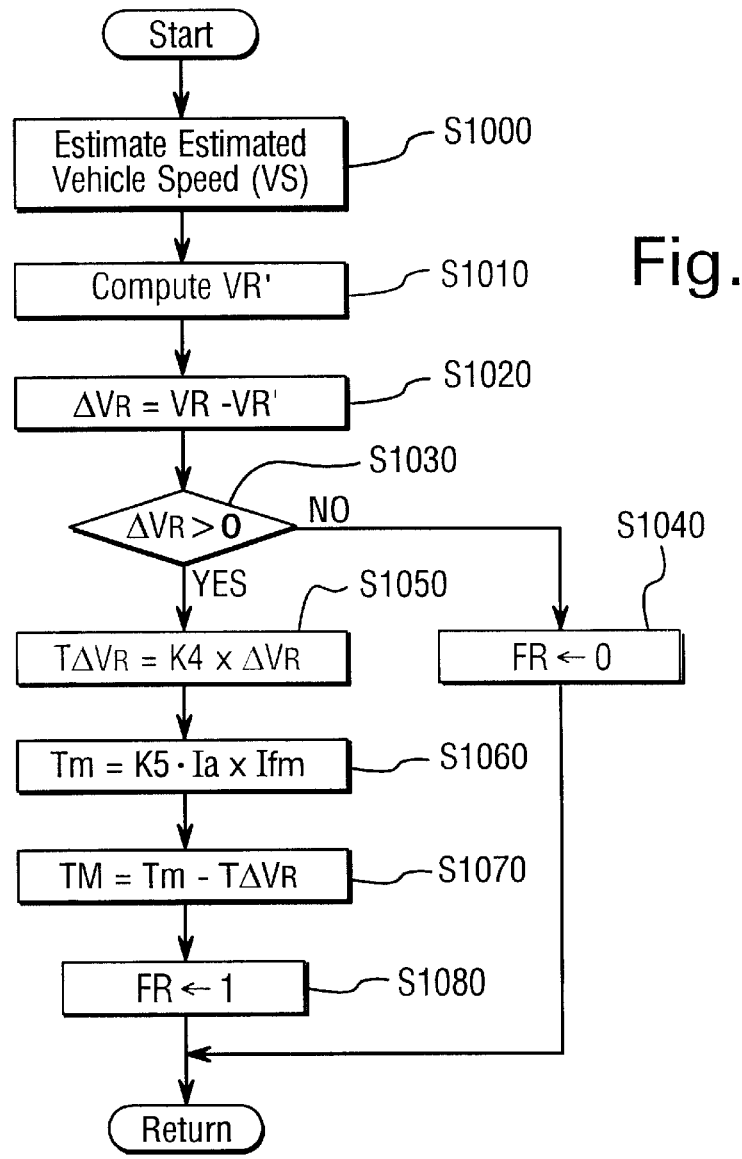
FIG. 26 is a flow chart showing the processing executed by the motor torque limit computing section for the vehicle driving force control apparatus of the third embodiment of the present invention.
Figure 27:
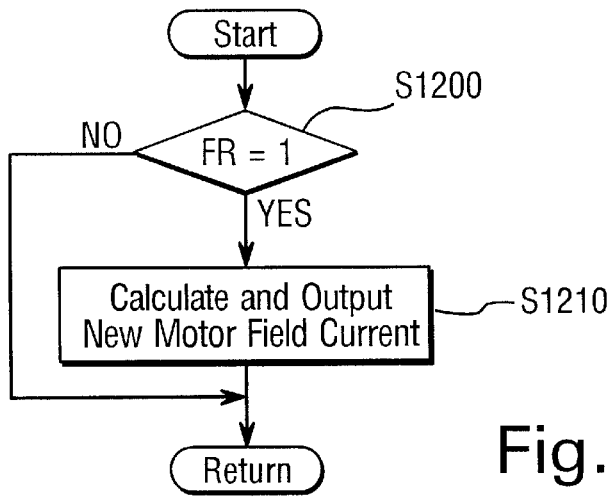
FIG. 27 is a flow chart showing the processing executed by the field current converting for the vehicle driving force control apparatus of the third embodiment of the present invention.

Referring now to FIGS. 26 and 27, a driving force control apparatus in accordance with a third embodiment will now be explained. The basic construction of this embodiment is the same as that of the first embodiment, except that the 4WD controller 8 is provided with a motor torque limit computing section 8H and a field current converting section 8J. In view of the similarity between the first and third embodiments, the parts of the third embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity The motor torque limit computing section 8H is accessed after the processing executed by the aforementioned surplus torque converting section 8G is completed, and field current converting section 8J is accessed after the processing executed by the motor torque limit computing section 8H is completed.

The processing executed by the motor torque limit computing section 8H is illustrated in FIG. 26. First, in step 1000, the estimated vehicle speed VS is estimated and then processing proceeds to step S1010. The estimated vehicle speed VS can be estimated by using, for example, the detection value of a longitudinal G sensor.

In step S1010, the rear wheel speed VR' for a case where acceleration slippage of the rear wheels 3L and 3R is assumed not be occurring is calculated based on the estimated vehicle speed VS, the tire diameter, etc. Then, processing proceeds to step S1020.

In step S1020, the wheel speed VR of the rear wheels 3L and 3R are received from the wheel speed sensors 27RL and 27RR of the rear wheels 3L and 3R and the equation ΔVR=VR−VR' is used to calculate the acceleration slippage magnitude ΔVR for the rear wheels 3L and 3R. The wheel speed VR is the average value for the left and right wheels. Then, processing proceeds to step S1030.

In step S1030, the acceleration slippage magnitude ΔVR is used to determine whether or not the rear wheels 3L and 3R are experiencing acceleration slippage. If the control program determines that the acceleration slippage magnitude ΔVR is less than or equal to a prescribed value (e.g., the acceleration slippage magnitude ΔVR is less than or equal to 0), i.e., if the control program determines that the rear wheels 3L and 3R are not experiencing acceleration slippage, then processing proceeds to step S1040 where 0 is assigned to flag FR.

On the other hand, if the acceleration slippage magnitude ΔVR is determined to be larger than 0 in step S1030, i.e., if the rear wheels 3L and 3R are determined to be experiencing acceleration slippage, then processing proceeds to step S1050.

In step S1050, the limiting torque TΔVR corresponding to the acceleration slippage magnitude ΔVR of the rear wheels 3L and 3R is computed using the equation TΔVR=K4ΔVR. Then, processing proceeds to step S1060.

In step S1060, the current motor torque Tm is computed using the equation Tm=K5×Ia×Ifm, where K4 and K5 are gain constants. Then processing proceeds to step S1070.

In step S1070, the target motor torque TM, which is limited by limiting torque TAVR, is found using the equation TM=Tm−TΔVR. Then processing proceeds to step S1080.

In step S1080, the flag FR is assigned 1, which indicates target motor torque TM has been calculated. Then, processing returns to the beginning of the control program to repeat the control program after a prescribed sampling time cycle has expired.

The field current converting section 8J executes the processing shown in FIG. 27. In step S1200, the control program determines whether or not the target motor torque TM has been computed. Processing proceeds to step S1210 if FR is 1, i.e., if the control program determines that the target motor torque TM has been changed. Meanwhile, processing returns directly to the beginning of the control program to repeat the control program after a prescribed sampling time cycle has expired, if FR is 0, i.e., if the control program determines that the target motor torque TM has not been changed.

In step S1210, the motor field current Ifm, which determines the target motor torque TM after changing, is calculated based on the rotational speed Nm of the electric motor 4, the armature current Ia, and the induction current E of the electric motor 4. The calculated motor field current Ifm is outputted to the motor control section 8C and the processing returns to the beginning of the control program to repeat the control program after a prescribed sampling time cycle has expired.

In this embodiment, steps S1000 to S1030 constitute a subordinate drive wheel slippage estimating device or section and steps S1040 to S1080, S1200, and S1210 constitute an electric motor torque limiting device or section.

In this embodiment, when acceleration slippage occurs in the rear wheels 3L and 3R (subordinate drive wheels), which are driven by the electric motor 4, the motor field current Ifm becomes smaller and the motor efficiency declines. As a result, the acceleration slippage of the rear wheels 3L and 3R is suppressed and the driving stability of the vehicle is improved further.

Instead of controlling the motor field current Ifm in accordance with the target motor torque TM, it is also acceptable to control the motor field current Ifm in direct correspondence to ΔVR such that ΔVR goes to zero or below.

Fourth Embodiment

Figure 28:
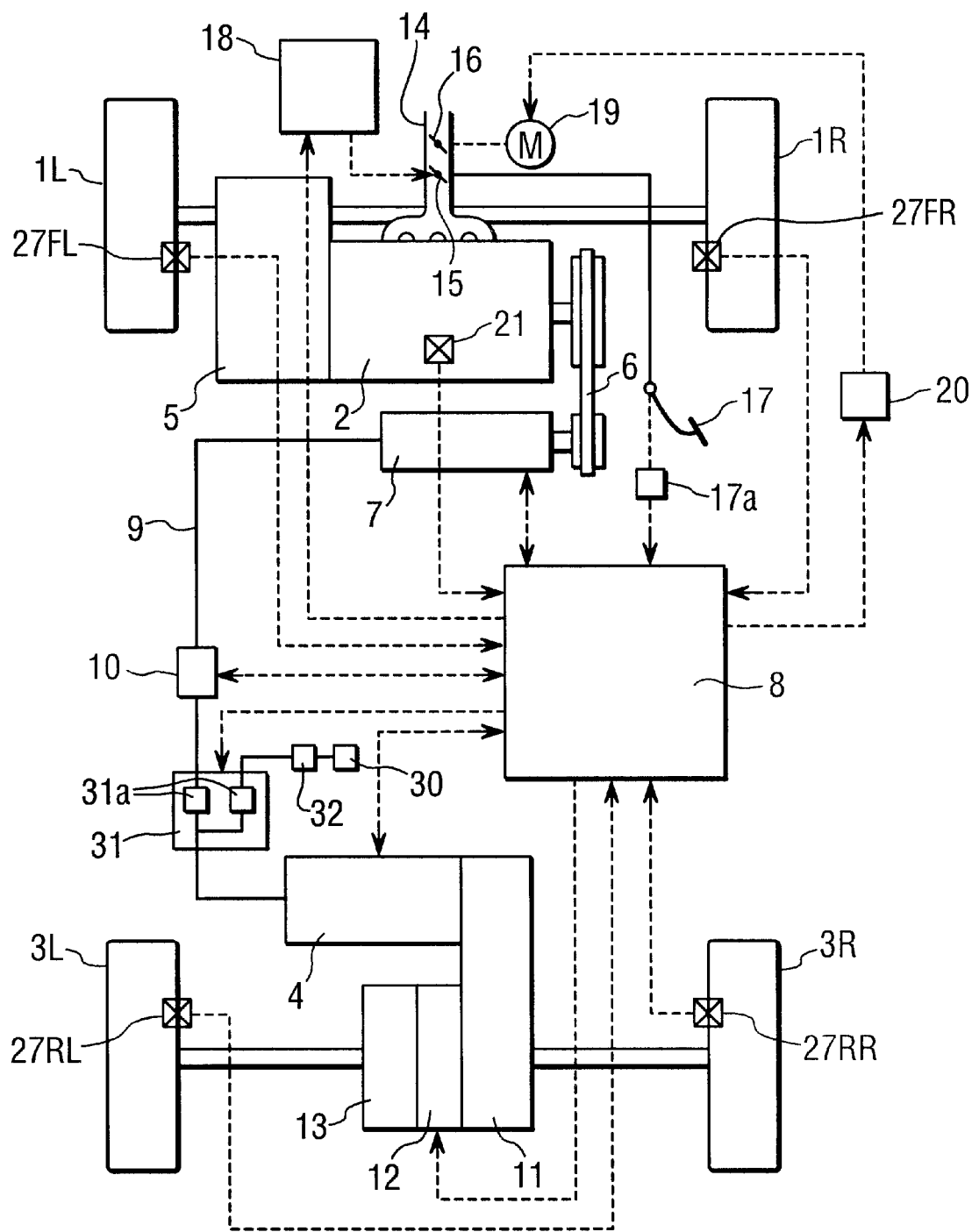
FIG. 28 is a schematic block diagram of a vehicle equipped with a vehicle driving force control apparatus in accordance with the fourth embodiment of the present invention.
Figure 29:
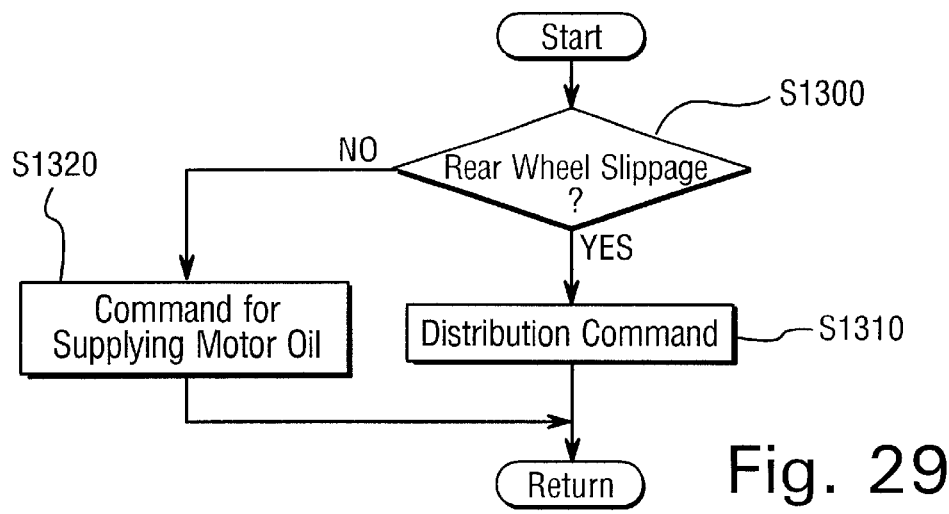
FIG. 29 is a flow chart showing the processing executed by the distributing device control section for the vehicle driving force control apparatus of the fourth embodiment of the present invention.

Referring now to FIGS. 28 and 29, a driving force control apparatus in accordance with a fourth embodiment will now be explained. The basic construction of this embodiment is the same as that of the first embodiment, except that as shown in FIG. 28, it is provided a battery 30 and an electrical power distributing device or section 31 that distributes a portion of the electrical power generated by the generator 7 to the battery 30. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Thus, in this embodiment, the electrical power distributing device 31 constitutes an electrical power distributing device or section that is disposed along the electrical line 9. The electrical power distributing device 31 is configured such that the distribution ratios with respect to the electric motor 4 and the battery 30 can be changed by adjusting the resistance value of the variable resistor 31a. The distribution ratio can be changed by a command from the 4WD controller 8. A voltage transformer 32 converts the voltage of the electrical power supplied thereto into a voltage that can be used to charge the battery 30 (e.g., converts 42 volts to 12 volts).

The 4WD controller 8 is equipped with a distributing device control section 8K that constitutes an electrical power distributing device or section. The distributing device control section 8K is accessed after the processing executed by motor torque limit computing section 8H or the processing executed by field current converting section 8J.

The processing executed by the distributing device control section 8K is as shown in FIG. 29. In step S1300, the control program determines whether or not the rear wheels 3L and 3R are experiencing acceleration slippage using speed sensors 27FL, 27FR, 27RL, 27RR. If the control program determines that the rear wheels 3L and 3R are not experiencing acceleration slippage, then processing proceeds to step S1320. If the control program determines that the rear wheels 3L and 3R are experiencing acceleration slippage, processing proceeds to step S1310.

In this embodiment, the determination of whether or not acceleration slippage is occurring can be accomplished based on the result of the processing executed in the aforementioned steps S1000 to S1020, which constitute a subordinate drive wheel slippage estimating device or section.

In step S1310, a command for distributing a portion of the voltage V generated by the generator 7 to the battery 30 at a predetermined distribution ratio is issued to the electrical power distributing device 31. The electrical power distributing device 31 is configured to distribute to the battery 30 a portion of the electrical power supplied to the electric motor 4 from the generator 7) when the subordinate drive wheel slippage estimating device or section determines that acceleration slippage is occurring in the subordinate drive wheels 3L and 3R. Then processing returns to the beginning of the control program to repeat the control program after a prescribed sampling time cycle has expired.

In step S1320, the supply of electrical power to the battery 30 is stopped and a command for supplying electrical power only to the motor is issued to the distributing device 31. Then processing returns to the beginning of the control program to repeat the control program after a prescribed sampling time cycle has expired.

Additionally, in step 1310, it is also acceptable to vary the distribution ratio of the distributing device 31 in accordance with the slippage rate so that the acceleration slippage of the rear wheels is suppressed.

When the slippage magnitude ΔVR is found based on the difference between the rear wheel speed VR and the wheel speed VR' calculated from the estimated vehicle speed VS, the equation shown below is used to calculate the aforementioned slippage rate A.

$$A = \frac{\Delta VR}{VR'}$$

When the presence or absence of acceleration slippage is determined by computing the surplus torque based on the road surface limit grip amount and the motor torque Tm, the slippage rate A is calculated as shown below.

$$A = \frac{\Delta Tm}{Tm}$$

In the present embodiment, when acceleration slippage occurs in the rear wheels 3L and 3R, the driving force of the rear wheels 3L and 3R is decreased by lowering the voltage supplied to the electric motor 4, which drives the rear wheels 3L and 3R. As a result, the acceleration slippage of the rear wheels 3L and 3R is suppressed and similar an operational effect to that of the previously described embodiment is achieved.

Since a portion of the voltage not supplied to the electric motor 4 is stored in the battery 30, the voltage not supplied to the electric motor 4 can be utilized effectively for another purpose.

Fifth Embodiment

Figure 30:
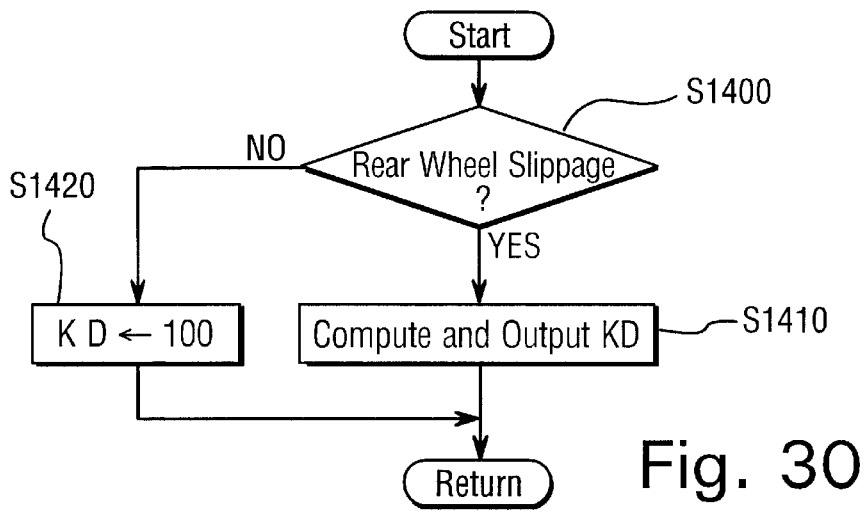
FIG. 30 is a flow chart showing the processing executed by the clutch control limiting section for the vehicle driving force control apparatus of the fifth embodiment of the present invention.

Referring now to FIG. 30, a driving force control apparatus in accordance with a fifth embodiment will now be explained. The basic construction of this embodiment is the same as that of the first embodiment, except that acceleration slippage of the rear wheels 3L and 3R is suppressed by providing a clutch control limiting section 8L that limits the torque transfer rate of the clutch 12. The clutch control limiting section 8L and the clutch 12 constitutes a clutch device or section. Clutch control limiting section 8L constitutes a transfer torque control device or section. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The processing executed by clutch control limiting section 8L is as shown in FIG. 30. In step S1400, the control program determines whether or not the rear wheels 3L and 3R are experiencing acceleration slippage using speed sensors 27FL, 27FR, 27RL, 27RR. If the control program determines that the rear wheels 3L and 3R are not experiencing acceleration slippage, then processing proceeds to step S1420. If the control program determines that the rear wheels 3L and 3R are experiencing acceleration slippage, then processing proceeds to step S1410.

In this embodiment, the determination of whether or not acceleration slippage is occurring can be accomplished based on the result of the processing executed in the aforementioned steps S1000 to S1030, which constitute a slippage condition detecting device or section.

In step S1410, the reducing torque corresponding to the acceleration slippage magnitude of the rear wheels 3L and 3R is computed. The reducing torque ΔTR or ΔTM and the current motor output torque are used to compute the maximum torque transfer rate of the clutch 12. After the maximum torque transfer rate KD is outputted to the clutch control section 8D, processing returns to the beginning of the control program to repeat the control program after a prescribed sampling time cycle has expired.

Meanwhile, in step S1420, the maximum torque transfer rate KD is assigned 100 (which indicates 100%). The maximum torque transfer rate KD is outputted to clutch control section 8D. Then processing returns to the beginning of the control program to repeat the control program after a prescribed sampling time cycle has expired.

The clutch control section 8D limits in such a manner that the upper limit of the torque transfer rate of the clutch 12 becomes the maximum torque transfer rate KD inputted from the clutch control limiting section 8L. Thus, in the present embodiment, when acceleration slippage occurs in the rear wheels 3L and 3R, the upper limit of the transfer rate for the driving force transferred to the rear wheels 3L and 3R from the clutch 12 is suppressed. Consequently, the driving force actually transferred to the rear wheels 3L and 3R decreases and the acceleration slippage of the rear wheels 3L and 3R is suppressed. As a result, an operational effect similar to those of the previously described embodiments is achieved.

Sixth Embodiment

Figure 31:
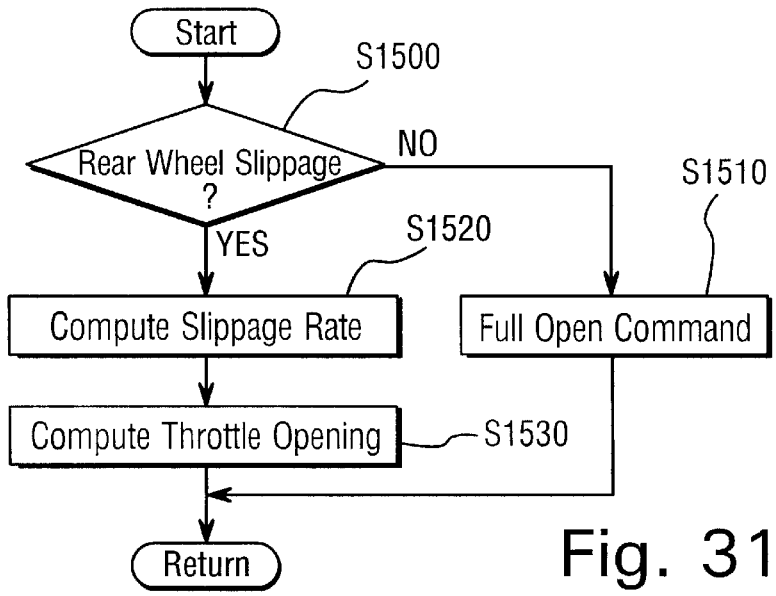
FIG. 31 is a flow chart showing the processing executed by the internal combustion engine output control section for the vehicle driving force control apparatus of the sixth embodiment of the present invention.

Referring now to FIG. 31, a driving force control apparatus in accordance with a sixth embodiment will now be explained. The basic construction of this embodiment is the same as that of the first embodiment, except that the 4WD controller 8 is equipped with an internal combustion engine output control section 8M. The internal combustion engine output control section 8M constitutes an internal combustion engine output control device or section. The internal combustion engine output control section 8M is accessed after the processing of motor torque limit computing section 8H or after the processing of field current converting section 8J in place of the aforementioned clutch control limiting section 8L and distributing device control section 8K. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The processing executed by internal combustion engine output control section 8M is as shown in FIG. 31. In step S1500, the control program determines whether or not the rear wheels 3L and 3R are experiencing acceleration slippage. If the control program determines that the rear wheels 3L and 3R are not experiencing acceleration slippage, then processing proceeds to step S1510. In S1510, a command for opening the throttle opening of the sub throttle valve 16 is issued to the motor controller 20 such that the throttle opening of the sub throttle valve 16 is greater than or equal to the opening of main throttle value 15. Then, processing returns to the beginning of the control program to repeat the control program after a prescribed sampling time cycle has expired. Meanwhile, if the control program determines that the rear wheels 3L and 3R are experiencing acceleration slippage, then the control program proceeds to step S1520.

In step S1520, the slippage rate of the rear wheels 3L and 3R is computed and processing proceeds to step S1530. When the slippage magnitude ΔVR is found based on the difference between the rear wheel speed VR and the wheel speed VR' calculated from the estimated vehicle speed VS, then the equation shown below is used to calculate the aforementioned slippage rate A.

$$A = \frac{\Delta VR}{VR'}$$

However, when the presence or absence of acceleration slippage is determined by computing the surplus torque based on the road surface limit grip amount and the motor torque Tm, the slippage rate A is calculated as shown below.

$$A = \frac{\Delta Tm}{Tm}$$

In step S1530, the throttle opening with respect to the closing direction corresponding to the magnitude of the acceleration slippage is computed. For example, the throttle opening is calculated using the equation θ=K6×A, where, K6 is a gain constant. Gain K6 can also be modified based on such factors as the difference between the previous slippage rate and the current slippage rate. A command for the computed opening is issued to the motor controller 20. Then processing returns to the beginning of the control program to repeat the control program after a prescribed sampling time cycle has expired.

In the present embodiment, the output of the engine 2 is controlled so as to decrease without relation to the driver's operation of the accelerator by adjusting the sub throttle 16 in the closing direction by an amount corresponding to slippage rate A, which is the slippage condition detection value for the rear wheels 3L and 3R. As a result, the generation load of the generator 7 becomes smaller, i.e., the driving torque transferred from the electric motor 4 to the rear wheels 3L and 3R becomes smaller, and the acceleration slippage of the rear wheels 3L and 3R is reduced and suppressed.

As a result, acceleration slippage of the rear wheels 3L and 3R, too, is suppressed and the driving stability improves. At the same time, the energy efficiency improves, which leads to improved fuel consumption, because the output torque of the engine 2 is suppressed.

Seventh Embodiment

Figure 32:
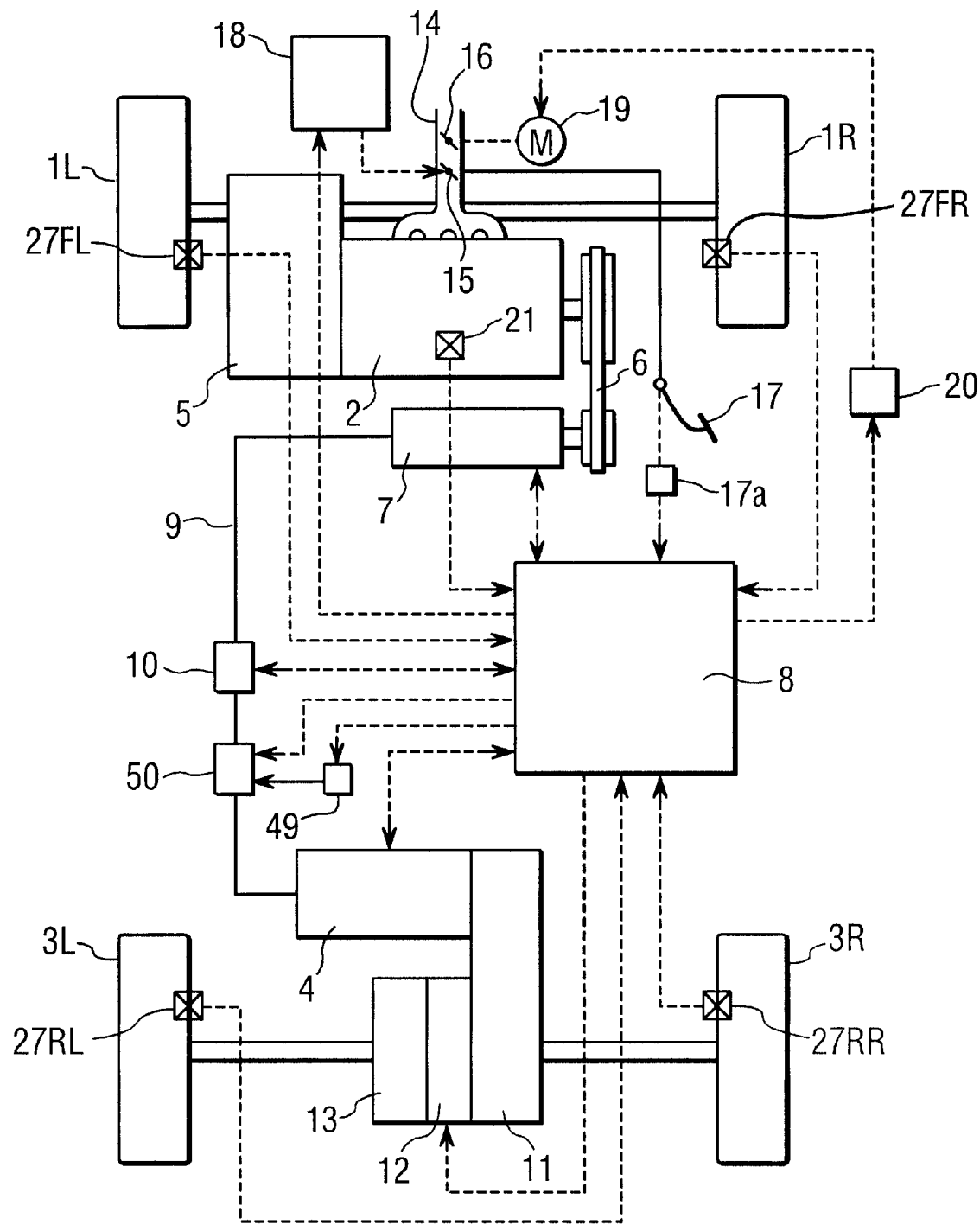
FIG. 32 is a schematic block diagram of a vehicle equipped with a vehicle driving force control apparatus in accordance with the seventh embodiment of the present invention.

Referring now to FIGS. 32–35, a driving force control apparatus in accordance with a seventh embodiment will now be explained. The basic construction of this embodiment is the same as that of the first and second embodiments except that, as shown in FIG. 32, a motor driving battery 49 is provided. The electrical power from the generator 7 and the electrical power from the motor driving battery 49 are supplied to the electric motor 4 via inverter 50. The battery 49 has a relay (not shown) for shutting off the supply of electrical power. In view of the similarity between the prior embodiments and the seventh embodiments, the parts of the seventh embodiment that are identical to the parts of the first and second embodiments will be given the same reference numerals as the parts of the first and second embodiments embodiment. Moreover, the descriptions of the parts of the seventh embodiment that are identical to the parts of the first embodiment may be omitted for the sake of brevity.

The inverter 50 converts the electrical power supplied from battery 49 to alternating current and combines it with the electrical power supplied from the generator 7 before outputting the resultant to the electric motor 4. The amount of electrical power supplied from battery 49 to the electric motor 4 is adjusted by commands from controller 8.

Figure 33:
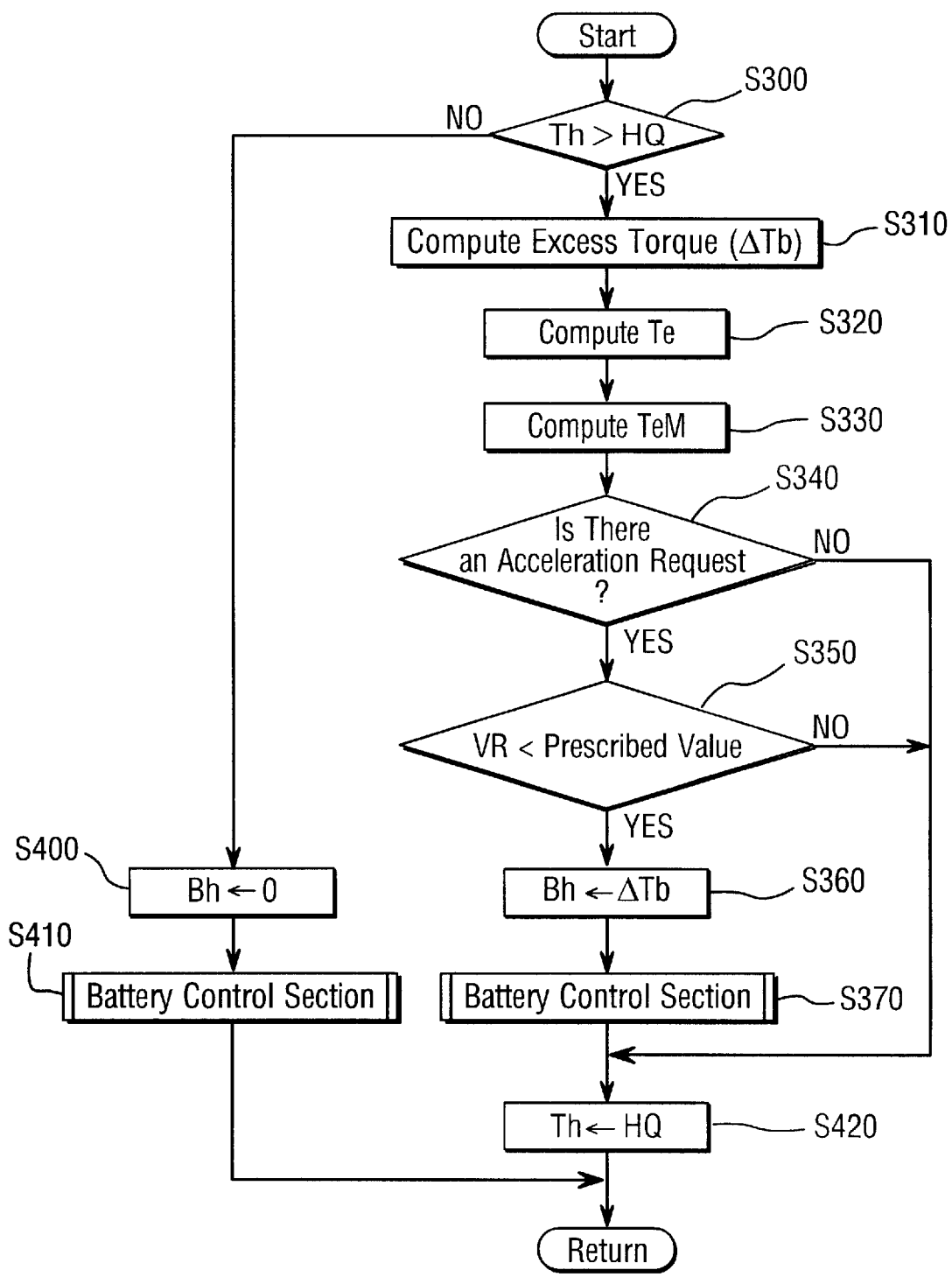
FIG. 33 is a flow chart showing the target torque limiting section for the vehicle driving force control apparatus in accordance with the seventh embodiment of the present invention.

The target torque limiting section 8F of the present invention will be explained using FIG. 33. In step S300, the control program determines whether or not the aforementioned target generation load torque Th is larger than the maximum load capacity HQ of the generator 7. If target generation load torque Th is determined to be less than or equal to the maximum load capacity HQ of the generator 7, then processing proceeds to step S400 where zero is assigned to Bh. Then, in step S410, the battery control section 65 starts and processing returns to the beginning of the control program to repeat the control program after a prescribed sampling time cycle has expired.

On the other hand, if target generation load torque Th is determined to be larger than the maximum load capacity HQ of the generator 7 in step S300, processing proceeds to step S310. In step S310, the excess or surplus torque Tb, which is the portion of the target generation load torque Th in excess of the maximum load capacity HQ, is found using the equation ΔTb=Th−HQ. Then processing proceeds to step S320.

In step 320, the current engine torque Te is computed based on the signals from the engine speed detection sensor 21 and the throttle sensor. Then processing proceeds to step S330.

In step S330, the engine torque upper limit value TeM, which is obtained by subtracting the excess or surplus torque ΔTb from the engine torque Te, is computed according to the equation TeM=Te−ΔTb. The computed engine torque upper limit value TeM is outputted to the engine controller 18. Then processing proceeds to step S340.

In this embodiment, the engine controller 18 limits the engine torque Te such that the received engine torque upper limit value TeM becomes the upper limit value of the engine torque Te regardless of the driver's operation of the accelerator pedal 17. The processing from step S310 to this point constitutes an internal combustion engine output limiting device or section.

In step 340, the control program determines whether or not there is an acceleration request based on the accelerator pedal operation amount. The processing step S340 and/or sensor 17 a constitute an acceleration request detecting device or section that is configured to detect an acceleration request operation. The acceleration request detecting device or section determines if the rotational speeds of the subordinate drive wheel 3L and 3R are being controlled proportionally to the acceleration request based on the acceleration request indication quantity caused by a driver and the elapsed time of the acceleration request indication. If there is no acceleration request greater than or equal to a prescribed acceleration, processing proceeds to step S420. Meanwhile, if there is an acceleration request greater than or equal to a prescribed acceleration, processing proceeds to step S350.

Figure 34:
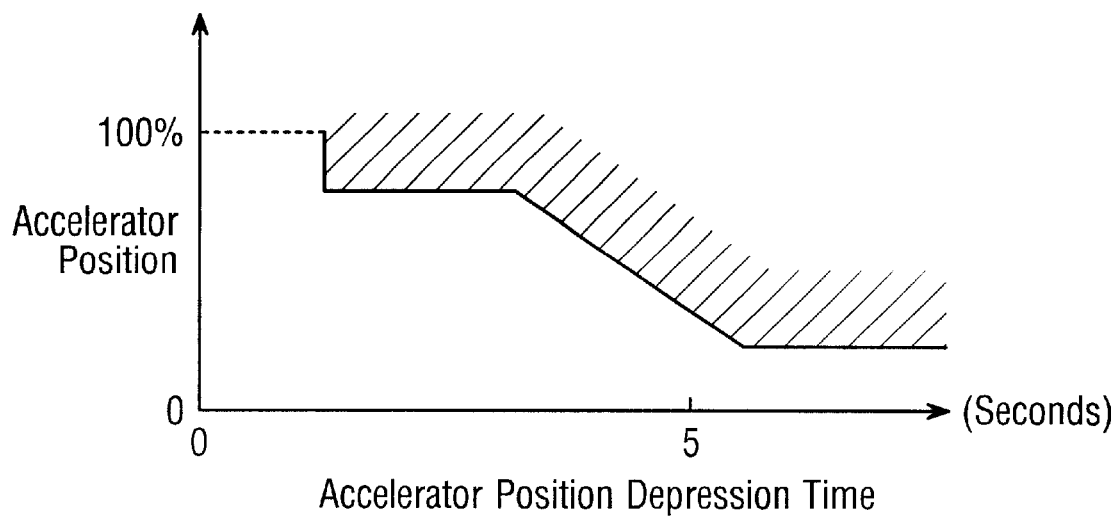
FIG. 34 shows a map used for acceleration request determination in the vehicle driving force control apparatus in accordance with the seventh embodiment of the present invention.

The aforementioned determination of whether or not there is an acceleration request greater than or equal to a prescribed value is accomplished by determining if the accelerator operation falls at a position in the crosshatched area of the map shown in FIG. 34. That is, the control program determines that an acceleration request occurred when an accelerator position that is greater than or equal to a prescribed accelerator position continues for a prescribed amount of time. The reason the continuance over a prescribed amount of time is used is to make it possible to reliably detect a condition in which the vehicle is stuck.

In step S350, the control program determines whether or not the speed of subordinate drive wheels 3L and 3R is less than or equal to a prescribed value, i.e., whether or not the vehicle is in a stuck condition in which the speed of the subordinate drive wheels 3L and 3R is suppressed compared to the acceleration request. The processing step S350 constitutes an acceleration condition detecting device or section that is configured to detect the acceleration condition of the vehicle based on at least one of the wheel speed of the subordinate drive wheels 3L and 3R, the wheel acceleration of the subordinate drive wheels 3L and 3R, and the longitudinal acceleration of the vehicle. Processing proceeds to step S360 if the control program determines that the vehicle is in a stuck condition. Conversely, processing proceeds to step S420 if the control program determines that the vehicle is not in a stuck condition.

In step S360, the excess or surplus torque ΔTb is assigned to Bh. In step S370, the battery control section 65 starts and adjusts the amount of electrical power supplied from the battery. The battery control section 65 constitutes supply power adjusting device or section (65) that adjusts the magnitude of electrical power supplied from the battery 49 to the electric motor 4. Then, processing proceeds to step S420.

In step 420, the generation load torque Th is limited to the maximum load capacity HQ of the generator 7 and then processing returns to the beginning of the control program to repeat the control program after a prescribed sampling time cycle has expired.

Figure 35:
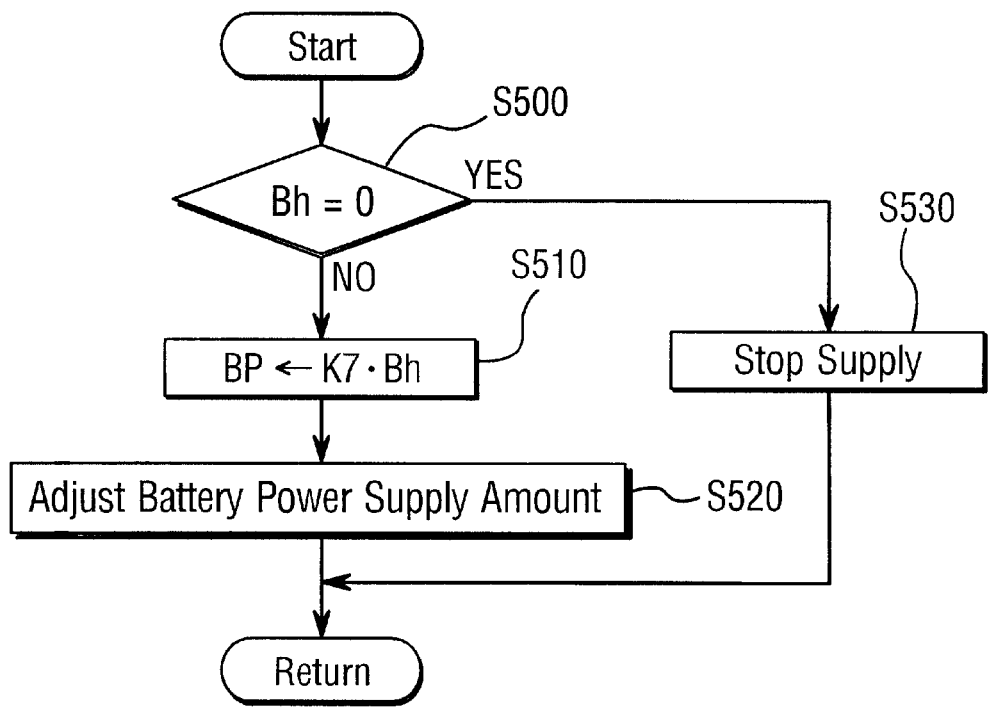
FIG. 35 is a flow chart showing the processing executed by the battery control for the vehicle driving force control apparatus of the seventh embodiment of the present invention.

Next, the battery control section 65 is discussed using FIG. 35. In step S500, the control program determines whether or not Bh is zero. If it is zero, processing proceeds to step S530 and the power supply from battery 49 is stopped. If Bh is not zero, processing proceeds to step S510.

In step S510, the supply amount from the battery 49 is computed using the equation BP=K7×Bh, where K7 is a gain constant. Then processing proceeds to step S520.

In step S520, a signal determined based on BP is fed to inverter 50 and then processing returns to the beginning of the control program to repeat the control program after a prescribed sampling time cycle has expired. The step S520 constitutes a battery power increasing device or section that starts upon determining that the internal combustion engine output limiting device or section (steps S310–330) has started. The battery power increasing device or section increases the magnitude of electrical power supplied to the electric motor 4 from the battery 49 by a magnitude in accordance with the magnitude by which the internal combustion engine output limiting device or section reduced the output torque, upon determining that the rotational speed of the subordinate drive wheel (3L, 3R) is being controlled proportionally to an acceleration request based on the detection values of the acceleration request detecting device or section (step S340) and the acceleration condition detecting device or section (step S350).

In step S530, a power stop command is sent to battery 49 and inverter 50 and then processing returns to the beginning of the control program to repeat the control program after a prescribed sampling time cycle has expired.

Next, the operation and effects of the present embodiment are described. When the surplus torque becomes larger and exceeds or is in danger or exceeding the load capacity of the generator, the output torque of the engine 2 is reduced in accordance with the excess or surplus torque. As a result, it is not absolutely necessary to have a large generator with a large load capacity. This is advantageous in terms of cost and such installability factors as the space occupied by the generator.

Additionally, when the internal combustion engine output limiting device or section limits the output torque of the engine 2 in view of the load capacity of the generator and the main drive wheels 1L and 1R are spinning (i.e., the vehicle is stuck), the amount of power supplied to the electric motor 4 from battery 49 is increased in accordance with the amount by which the output torque of the engine 2 was reduced if the control program determines that the driving force of the subordinate drive wheels 3L and 3R will decline in comparison to the acceleration request. As a result, when the vehicle is stuck, even if the output torque of the engine 2 is reduced in order to suppress acceleration slippage of main drive wheels 1L and 1R, the driving torque of subordinate drive wheels 3L and 3R is increased by a corresponding amount and the total driving force of the vehicle remains equal. Therefore, the ability to escape from a stuck condition is improved.

Eighth Embodiment

Referring now to FIGS. 2–4 and 36–40, a driving force control apparatus in accordance with an eighth embodiment will now be explained. The basic construction of this embodiment is the same as that of the first embodiment, except that the driving force control apparatus as been modified in accordance with the following explanation. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity. Also, the definitions of terms and abbreviations of the terms defined in the following explanation of this eighth embodiment have the same definition as in the first embodiment, if the abbreviations and/or terms are redundantly used in the following explanation.

Figure 36:
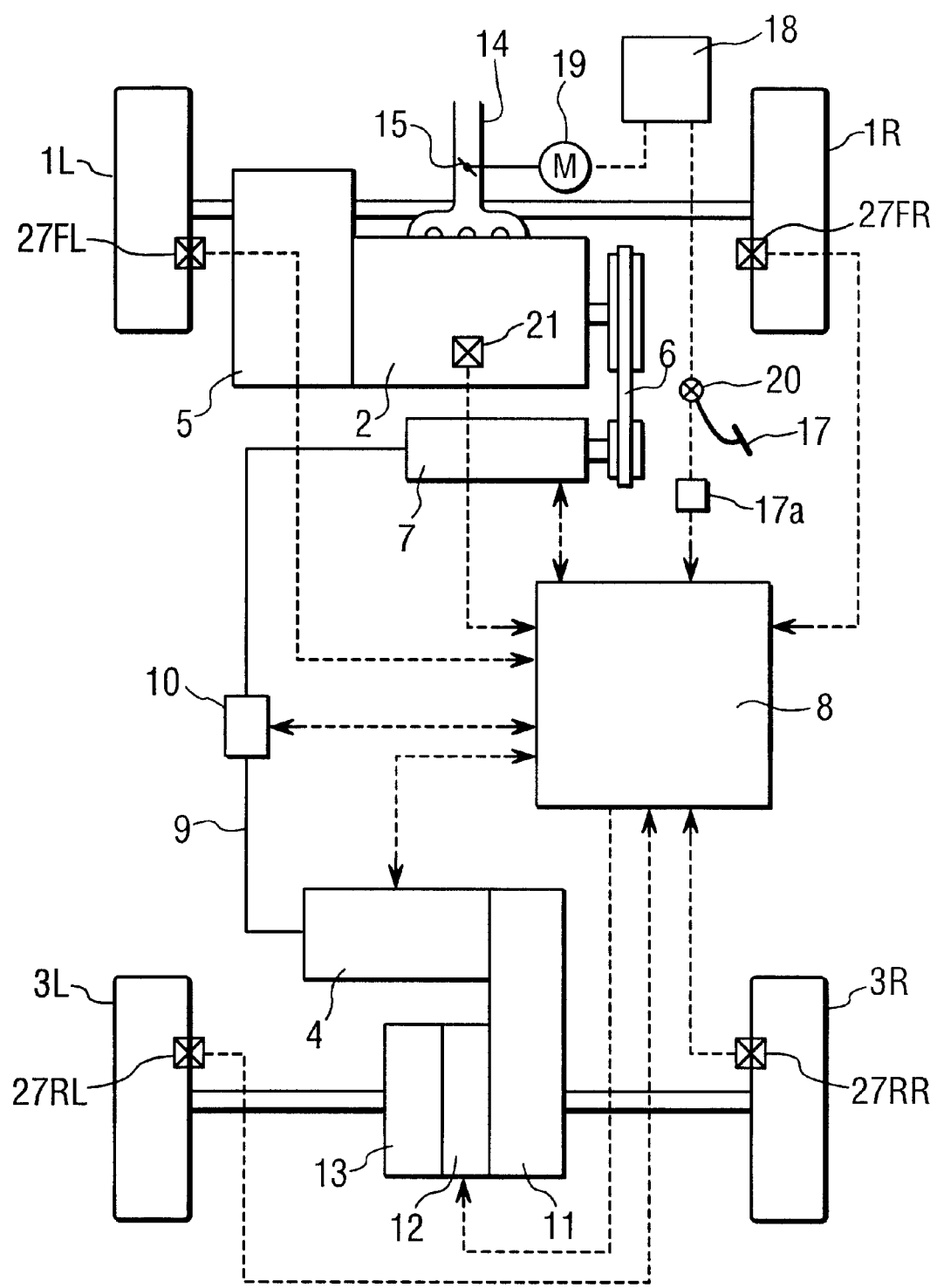
FIG. 36 is a block diagram illustrating a 4WD controller in accordance with the eighth embodiment.

An example of a four-wheel drive vehicle is illustrated in FIG. 36 to explain this eighth embodiment of the present invention. The vehicle is capable of four-wheel drive in which the left and right front wheels 1L and 1R are driven by the internal combustion engine 2 and the left and right rear wheels 3L and 3R are driven by the electric motor 4. As shown in the FIG. 1, the engine output torque Te of the internal combustion engine 2 is transferred to the left and right front wheels 1L and 1R through the transmission and the differential gear 5. The portion of the engine output torque Te of the engine 2 is transferred to a generator 7 using an endless belt drive 6.

The generator 7 rotates at rotational speed Nh, which is the product of the rotational speed Ne of the engine 2 and the pulley ratio of the endless belt drive 6. The load placed on the engine 2 by the generator 7 due to the field current Ifh is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a. differential 13.

The main throttle valve 15 is disposed inside the intake passage 14 (e.g., an intake manifold) of the engine 2. The throttle opening of the main throttle valve 15 is adjusted/controlled in accordance with the amount of depression of the accelerator pedal 17, which also functions as a throttle opening indicating device or section. The main throttle valve 15 is either mechanically linked to the depression amount of the accelerator pedal 17, or adjusted/controlled electrically by the engine controller 18 in accordance with the depression amount detection value from an accelerator sensor that detects the depression amount of the accelerator pedal 17. The depression amount detection value of the accelerator sensor is outputted to the 4WD controller 8. The main throttle valve 15 preferably uses a stepper motor 19 as an actuator for adjusting its throttle opening. Specifically, the throttle opening of the main throttle valve 15 is adjusted/controlled by the rotational angle of the stepper motor 19, which corresponds to the step count. The rotational angle of the stepper motor 19 is adjusted/controlled by a drive signal from the motor controller 20. The main throttle valve 15 is provided with a throttle sensor. The step count of the stepper motor 19 is feedback-controlled based on the throttle opening detection value detected by this throttle sensor.

The apparatus is also equipped with an engine speed detection sensor 21 that detects the rotational speed of the engine 2. The engine speed detection sensor 21 outputs its detected signal to the 4WD controller 8.

As shown in FIG. 2, the generator 7 is equipped with a voltage adjusting device 22 (regulator) for adjusting the output voltage V. The generation load torque Th against the engine 2 and the generated voltage V are controlled by the adjustment of field current Ifh executed by the 4WD controller 8. The voltage adjusting device 22 receives a generator control command (field current value) from the 4WD controller 8 and adjusts the field current Ifh of the generator 7 to a value corresponding to the generator control command. It is also capable of detecting the output voltage V of the generator 7 and outputting the detected voltage value to the 4WD controller 8. Additionally, the rotational speed Nh of the generator 7 can be computed based on the rotational speed Ne of the engine 2 and the pulley ratio of the endless belt drive 6.

The current sensor 23 is provided inside junction box 10. The current sensor 23 detects the current value Ia of the electrical power supplied from the generator 7 to the electric motor 4 and outputs the detected armature current signal to the 4WD controller 8. The voltage across the electric motor 4 is detected by the 4WD controller 8 to provide a voltage value across the electrical line 9. A relay 24 shuts off or connects the voltage (current) supplied to the electric motor 4 in accordance with a command received from the 4WD controller 8.

The command from the 4WD controller 8 controls the field current Ifm of the electric motor 4 and the adjustment of the field current Ifm adjusts the drive torque Tm. A thermistor 25 measures the temperature of the electric motor 4. The apparatus is also equipped with a motor speed sensor 26 that detects the rotational speed Nm of the drive shaft of the electric motor 4. The motor speed sensor 26 outputs a signal for the detected rotational speed of the electric motor 4 to the 4WD controller 8. The clutch 12 is a hydraulic clutch or electric clutch and transmits torque at a torque transfer rate corresponding to a clutch control command from the 4WD controller 8.

The wheel speed sensors 27FL, 27FR, 27RL, and 27RR are provided on wheels 1L, 1R, 3L and 3R, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by the electric motor 4 as discussed below.

Referring now to FIG. 3, in this eighth embodiment of the present invention, the 4WD controller 8 is equipped with a generator control section 8A, a relay control section 8B, a motor control section 8C, a clutch control section 8D, a surplus torque computing section 8E, a target torque limiting section 8F, and a surplus torque converting section 8G. The remaining control blocks shown in FIG. 3 are used by other embodiments discussed herein.

Referring back to FIG. 4, in this eighth embodiment of the present invention, at a prescribed sampling time cycle, the processing is conducted in sequence by the surplus torque computing section 8E, the target torque limiting section 8F, and the surplus torque converting section 8G based on the input signals.

Figure 37:
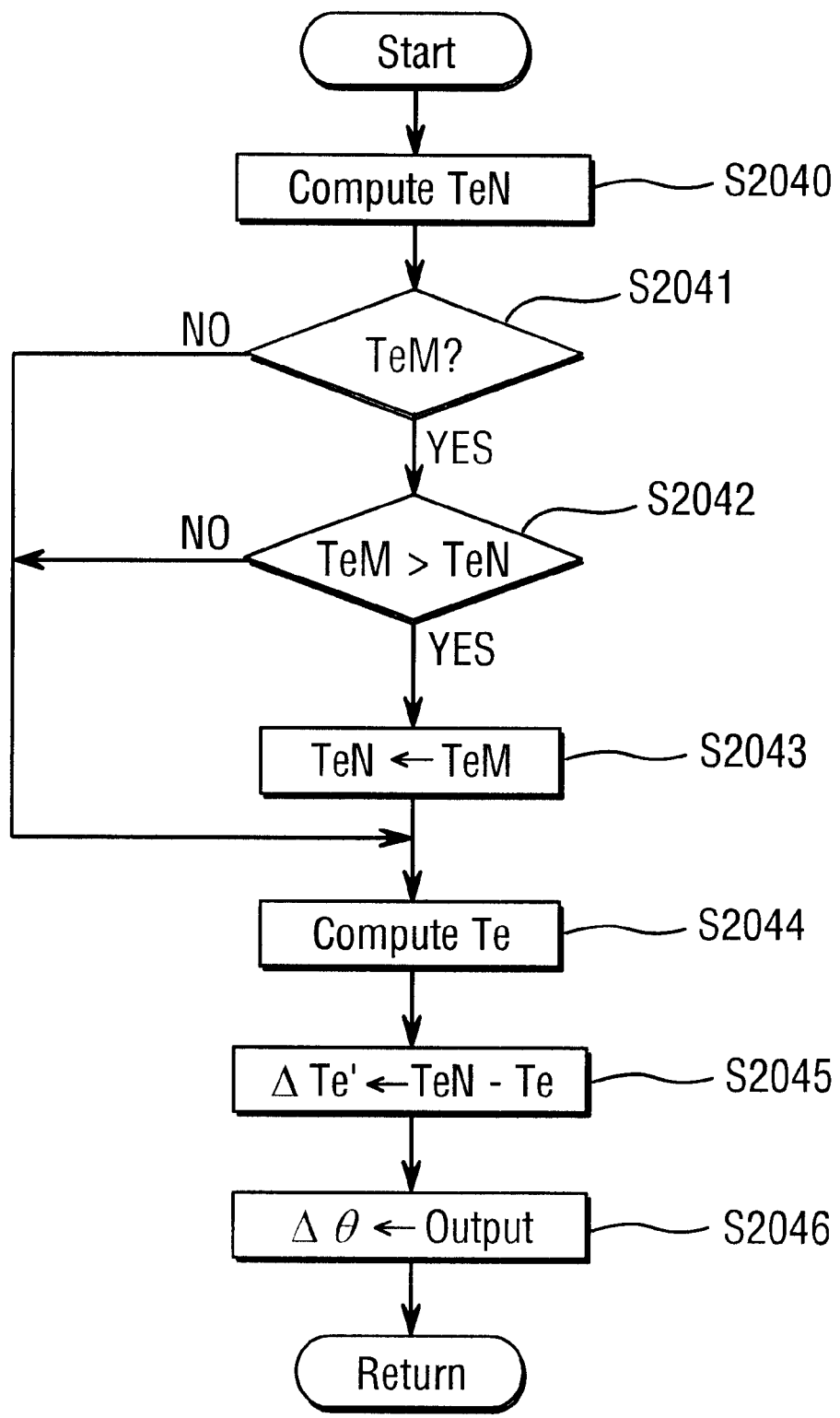
FIG. 37 is a flowchart showing a processing procedure in accordance with the eighth embodiment.

According to the eighth embodiment, the engine controller 18 executes the following processes as shown in FIG. 37, depending upon signals inputted in each of predetermined sampling intervals (as shown in FIG. 4). In step S2040, a target engine torque value TeN requested by a driver is calculated depending upon a detected signal from the motor controller 20 that controls the main throttle valve 15. Then, processing proceeds to step S2041.

In step S2041, the control program determines if an engine torque upper limited value TeM is outputted from the 4WD controller 8. If the signal is outputted, then the program proceeds to step S2042. If the signal is not outputted, the program proceeds to step S2044.

In step S2042, the control program compares the engine torque upper limited value TeM with the target engine torque value TeN. If the engine torque upper limited value TeM is larger, the program proceeds to step S2043. If the engine torque upper limited value TeM is equal to or smaller than the target engine torque value TeN, the program proceeds to step S2044.

In step S2043, the engine torque upper limited value TeM is substituted for the target engine torque value TeN so that the target engine torque value TeN is enlarged. Then, the program proceeds to step S2044.

In step 2044, an engine torque Te is calculated depending upon a throttle opening signal, an engine rotation speed, and etc. Then, the program proceeds to step S2045.

In step S2045, a deviation $\Delta Te'$ of the target engine torque value TeN to the engine torque Te is computed by the following equation: $\Delta Te'=TeN-Te$. Then, the program proceeds to step S2046.

In step S2046, a deviation $\Delta\theta$ of a degree of throttle opening is calculated depending upon the deviation $\Delta Te$, and an opening degree signal corresponding to the deviation $\Delta\theta$ is outputted to the stepper motor 19.

Referring back to FIG. 3, the generator control section 8A monitors a generated voltage V of the generator 7 through the voltage adjusting device 22, and it controls the field current Ifm of the generator 7, so that it controls the generated voltage V of the generator 7 for a predetermined voltage.

The relay control section 8B turns on/off the power supply from the generator 7 to the motor 4. The motor control section 8C controls the torque of the motor 4 for a predetermined value by controlling the field current Ifm of the motor 4.

Referring to FIG. 4, a cycle of control is performed by surplus torque computing section 8E, the target torque limiting section 8F and the surplus torque converting section 8G depending on inputted signals in predetermined sampling time intervals.

Figure 38:
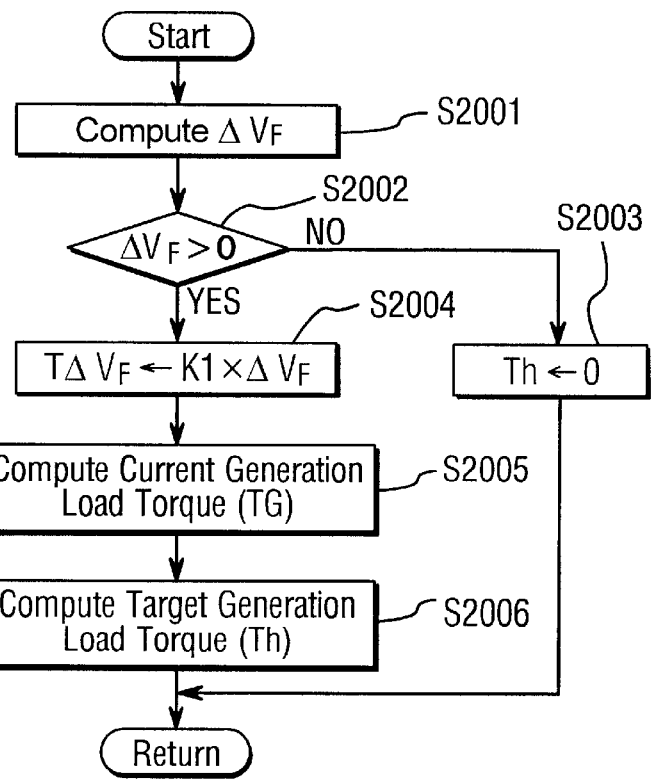
FIG. 38 is a flowchart showing a processing procedure executed by a surplus torque calculator of the eighth embodiment.
Figure 39:
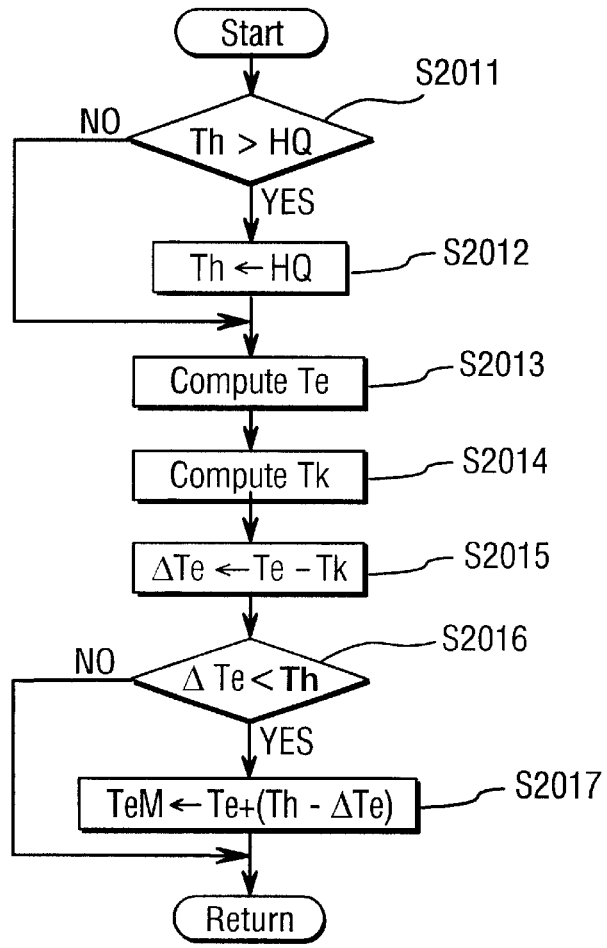
FIG. 39 is a flowchart showing a processing procedure executed by a target torque controller of the eighth embodiment.

Referring to FIG. 38, the surplus torque computing section 8E executes the following processing for computing a load torque.

In step S2001, the speed values of the front wheels or driving wheels 1L and 1R and the rear wheels or subordinate wheels 3L and 3 are obtained depending upon signals from the sensors 27FL, 27FR, 27RL and 27RR. By subtracting the speed value of the rear wheel 3L and 3R from the speed value of the front wheels 1L and 1R, a slip speed $\Delta VF$ is calculated as an acceleration slip amount of the front wheels 1L and 1R. Then, the program proceeds to step S2002.

In step S2002, the program compares the slip speed $\Delta VF$ with zero. If the slip speed $\Delta VF$ equals or is smaller than zero, the program assumes the front wheels 1L and 1R are not slipping and proceeds to step S2003. In step S2003, zero is substituted for the variable Th.

If the slip speed $\Delta VF$ is larger than zero in step S2002, the program assumes that the front wheels 1L and 1R are slipping. Then, the program proceeds to step S2004. In step S2004, an absorbing torque $T\Delta VF$ is calculated for preventing the acceleration slip of the front wheels 1L and 1R. Then, the program proceeds to step S2005.

In step S2005, a current load torque TG of the generator 7 is calculated by the following equation. Then, the program proceeds to step S2006.

$$TG = K2 \frac{V \times Ia}{K3 \times Nh}$$

where

V: voltage of the generator 7,

Ia: armature current of the generator 7,

Nh: rotational speed of the generator 7,

K3: efficiency, and

K2: coefficient.

In step S2006, calculated is a target generation load torque Th that is an additional torque that should be loaded to the generator 7, by the equation: Th=TG+T$\Delta$VF.

Figure 40:
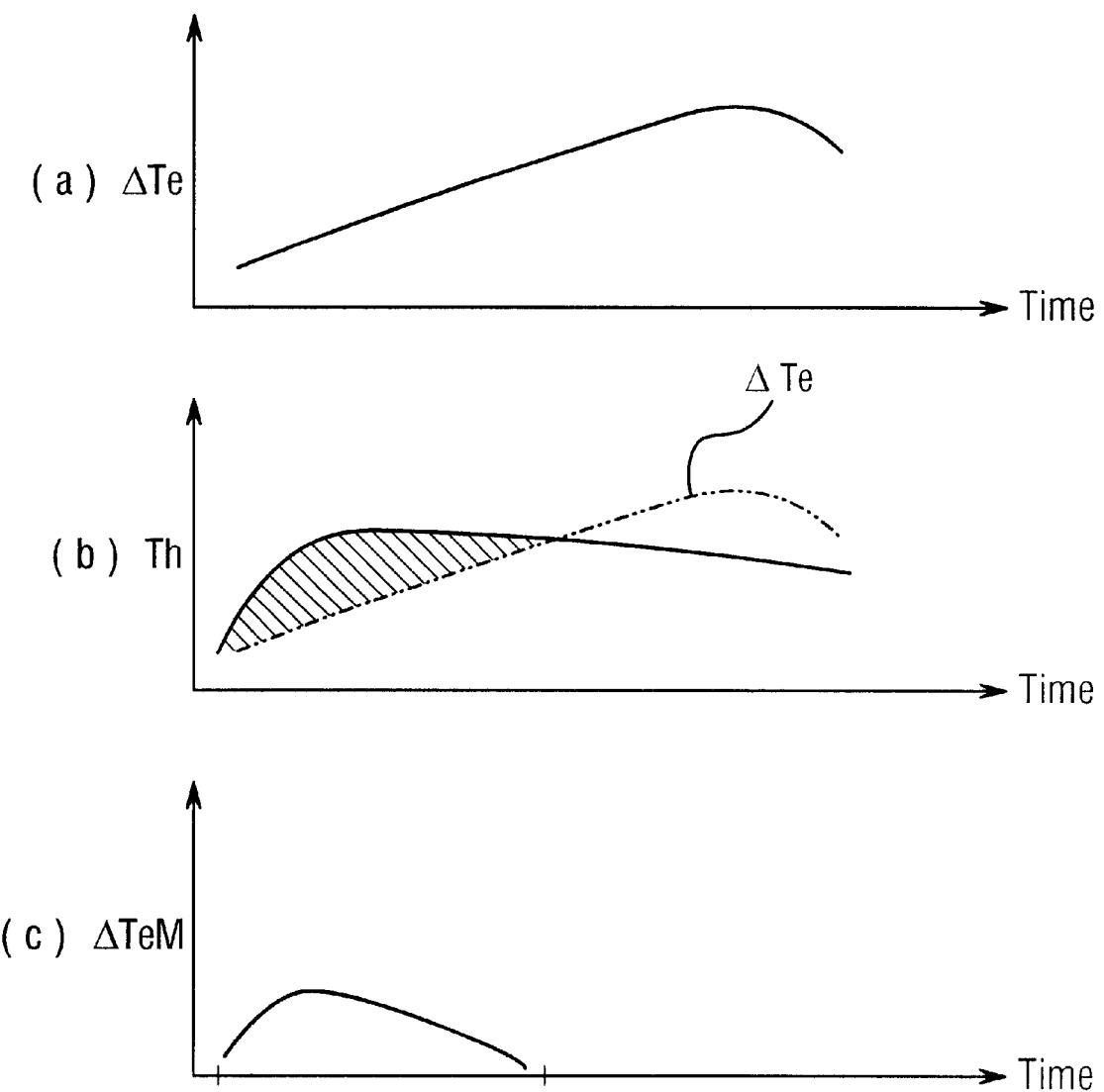
FIG. 40 shows exemplary time charts illustrating the relationship between deviation torque and target generation load torque.

Referring to FIG. 40, the processing of the target torque limiting section 8F will now be explained. In step S2011, the program compares the target generation load torque Th with a maximum load capacity HQ of the generator 7. If the target generation load torque Th equals or is smaller than the maximum load capacity HQ, the program proceeds to step S2013. If the target generation load torque Th is larger than the maximum load capacity HQ, then the program proceeds to step S2012.

In step S2012, the maximum load capacity HQ is substituted for the target generation load torque Th as shown in the following equation: Th=HQ. Then, the program proceeds to step S2013.

In step S2013, the current engine torque Te is calculated depending upon signals from the engine speed detection sensor 21 and the throttle sensor. Then, the program proceeds to step S2014. In step S2014, a minimum allowed torque Tk for which the engine 2 will not stop is calculated depending upon a rotational speed Ne and etc. Then, the program proceeds to step S2015. However, a predetermined value may be used as the minimum allowed torque Tk instead of calculating the torque Tk.

In step S2015, a deviation torque $\Delta Te$ is calculated by using the following equation: $\Delta Te=Te-Tk$. Then the program proceeds to step S2016. Therein, steps S2013–S2015 constitute a deviation torque computing device or section.

In step S2016, the program compares the deviation torque $\Delta Te$ with the target generation load torque Th. If the deviation torque $\Delta Te$ is smaller than the target generation load torque Th, the program proceeds to step S2017.

In step S2017, an engine torque upper limited value TeM is calculated by the following equation TeM=Te+(Th−$\Delta$Te)+$\alpha$ where $\alpha$ is a value for safety. Then, the engine torque upper limited value TeM is outputted to the engine controller 18.

However, the engine speed Ne of the engine 2 cannot vary quickly because of the rotational inertia of the entire driving system when the throttle valve 15 is ordered to quickly open or close. In other words, the output power response speed of the engine 2 cannot be very fast. Accordingly, $\alpha$ may be zero. In case that $\alpha$ is set as a relatively large value, the target torque of the engine 2 may be controlled to be immediately large when the deviation torque $\Delta Te$ is smaller than the generator load torque Th.

Therein, steps S2041–S2043, step S2016 and step S2017 constitute controlling an internal combustion engine output control device or section.

Next, the processing executed by the surplus torque converting section 8G will be explained based on FIG. 11. First, in step S600, the control program determines if Th is larger than 0. If Th is determined to be larger than 0, processing proceeds to step S610 because one of the following is occurring: the front wheels 1L and 1R are experiencing acceleration slippage; the conditions are such that there is an apprehension of acceleration slippage occurring; or the vehicle is in a low speed state at or below a prescribed speed. If the control program determines that Th is less than or equal to 0, then processing returns to the beginning of the control program to repeat the control program after a prescribed sampling time cycle has expired without executing the subsequent steps because the vehicle is in a state in which the front wheels 1L and 1R are not experiencing acceleration slippage or other comparable state.

In step S610, the rotational speed Nm of the electric motor 4 detected by motor speed sensor 21 is received as input. The target motor field current Ifm corresponding to the rotational speed Nm of the electric motor 4 is calculated and the target motor field current Ifm is outputted to the motor control section 8C. Then, processing proceeds to step S620.

In this embodiment, the target motor field current Ifm corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed (see FIG. 12). In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm can be obtained because the motor induced voltage E is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

In step S620, the induction current E of the electric motor 4 is calculated based on the target motor field current Ifm and the rotational speed Nm of the electric motor 4. Then, processing proceeds to step S630.

In step S630, the corresponding target motor torque TM is calculated based on the generation load torque Th computed by surplus torque computing section 8E. Then, processing proceeds to step S640.

In step S640, the corresponding target armature current Ia is calculated using the target motor torque TM and the target motor field current Ifm as variables. Then, processing proceeds to step S650.

In step S650, the equation V=Ia×R+E is used to calculate the target voltage V of the generator 7 from the target armature current Ia, resistance R, and the induced voltage E. Processing returns to the beginning of the control program to repeat the control program after a prescribed sampling time cycle has expired after the target voltage V of the generator 7 is outputted to the generator control section 8A. The resistance R is the resistance of the electrical line 9 and the resistance of the coil of the electric motor 4.

Although here the surplus torque converting section 8G takes into account control of the motor when it calculates the target voltage V at the generator 7 that corresponds to the target generation load torque Th, it is also acceptable to calculate the voltage value V that achieves the target generation load torque Th directly from target generation load torque Th. FIG. 12 shows an example of a time chart for the processing described above.

Referring back to FIG. 3, in this eighth embodiment, the generator control section 8A constitutes a generator load torque computing device or section, and the surplus torque converting section 8G constitutes a generator load torque control device or section. Referring again to FIG. 38, step S2001 and step S2002 constitutes a drive wheel slippage estimating device or section. The steps S2004–S2006 constitute a deviation torque computing device or section.

Next, the operation of the apparatus of this eighth embodiment will be explained. A torque delivered from the engine 2 to the front wheels 1L and 1R may be greater than the road grip limit torque. In such a case, the front wheels or the driving wheels 1L and 1R may slip. The amount of the slip makes the generator 7 to generate a power at the generator load torque Th. Thus, the driving torque delivered to the front wheels 1L and 1R is controlled toward the road surface reaction limit torque, so that the front wheels 1L and 1R are kept away from the acceleration slippage. Meanwhile, the acceleration ability of the automobile is improved because the surplus power generated by the generator 7 is supplied to the motor 4 that drives the rear wheels 3L and 3R. Furthermore, the energy efficiency is improved and fuel efficiency is improved because the motor 4 is driven by the surplus torque from the driving wheels.

The acceleration ability is also improved by the surplus power which cannot be used by the front wheels 1L and 1R, but which can be used by the rear wheels 3L and 3R only when the automobile is on a slippery road. This is better than the driving system which always distributes the driving force not only to the front wheels 1L and 1R but also to the rear wheels 3L and 3R because the driving energy has to be converted some times.

When the output torque Te of the engine 2 is set to equal to the engine torque upper limited value TeM, the engine 2 is kept away from getting too much load torque of the generator 7.

In FIG. 40, graph (a) shows an example of variation of the deviation torque ΔTe. When a target generation load torque Th that is going to be used by the generator 7 varies as shown in graph (b) of FIG. 40, a deviation torque ΔTeM is calculated as shown in graph (c) of FIG. 40. Thus, the engine torque is controlled to be greater than the current engine torque Te by the deviation torque ΔTeM.

The surplus power generated by the generator 7 can be consumed by a load such as an air conditioner other than by the motor 4.

The subject invention is not limited to the structure in which a load torque is determined depending upon a slippage amount of the front wheels 1L and 1R compared to that of the rear wheels 3L and 3R, and the amount of electric power generated by the generator 7 is defined corresponding to the load torque. However, a driving torque that is required by the rear wheels 3L and 3R can be calculated by a different way. The driving torque can define the generated power amount of the generator 7, so that a preferable load torque is created by the generator 7. The structure in which the engine torque upper limited value TeM is outputted from the 4WD controller 8 to the engine controller 18 can be replaced with another structure. In such a structure, the engine torque deviation ΔTeM can be supplied to the engine controller 18, and the engine controller 18 can calculate the degree of the throttle opening corresponding to the engine controller 18.

Ninth Embodiment

Figure 41:
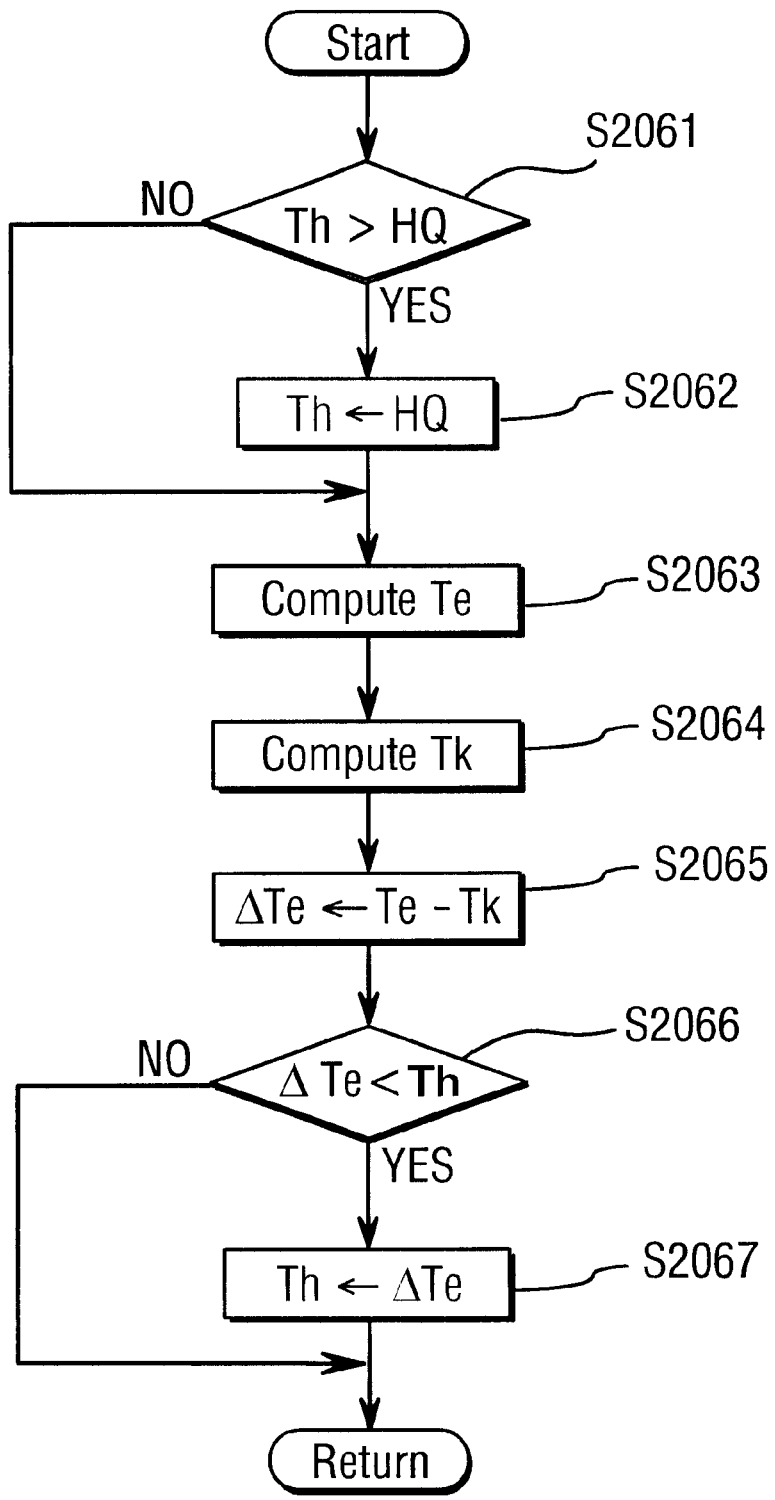
FIG. 41 is a flowchart showing a target torque controller in accordance with a ninth embodiment of the present invention.

Referring now to FIG. 41, a driving force control apparatus in accordance with a ninth embodiment will now be explained. This ninth embodiment is most identical to the eighth embodiment, except for the construction pertinent to the flowchart shown in FIG. 41. Thus, the basic construction of this embodiment also relies on the basic construction of the first embodiment. In view of the similarity between ninth and eighth embodiments, the descriptions of the parts of the ninth embodiment that are identical to the parts of the prior embodiment have been omitted for the sake of brevity. Also, the definitions of terms and abbreviations of the terms defined in the following explanation of this eighth embodiment have the same definition as in the first and eighth embodiment, if the abbreviations and/or terms are redundantly used in the following explanation.

Referring to FIG. 41, a flow chart for a special processing program is illustrated in accordance with the ninth embodiment. This program compares the target generation load torque Th with the maximum load capacity HQ of the generator 7 in step S2061. If the target generation load torque Th equals to or is smaller than the maximum load capacity HQ, the program proceeds to step S2063. If the torque Th is smaller than the capacity HQ, the program proceeds to step S2062.

In step S2062, the maximum load capacity HQ is substituted for the target generation load torque Th as shown in the following equation: Th=HQ. Then the program proceeds to step S2063.

In step S2063, a current engine torque Te is calculated depending upon signals from the engine rotational speed detection sensor 21 and the throttle sensor. Then, the program proceeds to step S2064.

In step S2064, a minimum allowed torque Tk for which the engine 2 will not stop is calculated depending upon the current engine rotational speed and etc. Then the program proceeds to step S2065.

In step S2065, a deviation torque $\Delta$Te is calculated by using the following equation: $\Delta$Te=Te−Tk. Then, the program proceeds to step S2066.

In step S2066, the program compares the deviation torque $\Delta$Te with the target generation load torque Th. If the torque $\Delta$Te is smaller than the torque Th, the program proceeds to step S2067.

In step S2067, the target generation load torque Th is reduced toward the deviation torque $\Delta$Te by using the following equation: Th=$\Delta$Te−$\alpha$ where $\alpha$ is a coefficient for safety and $\alpha$ can be zero. Therein, steps S2066 and S2067 constitute a load torque control device or section.

The engine 2 is kept away from obtaining too much generator load torque by controlling the generation load by the deviation torque $\Delta$Te.

Although the above embodiments were explained using an example of a vehicle capable of four-wheel drive, the invention can be applied to any vehicle with two or more wheels in which a portion of the wheels are driven by an internal combustion engine and another portion or the entire remainder of wheels are driven by a motor 4.

The term "acceleration slippage" as used in this invention refers to slippage of the wheels when the vehicle is accelerating.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially","about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2000-346287, 2000-346288 and 2001-225144.

The entire disclosures of Japanese Patent Application Nos. 2000-346287, 2000-346288 and 2001-225144 are each hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A driving force control apparatus for a vehicle having front and rear wheels with at least one of the front and rear wheels being a drive wheel driven by an internal combustion engine that drives a generator, said driving force control apparatus comprising:
   a drive wheel slippage estimating section configured to estimate if acceleration slippage is occurring in the drive wheel; and
   a generator control section configured to control a generation load torque of the generator to substantially correspond to an acceleration slippage magnitude of the drive wheel, when said drive wheel slippage estimating section estimates acceleration slippage occurring in the drive wheel.

2. The driving force control apparatus as recited in claim 1, wherein
   said drive wheel slippage estimating section estimates if acceleration slippage is occurring based on a speed differential between the front wheels and the rear wheels.

3. The driving force control apparatus as recited in claim 1, wherein
   said drive wheel slippage estimating section estimates if acceleration slippage is occurring from a comparison between a drive torque transferred from the internal combustion engine to the drive wheel and a road surface reaction force limit torque of the drive wheel.

4. The driving force control apparatus as recited in claim 1, wherein
   said generator control section includes
      a generation load torque adjusting section configured to adjust the generation load torque of the generator,
      a surplus torque computing section configured to compute a surplus torque that substantially corresponds to a difference magnitude by which a drive torque transferred from the internal combustion engine to the drive wheel exceeds a road surface reaction force limit torque of the drive wheel, and
      a generation load torque control section operatively coupled to said generation load torque adjusting section to control the generation load torque of the generator to a torque value based on said surplus torque computed by said surplus torque computing section.

5. The driving force control apparatus as recited in claim 4, wherein
   said surplus torque computing section determines said surplus torque based on the acceleration slippage magnitude of the drive wheel and the generation load torque of the generator.

6. The driving force control apparatus as recited in claim 4, wherein said surplus torque computing section includes a drive wheel limit torque computing section configured to compute a current road surface reaction force limit torque of the drive wheel, and said surplus torque computing section determines said surplus torque based on a difference between the current road surface reaction force limit torque computed by said drive wheel limit torque computing section and the drive torque transferred from the internal combustion engine to the drive wheel.

7. The driving force control apparatus as recited in claim 1, further comprising an electric motor operatively driven by electrical power generated by said generator, said electric motor being arranged to operatively drive at least one of the front and rear wheels which is a subordinate drive wheel that not driven by said internal combustion engine which is a main drive wheel.

8. The driving force control apparatus as recited in claim 7, further comprising a load torque computing section configured to compute a magnitude of an engine load torque imposed on the internal combustion engine by the generator due to power generation of the generator;

a deviation torque computing section configured to compute a deviation torque obtained by subtracting a minimum allowed torque for which the internal combustion engine will not stop from an output torque of the internal combustion engine; and an internal combustion engine output control section configured to control a lower limit of the output torque of the internal combustion engine such that the deviation torque is larger than the engine load torque imposed on the internal combustion engine by the generator due to power generation of the generator.

9. The driving force control apparatus as recited in claim 8, wherein said internal combustion engine output control section is configured to start when the deviation torque is smaller than the engine load torque, and to control the output torque of the internal combustion engine in accordance with a magnitude of a value obtained by subtracting the deviation torque from the engine load torque regardless of an acceleration operation on the internal combustion engine.

10. The driving force control apparatus as recited in claim 7, further comprising a load torque computing section configured to compute a magnitude of an engine load torque imposed on the internal combustion engine by the generator due to power generation of the generator;

a deviation torque computing section configured to compute a deviation torque obtained by subtracting a minimum allowed torque for which the internal combustion engine will not stop from an output torque of the internal combustion engine; and a load torque control section configured to control a maximum value of the generation load torque from the generator so as to be less than or equal to the deviation torque.

11. The driving force control apparatus as recited in claim 7, wherein said drive wheel limit torque computing section includes a limit torque calculating section configured to repeatedly calculate the road surface reaction force limit torque of the main drive wheel;

a limit torque maximum value updating section configured to compare the road surface reaction force limit torque and a predetermined limit torque, set the larger of the current road surface reaction force limit torque and the predetermined limit torque as a maximum limit torque value, and set the maximum limit torque value as a road surface reaction force limit torque value; and a limit torque reset section configured to start upon determining that a driving force of the subordinate drive wheel should be increased, and resets the maximum limit torque value to an updated maximum limit torque value.

12. The driving force control apparatus as recited in claim 11, wherein said limit torque reset section determines that the driving force of the subordinate drive wheel should be increased when a speed differential occurs between the front and rear wheels that is greater than or equal to a prescribed value.

13. The driving force control apparatus as recited in claim 11, further comprising a wheel grip limit estimating section configured to compute a wheel grip limit estimation value for the main drive wheel, and said limit torque reset section determining that the driving force of the subordinate drive wheel should be increased upon determining that the wheel grip limit estimation value of the main drive wheel is at least close to a detected wheel grip limit.

14. The driving force control apparatus as recited in claim 11, further comprising a poor road estimating section configured to estimate if detected road conditions are within a prescribed poor road range, said limit torque reset section determining that the driving force of the subordinate drive wheel should be increased upon said poor road estimating section determining that the vehicle is traveling on a road within the prescribed poor road range.

15. The driving force control apparatus as recited in claim 11, further comprising an ascending road estimating section configured to estimate if the vehicle is traveling on an ascending road, said limit torque reset section determining that the driving force of the subordinate drive wheel should be increased upon said ascending road estimating section determining that the vehicle is traveling on an ascending road.

16. The driving force control apparatus as recited in claim 11, further comprising a running resistance detecting section configured to detect a running resistance of the vehicle, and said limit torque reset section determining that the driving force of the subordinate drive wheel should be increased upon said running resistance detecting section determining that the running resistance is greater than or equal to a prescribed value.

17. The driving force control apparatus as recited in claim 11, wherein said limit torque reset section resets the maximum limit torque value to a prescribed value only when the current road surface reaction force limit torque is smaller than a previous road surface reaction force limit torque.

18. The driving force control apparatus as recited in claim 11, wherein
said limit torque reset section resets the maximum limit torque value to the predetermined maximum limit torque when the vehicle is stopped.

19. The driving force control apparatus as recited in claim 11, wherein
the predetermined maximum limit torque is the current road surface reaction force limit torque calculated by said limit torque calculating section.

20. The driving force control apparatus as recited in claim 7, further comprising:
an acceleration slippage apprehension estimating section configured to estimate if road surface conditions are such that there is an apprehension of acceleration slippage occurring in said main drive wheel;
a requested torque detecting section configured to detect a requested driving torque inputted to said internal combustion engine; and
an additional generator control section configured to control an additional generation load torque of said generator that is established in accordance with the requested driving torque when said acceleration slippage apprehension estimating section estimates that the road conditions are such that there is an apprehension of acceleration slippage occurring in the main drive wheel.

21. The driving force control apparatus as recited in claim 20, further comprising
a wheel grip limit estimating section configured to compute a wheel grip limit estimation value for said main drive wheel, and
said acceleration slippage apprehension estimating section estimating if there is an apprehension of acceleration slippage occurring based on an estimation made by said wheel grip limit estimating section.

22. The driving force control apparatus as recited in claim 20, further comprising
a poor road estimating section configured to estimate if road conditions is within a prescribed poor road range,
said acceleration slippage apprehension estimating section estimating there is an apprehension of acceleration slippage occurring based on an estimation made by said poor road estimating section.

23. The driving force control apparatus as recited in claim 20, further comprising
an ascending road estimating section configured to estimate if the vehicle is traveling on an ascending road,
said acceleration slippage apprehension estimating section determining there is an apprehension of acceleration slippage occurring based on an estimation made by said ascending road estimating section.

24. The driving force control apparatus as recited in claim 20, further comprising
a running resistance detecting section configured to detect a running resistance of the vehicle, and
said acceleration slippage apprehension estimating section determining if there is an apprehension of acceleration slippage occurring based on the detection made by said running resistance detecting section.

25. The driving force control apparatus as recited in claim 20, wherein said requested torque detecting section determines said requested driving torque based on an operation amount of an accelerator.

26. The driving force control apparatus as recited in claim 7, further comprising
an acceleration slippage apprehension estimating section configured to estimate if road surface conditions are such that there is an apprehension of acceleration slippage occurring in said main drive wheel; and
an additional generator control section configured to control an additional generation load torque of said generator that is a prescribed percentage of an output torque of said internal combustion engine, when the acceleration slippage apprehension estimating section estimates that the road conditions are such that there is an apprehension of acceleration slippage.

27. The driving force control apparatus as recited in claim 7, further comprising
an acceleration slippage apprehension estimating section configured to estimate if road surface conditions are such that there is an apprehension of acceleration slippage occurring in the main drive wheel; and
an additional generator control section configured to control the torque of said generator to match a generation load torque when the acceleration slippage apprehension estimating section estimates that there is an apprehension of acceleration slippage, the generation load torque being determined in accordance with a difference between the current road surface reaction force limit torque and a previously-calculated high-$\mu$ road surface reaction force limit torque.

28. The driving force control apparatus as recited in claim 7, further comprising:
a requested torque detecting section configured to detect a requested driving torque inputted to said internal combustion engine;
a low speed condition determining section configured to determine if a traveling speed of the vehicle is less than or equal to a prescribed speed; and
a first low speed control section configured to control the torque of the generator to match a generation load torque determined in accordance with the requested driving torque detected by said requested torque detecting section when said low speed condition determining section determines that the vehicle is in a low speed condition,
said first low speed control section being configured to start when said low speed condition determining section determines that the vehicle is in a low speed condition, and starts said generator control section when said low speed condition determining section determines that the vehicle is not in a low speed condition.

29. The driving force control apparatus as recited in claim 7, further comprising:
a requested torque detecting section configured to detect a requested driving torque inputted to said internal combustion engine; and
a low speed condition determining section configured to determine if a traveling speed of the vehicle is less than or equal to a prescribed speed,
said generator control section calculates a first generation load torque accordance with the acceleration slippage magnitude of said main drive wheel when acceleration slippage of said main drive wheel is estimated to be occurring and when said low speed condition determining section determines that the vehicle is in a low speed condition, and calculates a second generation load torque in accordance with the requested driving torque detected by said requested torque detecting section, and controls the torque of said generator to substantially correspond to the larger of the first and second generation load torques.

30. The driving force control apparatus as recited in claim 7, further comprising:
   a weight distribution determining section configured to determine a front and rear weight distribution of the vehicle;
   a low speed condition determining section configured to determine if a traveling speed of the vehicle is less than or equal to a prescribed speed; and
   a second low speed control section configured to control the torque of the generator to match a generation load torque determined in accordance with the front and rear weight distribution determined by said determining section when said low speed condition determining section determines that the vehicle is in a low speed condition,
   said second low speed control section starts when said low speed condition determining section determines that the vehicle is in a low speed condition, and starts said generator control section when the vehicle is not in the low speed condition.

31. The driving force control apparatus as recited in claim 7, further comprising:
   a weight distribution determining section configured to determine the front and rear weight distribution of the vehicle; and
   a low speed condition determining section configured to determine if a traveling speed of the vehicle is less than or equal to a prescribed speed,
   said generator control section calculates a first generation load torque in accordance with the acceleration slippage magnitude of said main drive wheel when acceleration slippage of said main drive wheel is estimated to be occurring acceleration slippage and when said low speed condition determining section determines that the vehicle is in a low speed condition, calculates a second generation load torque in accordance with the front and rear weight distribution determined by said weight distribution determining section, and controls the torque of the generator to match the larger of the first and second generation load torques.

32. The driving force control apparatus as recited in claim 7, further comprising:
   a subordinate drive wheel slippage estimating section configured to estimate acceleration slippage occurring in the subordinate drive wheel; and
   an electric motor torque limiting section configured to starts when said subordinate drive wheel slippage estimating section determines that acceleration slippage is occurring in the subordinate drive wheel, said electric motor torque limiting section limiting the torque of the generator by adjusting a field current of said electric motor such that torque transferred to the subordinate drive wheel from said electric motor does not exceed the road surface reaction force limit torque of the subordinate drive wheel.

33. The driving force control apparatus as recited in claim 7, further comprising:
   a battery;
   a subordinate drive wheel slippage estimating section configured to estimate acceleration slippage occurring in the subordinate drive wheel; and
   an electrical power distributing section configured to distribute to said battery a portion of the electrical power supplied to said electric motor from said generator when said subordinate drive wheel slippage estimating section determines that acceleration slippage is occurring in the subordinate drive wheel.

34. The driving force control apparatus as recited in claim 7, further comprising:
   a slippage condition estimating section configured to estimate a slippage condition of the subordinate drive wheel; and
   an internal combustion engine output control section configured to lower an output torque of said internal combustion engine in accordance with an acceleration slippage magnitude of the slippage condition detected by said slippage condition detecting section torque regardless of an acceleration operation on said internal combustion engine.

35. The driving force control apparatus as recited in claim 7, further comprising:
   a slippage condition detecting section configured to detect a slippage condition of the subordinate drive wheel;
   a clutch section configured to transfer torque to the subordinate drive wheel from said electric motor; and
   a transfer torque section configured to adjust a torque transferred to the subordinate drive wheel by said clutch section in accordance with an acceleration slippage magnitude of the slippage condition detected by said slippage condition detecting section.

36. The driving force control apparatus as recited in claim 7, further comprising:
   an internal combustion engine output limiting section configured to start when said surplus torque computed by said surplus torque computing section exceeds a load capacity of the generator, and said internal combustion engine output limiting section lowering an engine output torque of the internal combustion engine based on a magnitude of a value obtained by subtracting a torque determined based on the load capacity of the generator from said surplus torque regardless of an acceleration operation on said internal combustion engine.

37. The driving force control apparatus as recited in claim 36, further comprising:
   a battery configured to supply electrical power to an electric motor;
   a supply power adjusting section that adjusts the magnitude of electrical power supplied from said battery to said electric motor;
   an acceleration request detecting section configured to detect an acceleration request operation;
   an acceleration condition detecting section configured to detect the acceleration condition of the vehicle; and
   a battery power increasing section that starts upon determining that said internal combustion engine output limiting section has started, said battery power increasing section increasing, via said supply power adjusting section, the magnitude of electrical power supplied to said electric motor from said battery by a magnitude in accordance with the magnitude by which said internal combustion engine output limiting section reduced said output torque, upon determining that the rotational speed of the subordinate drive wheel is being controlled proportionally to an acceleration request based on the detection values of said acceleration request detecting section and said acceleration condition detecting section.

38. The driving force control apparatus as recited in claim 37, wherein said acceleration request detecting section determines if the rotational speed of the subordinate drive wheel is being controlled proportionally to said acceleration request based on the acceleration request indication quantity caused by a driver and the elapsed time of said acceleration request indication.

39. The driving force control apparatus as recited in claim 37, wherein said acceleration condition detecting section detects the acceleration condition of the vehicle based on at least one of the wheel speed of the subordinate drive wheel, the wheel acceleration of the subordinate drive wheel, and the longitudinal acceleration of the vehicle.

40. A driving force control apparatus for a vehicle having front and rear wheels with at least one of the front and rear wheels being a drive wheel driven by an internal combustion engine that drives a generator, said driving force control apparatus comprising:

drive wheel slippage estimating means for estimating if acceleration slippage is occurring in the drive wheel driven by the internal combustion engine; and generator control means for controlling a generation load torque of the generator to substantially correspond to an acceleration slippage magnitude of the drive wheel, when said drive wheel slippage estimating means estimates acceleration slippage occurring in the drive wheel.

* * * * *